US005357426A

United States Patent [19]

Morita et al.

[11] Patent Number: 5,357,426

[45] Date of Patent: Oct. 18, 1994

[54] PROGRAMMABLE APPARATUS FOR STORING DISPLAYING AND SERVING FOOD AND DRINK

[75] Inventors: Minoru Morita; Mitsumasa Kumagai, both of Oura; Toshihiro Sekiguchi, Ooizumi, all of Japan

[73] Assignee: Sanyo Electric Co., Ltd., Moriguchi, Japan

[21] Appl. No.: 12,285

[22] Filed: Feb. 1, 1993

[30] Foreign Application Priority Data

Jan. 30, 1992 [JP] Japan .................................. 4-015261

[51] Int. Cl.$^5$ .................................................. G06F 9/00

[52] U.S. Cl. ..................................... 364/400; 364/401; 364/405; 364/402

[58] Field of Search ............... 364/400, 401, 405, 402; 312/248, 246; 99/477, 483, 486

[56] References Cited

U.S. PATENT DOCUMENTS

| | | | |
|---|---|---|---|
| 4,598,810 | 7/1986 | Shore et al. | 194/205 |
| 4,649,810 | 3/1987 | Wong | 99/326 |
| 4,814,592 | 3/1989 | Bradt et al. | 235/381 |
| 4,911,068 | 3/1990 | Koether et al. | 99/325 |
| 4,922,435 | 5/1990 | Cahlander et al. | 364/513 |
| 4,961,507 | 10/1990 | Higgins | 221/129 |
| 4,984,274 | 1/1991 | Yahagi et al. | 381/43 |
| 5,205,436 | 4/1993 | Savage | 221/7 |
| 5,218,527 | 6/1993 | Ishikawa et al. | 364/405 |

*Primary Examiner*—Roy N. Envall, Jr.
*Assistant Examiner*—Gita Shingala
*Attorney, Agent, or Firm*—Darby & Darby

[57] ABSTRACT

A party production apparatus allows a party program to be stored in advance and automatically serves various dishes in accordance with the progress of the party to produce the party successfully. The party production apparatus comprises a kitchen counter, a table counter, and a controller. The kitchen counter includes cooking device. The table counter includes a frame, a table provided on the frame, a food displaying section formed on the table, a storage chamber provided in the frame for accommodating a plurality of dishes therein, and a transport apparatus for transporting a selected dish or dishes accommodated in the storage chamber to the food displaying section. The controller includes a register for storing therein a party program including a plurality of operations to be executed successively in a time series relationship and controls the transport apparatus in accordance with an order sequence stored in the register to transport the dish or dishes to the food displaying section.

15 Claims, 41 Drawing Sheets

FIG.37

PROCEDURE OF REGISTRATION OF STORY

| ORDER | OPERATION BUTTON | ORDER | OPERATION BUTTON | ORDER | OPERATION BUTTON |
|---|---|---|---|---|---|
| 1 | REGIST-RATION | 10 | • | 19 | HOT ▼ |
| 2 | BGM ON | 11 | • | 20 | END |
| 3 | CELEB-RATION | 12 | SPACE | | |
| 4 | SPACE | 13 | 1MIN | | |
| 5 | 1MIN | 14 | 1MIN | | |
| 6 | △ COLD 1 | 15 | COLD ▽ | | |
| 7 | SPACE | 16 | ▲ HOT 1 | | |
| 8 | 10MIN | 17 | SPACE | | |
| 9 | 10MIN | 18 | 10MIN | | |

FIG.38

| ORDER | CONTENTS OF OPERATION |
|---|---|
| 1 | DEPRESS PARTY STARTING BUTTON |
| 2 | "Now, let's start the party" (SPEECH SYNTHESIS) |
| 3 | BGM |
| 4 | CELEBRATION MESSAGE ON LIQUID CRYSTAL SCREEN |
| 5 | CONFIRMING OPERATION (WAIT FOR 1 MINUTE) |
| 6 | SERVE FIRST COOL DISH |
| 7 | MEALTIME FOR 20 MINUTES |
| 8 | CONFIRMING OPERATION |
| 9 | OPEN SHOW-CASE DOOR LIQUID CRYSTAL |
| 10 | CONFIRMING OPERATION (WAIT FOR 2 MINUTES) |
| 11 | REMOVE FIRST COOL DISH |
| 12 | SERVE FIRST WARM DISH |
| 13 | MEALTIME FOR 10 MINUTES |
| 14 | CONFIRMING OPERATION |
| 15 | REMOVE FIRST WARM DISH |
| 16 | END |

PROGRAMMABLE APPARATUS FOR STORING DISPLAYING AND SERVING FOOD AND DRINK

BACKGROUND OF THE INVENTION

This invention relates to a party production apparatus which prepares dishes in accordance with a party program based on a plurality of operations to be performed successively in a time series relationship to produce a party.

In recent years, as the development of the culture of food proceeds, parties outside and inside the home are produced actively. For example, a system including a cooking counter for preparing dishes and serving the prepared dished on a counter is disclosed in Japanese Laid-Open Patent Application No. 3-191906.

However, as means for producing such a party successfully, it is an essential factor not only to merely serve dishes and drinks but also to serve various cool dishes (dishes to be served cool) and warm dishes (dishes to be served warm) at good intervals in accordance with the procedure of the party.

SUMMARY OF THE INVENTION

It is an object of the present invention to provide a party production apparatus which allows a party program to be determined in advance and automatically serves various dishes in accordance with the procedure of a party to produce the party successfully.

It is another object of the present invention to provide a party production apparatus which can carry out a party without causing the attendees of the party to have a disagreeable feeling.

It is a further object of the present invention to provide a party production apparatus which can produce a party successfully by means of visual factors, such as illumination, in addition to the serving of dishes.

In a party production apparatus of the present invention, a controller controls a transport apparatus in accordance with the order of a party program which has been stored in register means so that various dishes accommodated in a storage chamber are transported to a food displaying section of a table by the transport apparatus. Serving of dishes in accordance with the progress of the party is automatically performed thereby.

BRIEF DESCRIPTION OF THE DRAWINGS

FIG. 37 is a table illustrating the procedure for storage or entry of a party program into a microcomputer of the control apparatus;

FIG. 38 is a table illustrating operation of the microcomputer;

DESCRIPTION OF THE PREFERRED EMBODIMENT

Figure 1:
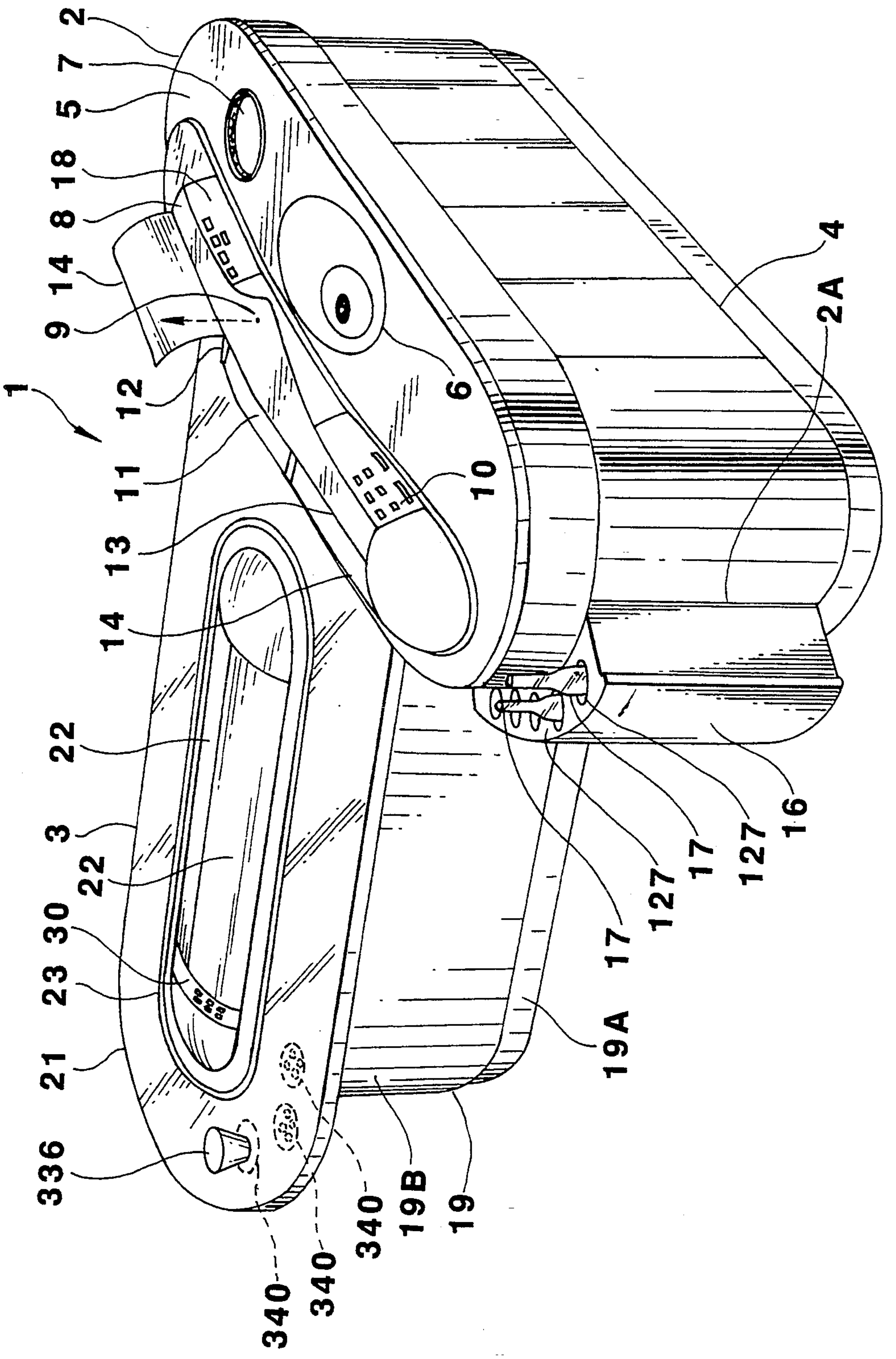
FIG. 1 is a perspective view of a party production apparatus of the present invention.

In the following, a preferred embodiment of the present invention will be described in detail with reference to the drawings. Referring first to FIG. 1, a party production apparatus 1 is installed at a party place inside or outside of the home, e.g., principally in connection with a wedding ceremony or on various memorial days, and is used to produce the party smoothly and successfully in a planned sequence by way of preparation of various dishes, presentation of music and illumination, management of the procedure for the party and so forth. The party production apparatus 1 is principally constituted by a kitchen counter 2 and a table counter 3. The kitchen counter 2 includes a counter 5 provided on a frame 4. A sink 6 is provided at a substantially mid portion of the counter 5, and an electromagnetic cooking unit 7 is disposed on the right side of the sink 6.

A cover 8 is provided in a longitudinal direction of the counter 5 forwardly of the sink 6 such that a central portion thereof extends like a roof above the sink 6. A faucet (not shown) is provided inside the cover 8 and extends above the sink 6, and an infra-red ray projecting element 9 for an infra-red ray switch for controlling delivery of water, hot water or boiling water from the faucet is provided on the top face of the cover 8. A liquid crystal display screen 11 serve as an instruction confirming means and a displaying means for displaying thereon information, including a character or characters and a figure regarding the procedure of a party or dishes which will be hereinafter described. This server 11 is provided at a central portion of a front face of the cover 8. A pair of showcases 12 and 13 which will be hereinafter described are provided on the opposite sides of the liquid crystal display screen 11.

Figure 34:
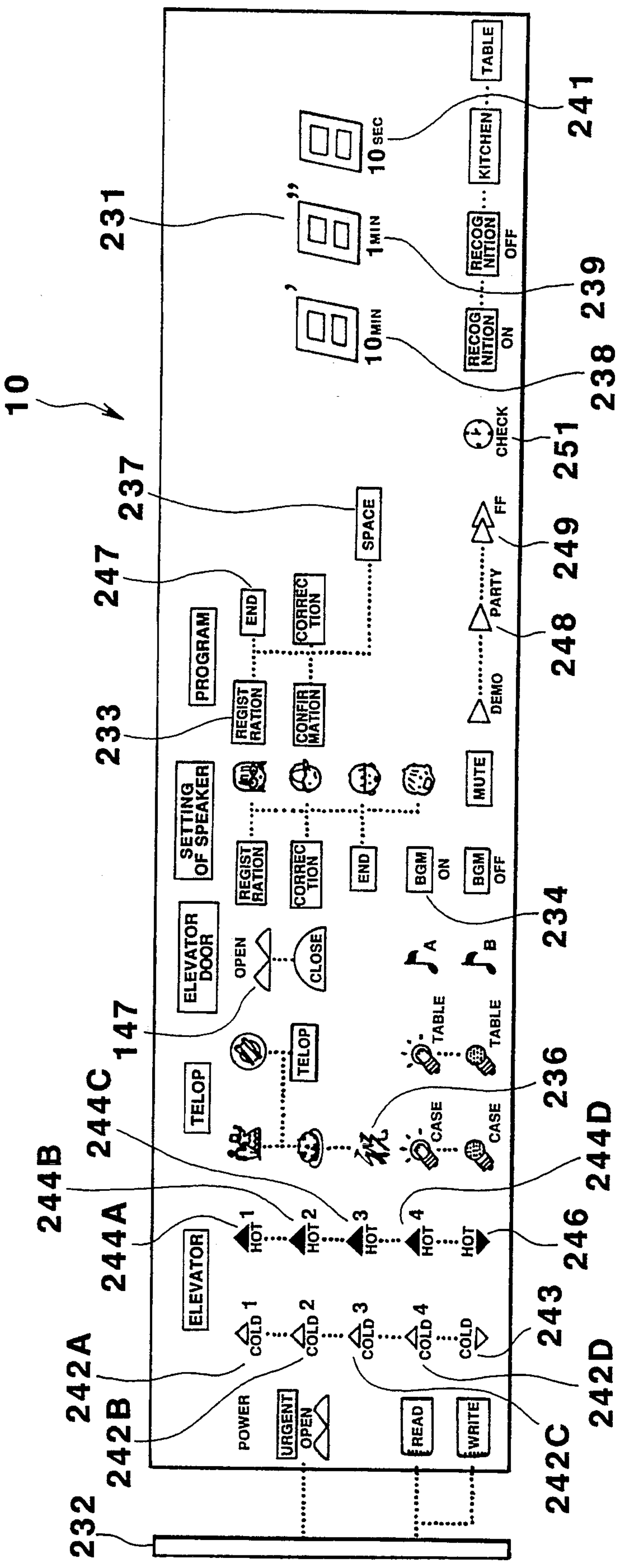
FIG. 34 is a schematic view showing an operating switch section on the left side of the kitchen counter.
Figure 35:
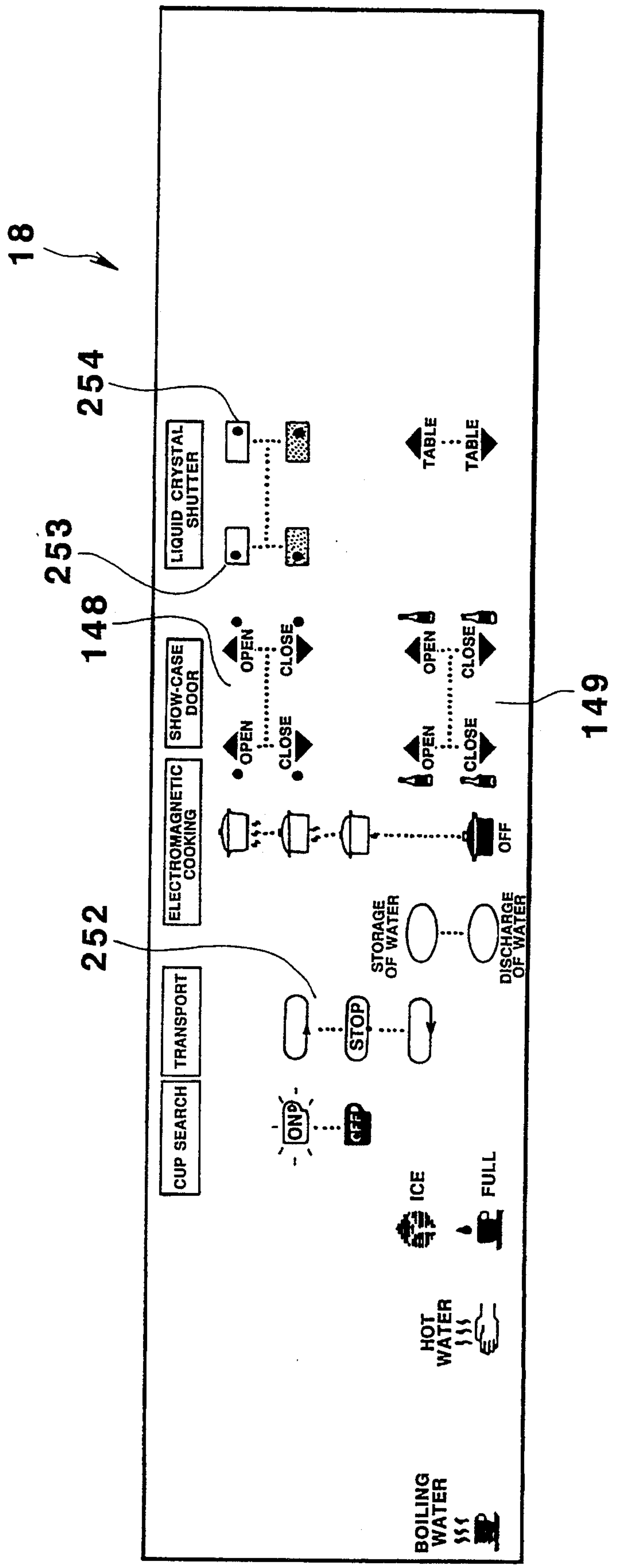
FIG. 35 is a similar view but showing another operating switch section on the right side of the kitchen counter.

A pair of recesses 2A are formed at the opposite corners of the front side of the frame 4 of the kitchen counter 2, and a drink case 16, which will be hereinafter described, is mounted on the frame 4 and positioned in each of the recesses 2A. A left side operating switch section 10 as shown in FIG. 34 is provided at a left location of the kitchen counter 2 below the cover 8, and a right side operating switch section 18 as shown in FIG. 35 is provided at a right portion of the kitchen counter 2 below the cover 8. The sponsor of the party or user will thus effect the setting of a program regarding a party into a microcomputer MC which will be hereinafter described. Alternatively the user may cause an arbitrary interrupted operation during a party by operation of the switch sections 10 and 18 or by way of a magnetic card or a like medium.

Meanwhile, the table counter 3 is constituted from, as shown in FIGS. 1, 3, 23 and 26, a frame 19 and a counter 21 provided on the frame 19. The frame 19 is constituted from a fixed section 19A and a liftable section 19B which is moved upwardly and downwardly by a lifting mechanism 20. The counter 21 is provided on the liftable section 19B so that it is moved upwardly and downwardly by upward and downward movement of the liftable section 19B to vary the vertical position thereof.

Figure 36:
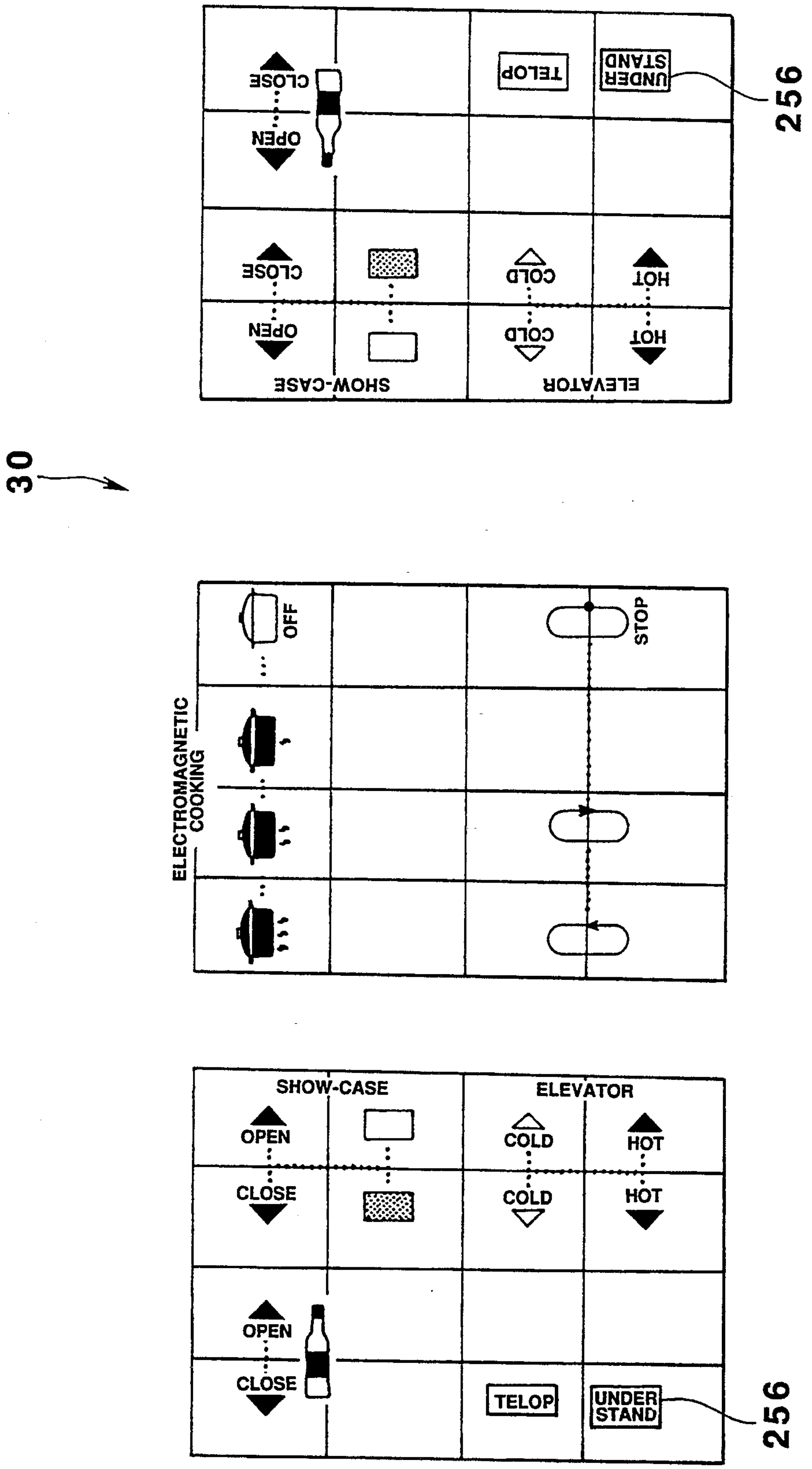
FIG. 36 is a schematic view showing an operating switch section of the table counter.

An opening 79 is formed substantially at the center of the counter 21, and a pair of openings 24 and 25 generally constituting a food displaying section 21A are connected with the opening 79. An electromagnetic cooking unit 33 is provided in the opening 79. A heating cabinet 26 which is kept warm by an electric heater (not shown) and a cooling cabinet 27 which is refrigerated by a refrigerating apparatus (not shown) are disposed in corresponding openings 24 and 25, respectively, in the liftable section 19B below the counter 21. The food displaying section 21A is opened or closed by a pair of double hinged door members 22 made of smoke glass and constituting a door apparatus D1. An operating switch section 30 on the table counter 3 side, as shown in FIG. 36, is provided at a location sidewardly of the door members 22. A transport rail 23 is provided on the top face of the counter 21 around the door members 22 and transports a glass or a tray placed thereon in a predetermined direction by ultrasonic waves produced by an oscillator, not shown.

The table counter 3 constructed as described above is installed perpendicularly to the kitchen counter 2 so that they may cooperatively make a T shape. The table counter 3 and the kitchen counter 2 are constructed such that electric circuits thereof are connected to each other so that cooling, transporting or displaying and producing functions of the kitchen counter 2 and the table counter 3 may be performed in accordance with a procedure programmed in advance by way of operation of the operating switch sections 10, 18 and 30 or by means of the microcomputer MC.

Figure 3:
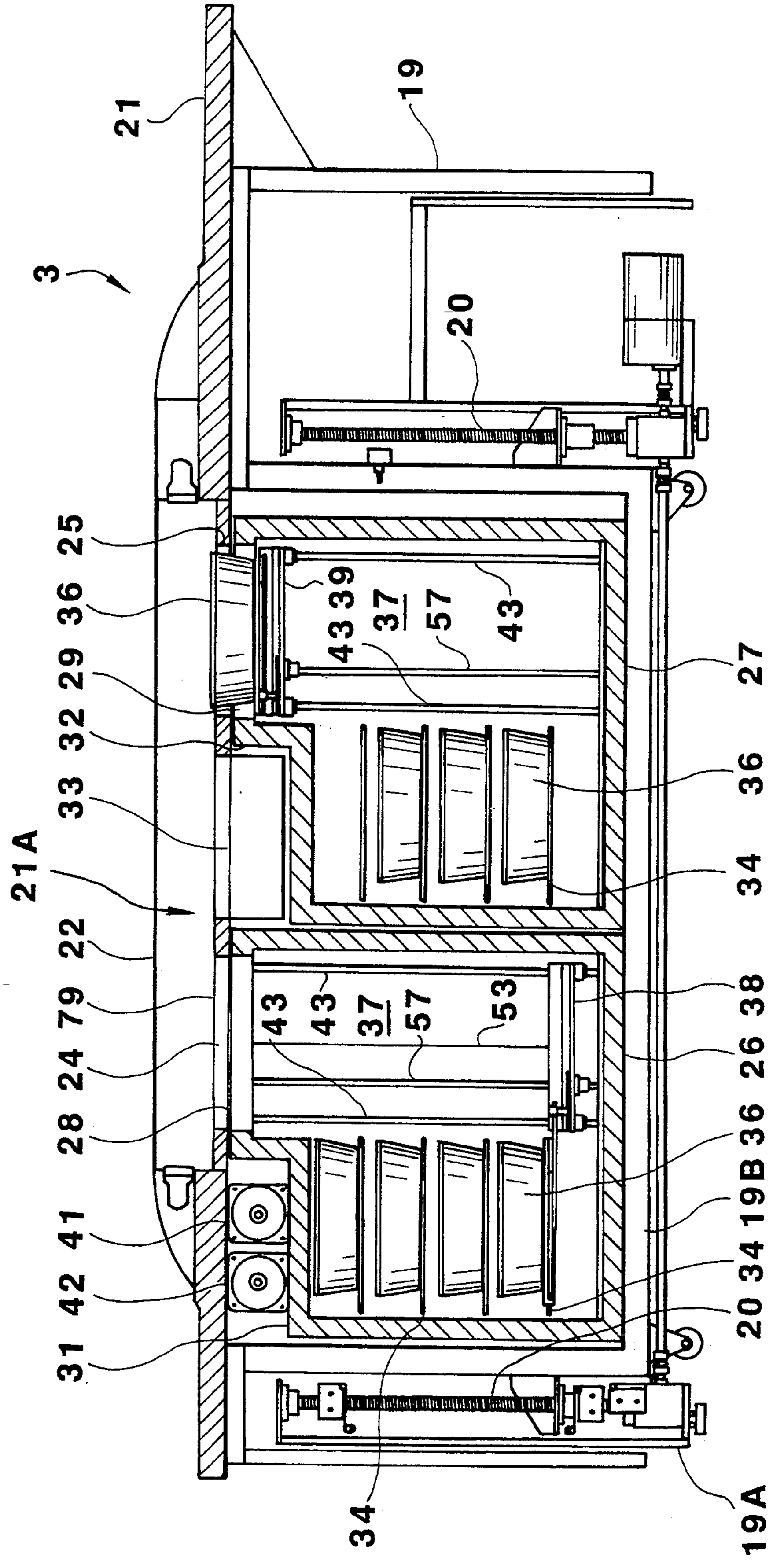
FIG. 3 is a sectional side elevational view of a table counter of the party production apparatus.
Figure 4:
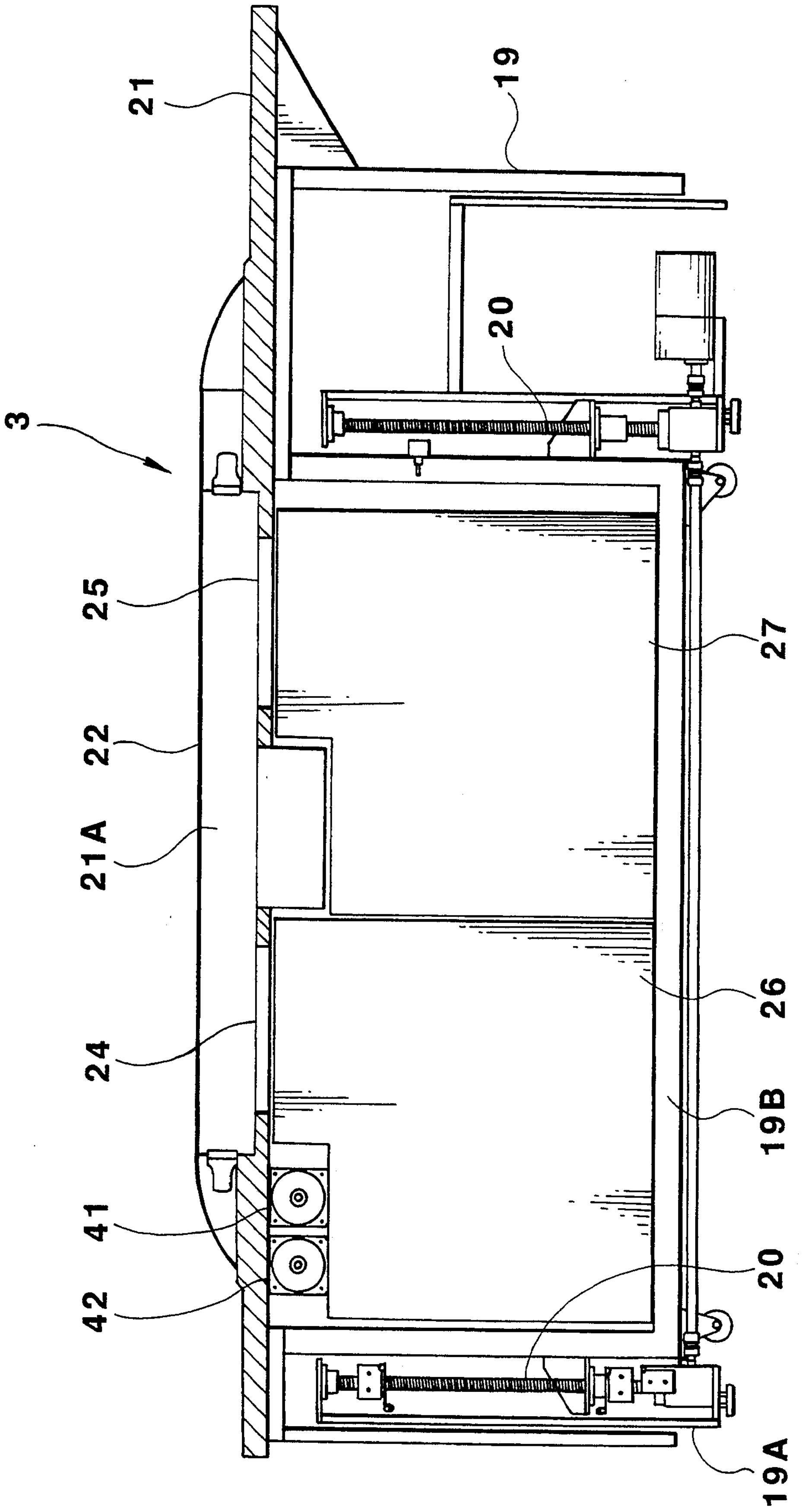
FIG. 4 is a side elevational view of the table counter.

Referring now to FIG. 3, the heating cabinet 26 and the cooling cabinet 27 are each formed as a heat insulating box and are disposed in a juxtaposed relationship below the table 21. The heating cabinet 26 and the cooling cabinet 27 have a substantially similar profile and have openings 28 and 29 formed at the top faces thereof corresponding to the openings 24 and 25, respectively, and further have recesses 31 and 32 formed adjacent the openings 28 and 29 in the top walls thereof, respectively. The electromagnetic cooking unit 33 constituting the food displaying section 21A is disposed in the recess 32 of the cold cooking apparatus 27, and the openings 24 and 25 are separated from each other by the electromagnetic cooking unit 33. Further, four shelves 34 are disposed in each of the heating cabinet 26 and the cooling cabinet 27 below the corresponding recesses 31 and 32, and food containers 36 in which different dishes are contained (warm dishes are contained in the heating cabinet 26 while cold dishes are contained in the cooling cabinet 27) are individually held and stored on the shelves 34. Further, a pair of movement ducts 37 are formed below the openings 28 and 29 adjacent the shelves 34 such that they communicate with the openings 24 and 25, respectively, and a pair of elevators 38 and 39 serving as transport apparatus are individually provided in the movement ducts 37. A pair of vertically feeding motors 41 and 42 for driving the elevators 38 and 39 to move vertically, respectively, are disposed in the recess 31 of the heating cabinet 26.

Figure 5:
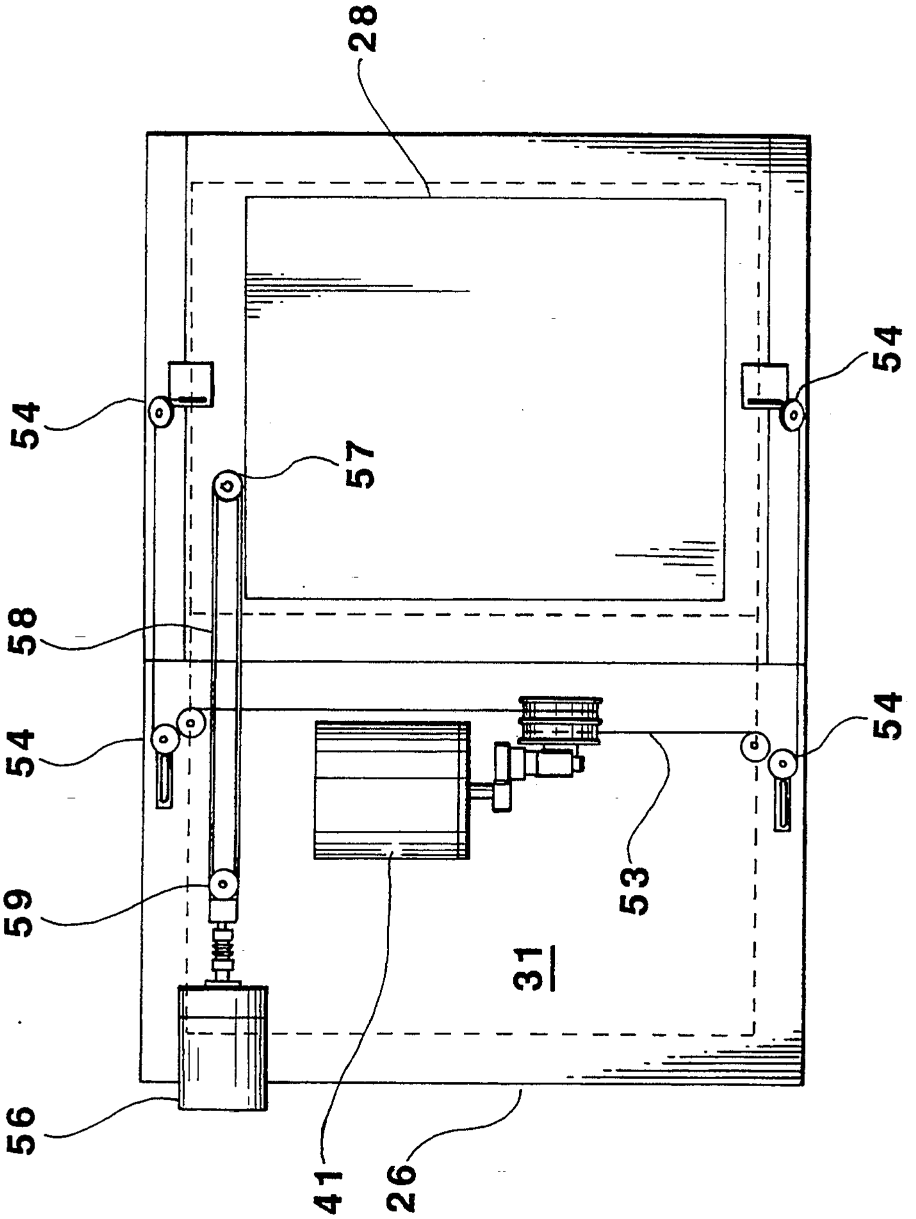
FIG. 5 is a top plan view of a heating cabinet of the party production apparatus.
Figure 6:
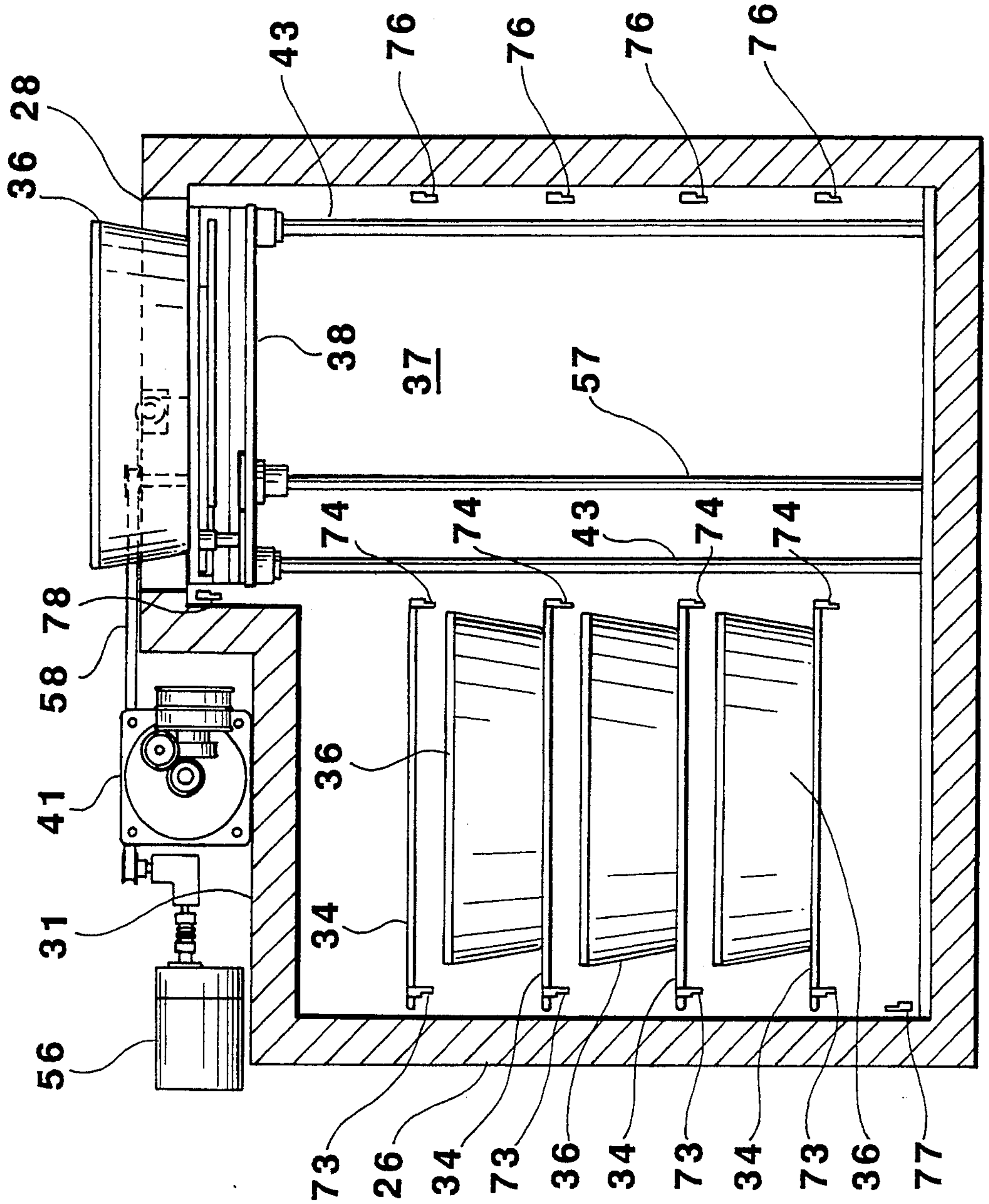
FIG. 6 is a sectional side elevational view of the heating cabinet.
Figure 7:
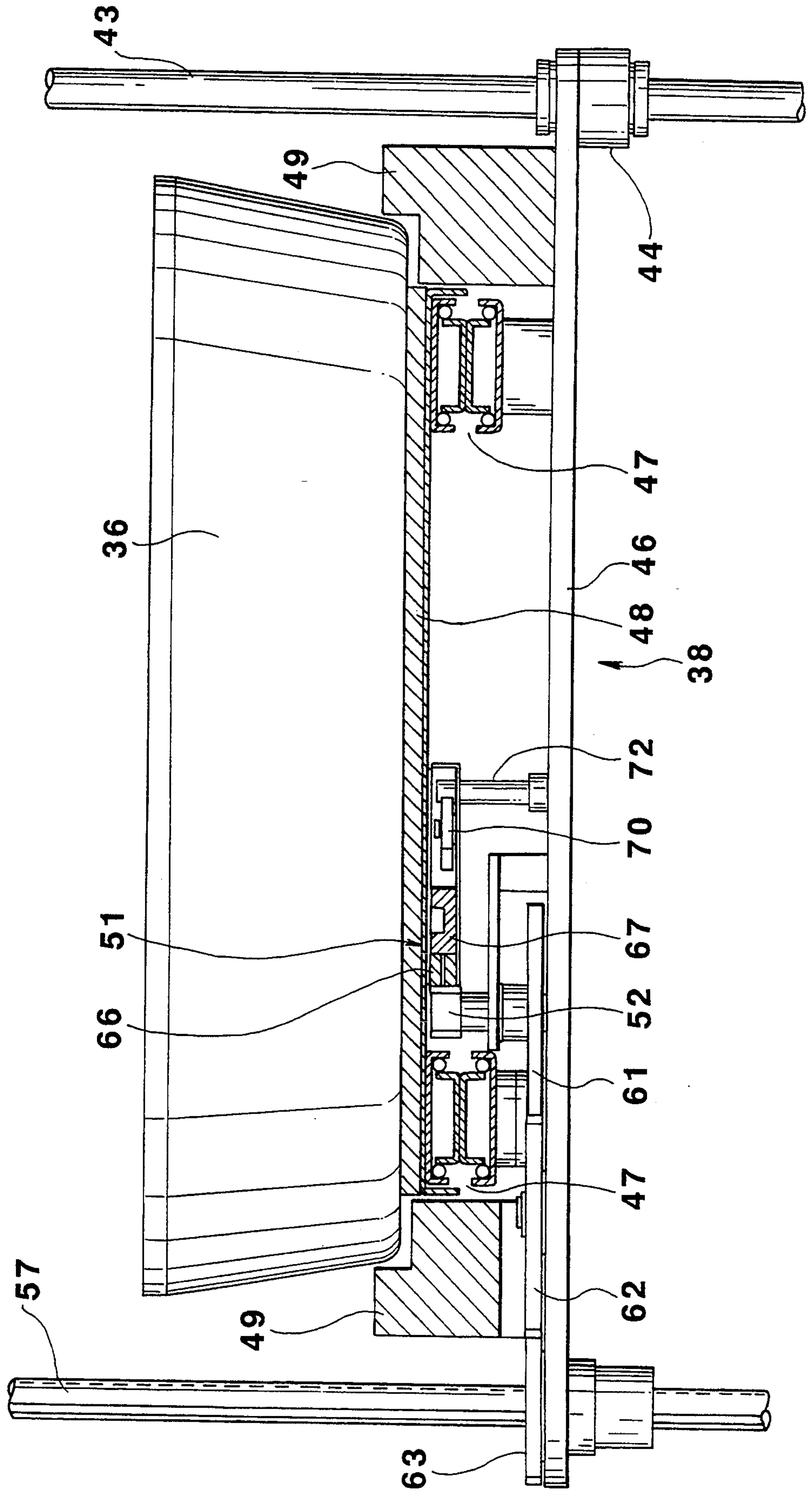
FIG. 7 is a side elevational view of an elevator of the party production apparatus.
Figure 8:
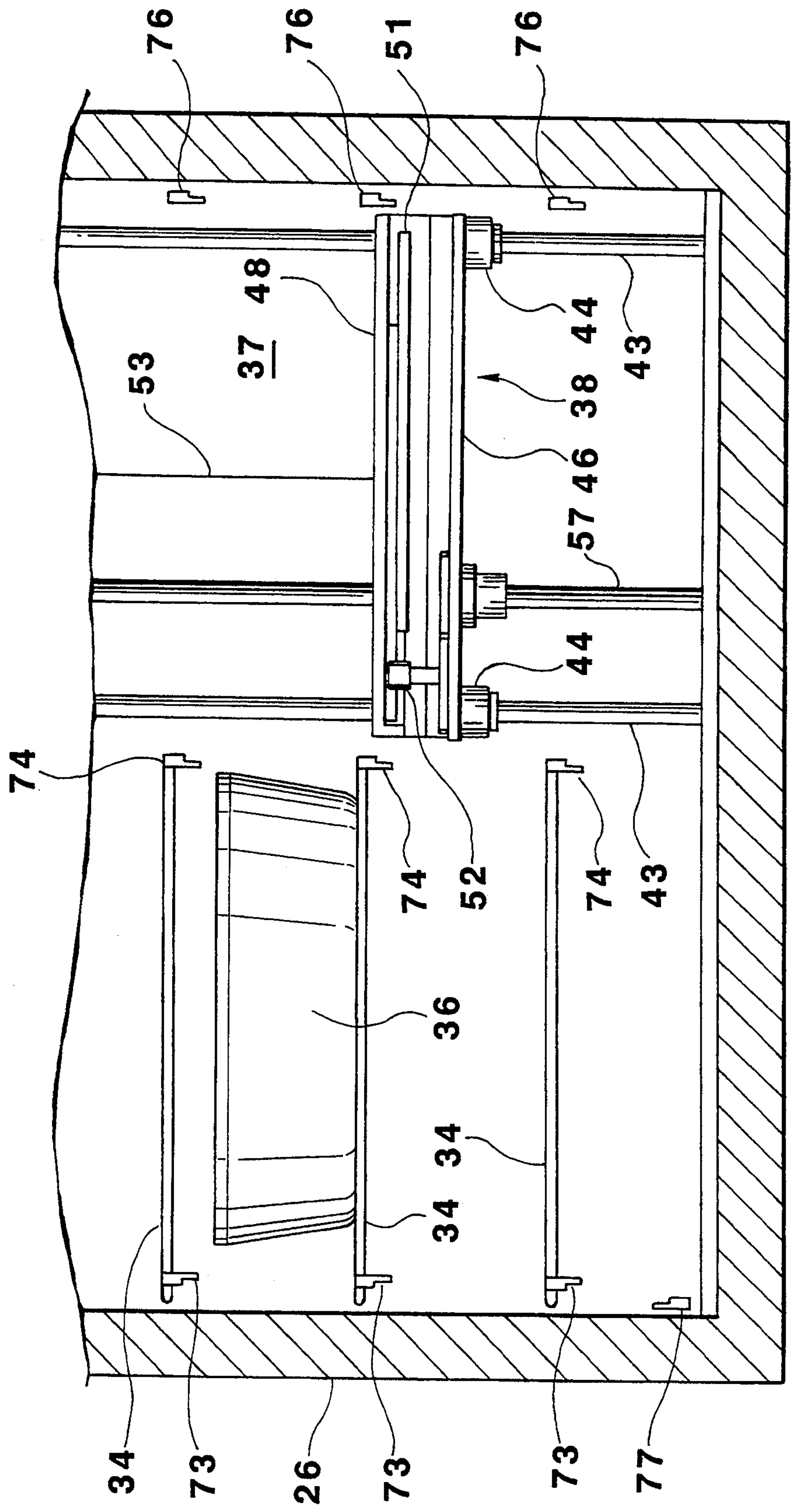
FIG. 8 is a sectional side elevational view of part of the heating cabinet illustrating operation of the elevator.
Figure 9:
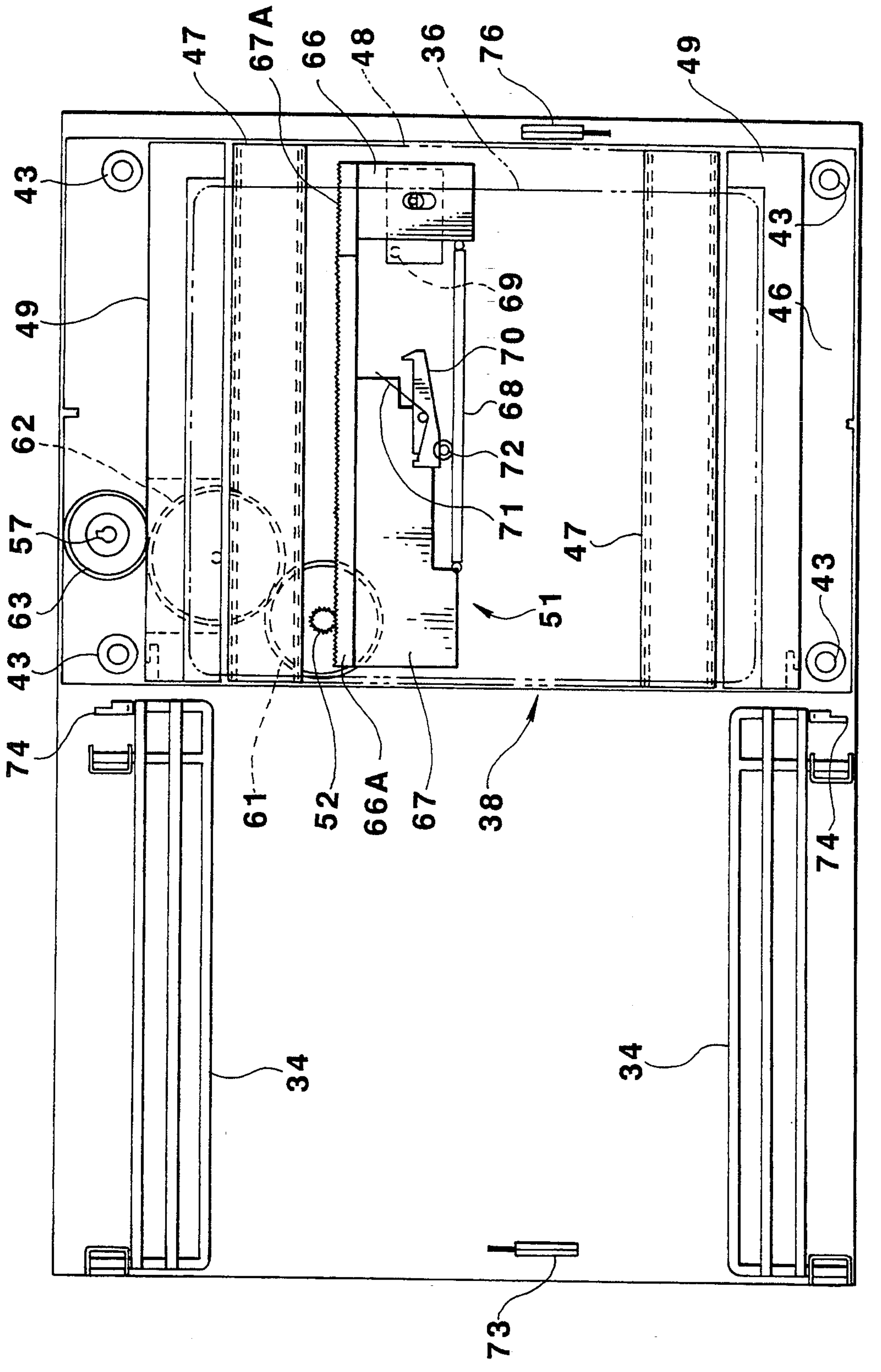
FIG. 9 is a plan view of the inside of the heating cabinet.

The structure of the elevator 38 of the heating cabinet 26 will be described subsequently with reference to FIGS. 5 to 10. It is to be noted here that, while FIGS. 5 to 10 show only the heating cabinet 26 and the elevator 38 of the heating cabinet 26, the cooling cabinet 27 and the elevator 39 have respectively similar structures. FIG. 5 shows a top plan view of the heating cabinet 26 and FIG. 6 shows a sectional side elevational view of the heating cabinet 26. Four vertical guide shafts 43 are provided uprightly at the four corners of the movement duct 37, and the elevator 38 is mounted for vertical sliding movement on the guide shafts 43. FIG. 7 shows a side elevational view of the elevator 38 and FIG. 9 shows a plan view of the elevator 38. The elevator 38 is constituted from a base 46 having four corners held in engagement for sliding movement with the guide shafts 43 by way of linear ball bearings 44, a pair of sliders 47 provided on the base 46, a movable section 48 secured to the sliders 47, a pair of container guides 49 positioned on the opposite sides of the sliders 47, a rack apparatus 51 mounted on the bottom wall of the movable section 48, and a pinion 52 mounted on the base 46.

A wire 53 is connected to the base 46 and is taken up or fed out by rotation of the vertically moving motor 41. The wire 53 is kept taut by means of a plurality of pulleys 54. A horizontally feeding motor 56 is provided in the recess 31. A spline shaft 57 is mounted uprightly for rotation in the movement spacing 37 located sidewardly of the elevator 38. The spline shaft 57 is connected to the horizontally feeding motor 56 by way of a timing belt 58 and a timing pulley 59. Further, a gear 61 secured coaxially to the pinion 52 and an idle gear 62 held in meshing engagement with the gear 61 are provided on the base 61. Another gear 63 is provided on the spline shaft 57 and is held in meshing engagement with the idle gear 62 such that it is moved by vertical movement of the base 46 and is rotated by rotation of the spline shaft 57.

Figure 10:
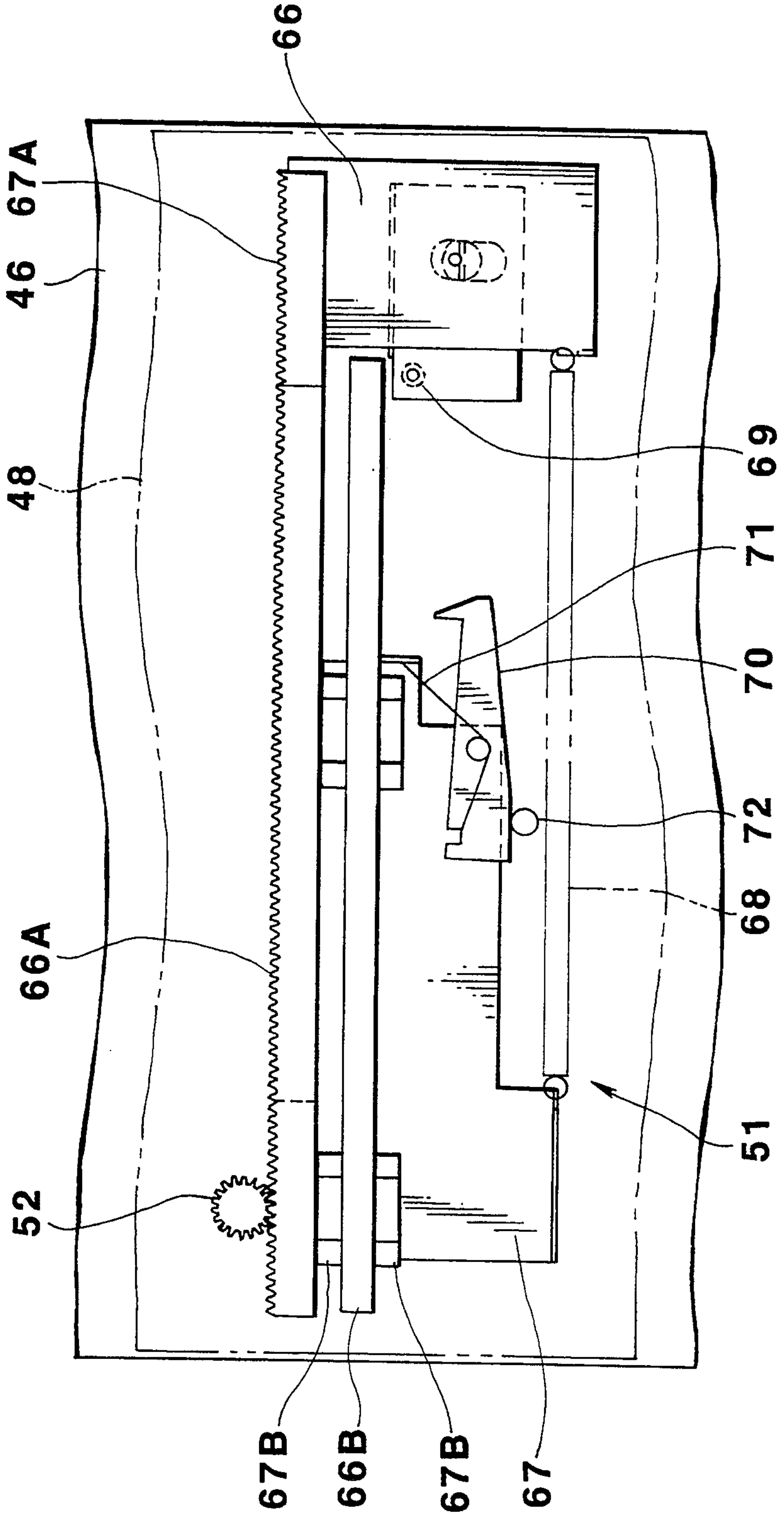
FIG. 10 is a plan view of a rack apparatus of the party production apparatus with movable elements shown for illustrating operation of the rack apparatus.
Figure 11:
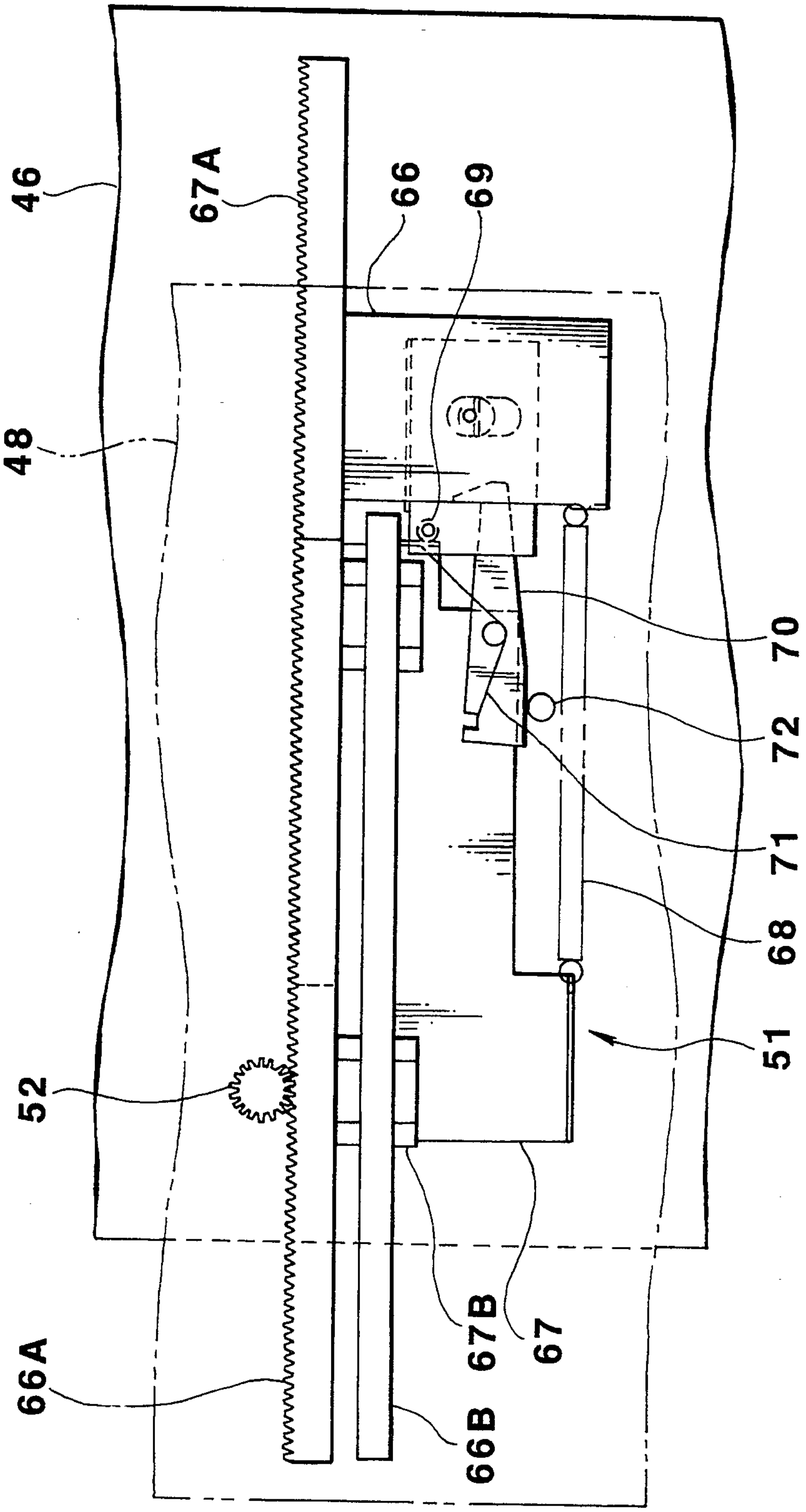
FIG. 11 ms another plan view of the rack apparatus with the movable elements illustrating operation of the rack apparatus.

The rack apparatus 51 mounted on the bottom wall of the movable section 48 is constituted from, as shown in FIG. 10, a first rack 66 and a second rack 67 mounted in an overlapping relationship for sliding movement relative to each other by means of a slider 66B and a guide rail 67B. The first and second racks 66 and 67 are mounted in an overlapping relationship, that is, one on the other such that meshing teeth 66A and 67A thereof are positioned in a rather longitudinally displaced condition on the same line, and when the movable section 48 is overlapped fully on the base 46, only the meshing teeth 66A mesh with the pinion 52. Further, the first and second racks 66 and 67 are connected to each other by a spring 68 which exerts a resilient force in a contracting direction to bias the first and second racks 66 and 67 toward each other. A latch pin 69 is formed projectingly on the first rack 66 while a latch cam 70 is provided for pivoting motion in a horizontal direction on the second rack 67. The latch cam 70 is normally biased to pivot in the counterclockwise direction in FIG. 9 by a latch spring 71. Meanwhile, a return pin 72 is provided uprightly on the base 46 and normally contacts with a rear of the latch cam 70.

Each of the shelves 34 is mounted on a wall of the heating cabinet 26 such that it supports only the bottom faces of the opposite sides of a dish container 36, and a limit switch 73 for detecting advancement of the movable section 48 is provided at a location corresponding to the interior of each of the shelves 34 while another limit switch 74 for detecting the vertical position of the elevator 38 is provided for each of the shelves 34 adjacent the movement duct 37. A further limit switch 76 for detecting retracting of the movable section 48 is provided at a vertical position corresponding to each of the shelves 34 on a wall face of the movement spacing 37 remote from the shelf 34. Furthermore, a cancel switch 77 is provided below the lowermost shelf 34 while an upper limit switch 78 is provided below the opening 28.

Subsequently, operation of the elevator 38 will be described with reference to FIGS. 11 to 20. It is assumed here that a dish, for example, in the third dish container 36 down from the top of the heating cabinet 26, is selected by the microcomputer MC in response to operation of a switch 244C of the operating switch section 10 by the sponsor of, or a person present, in the party as an instructor as hereinafter described or in accordance with a preset plan. In this instance, the microcomputer MC energizes the vertically feeding motor 41 to move the elevator 38 upwardly or downwardly until it stops the elevator 38 at a position alongside of the third shelf 34 from the top in response to an output of the limit switch 74 (condition shown in FIG. 8).

Then, the microcomputer MC energizes the horizontally feeding motor 56 to rotate the spline shaft 57 to rotate the pinion 52 in the clockwise direction in FIG. 10. Upon rotation of the pinion 52, the first rack 66 of the rack apparatus 51, whose meshing teeth 66A are held in meshing engagement with the pinion 52, begins to be moved in the direction toward the shelf 34 (condition shown in FIG. 11).

Figure 12:
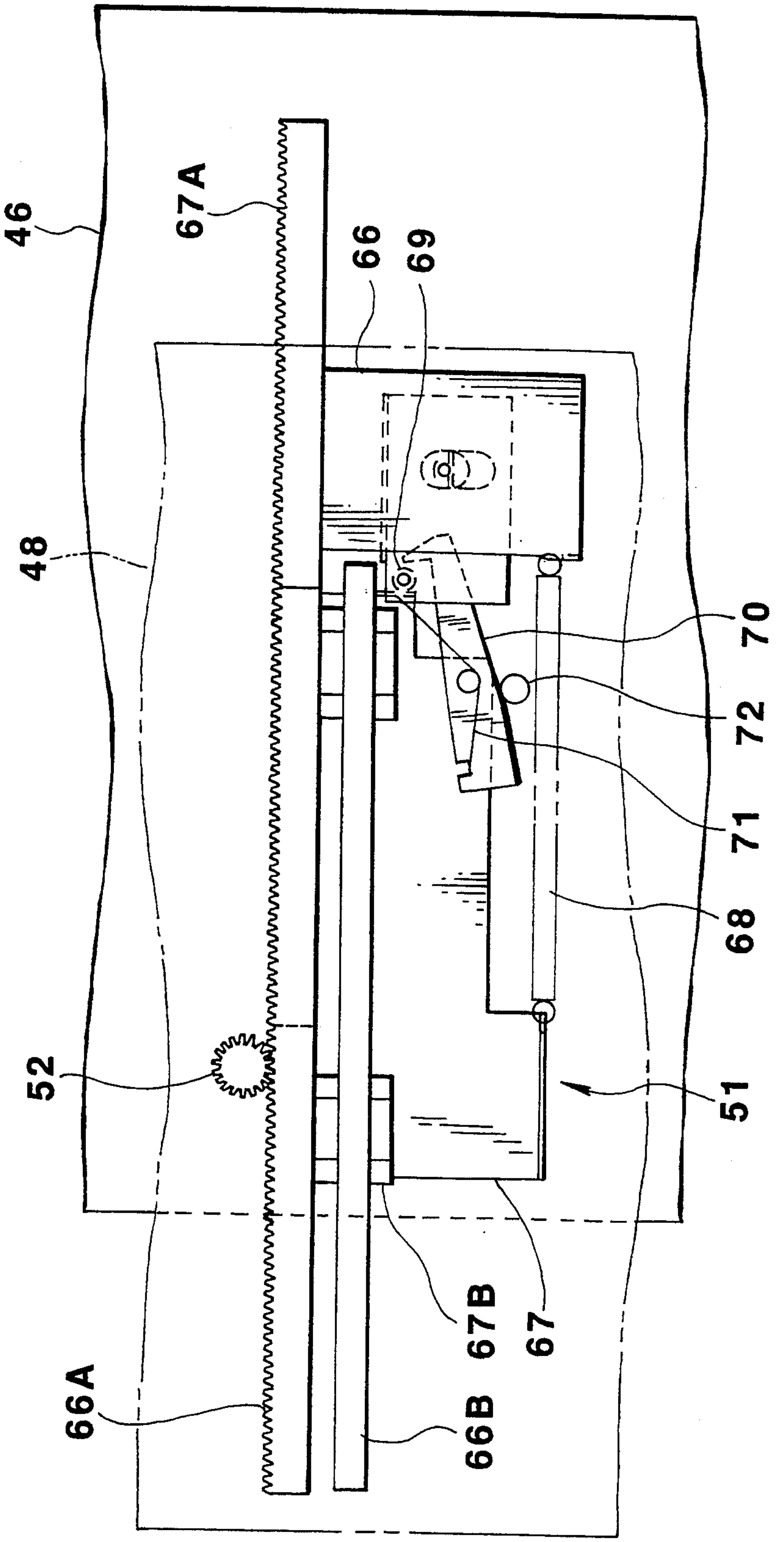
FIG. 12 is a further plan view of the rack apparatus with the movable elements illustrating operation of the rack apparatus.
Figure 13:
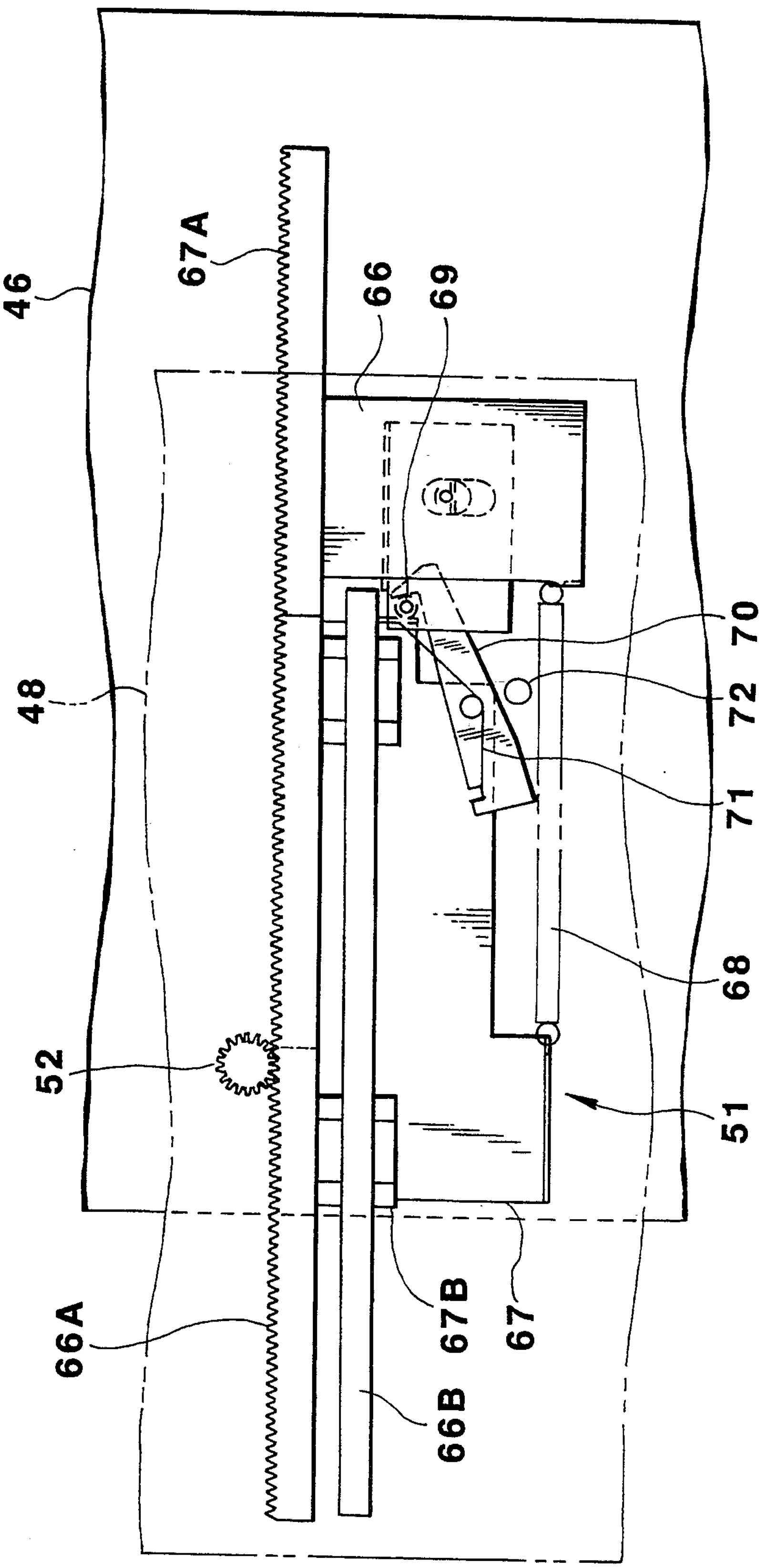
FIG. 13 is a still further plan view of the rack apparatus with the movable elements illustrating operation of the rack apparatus.
Figure 14:
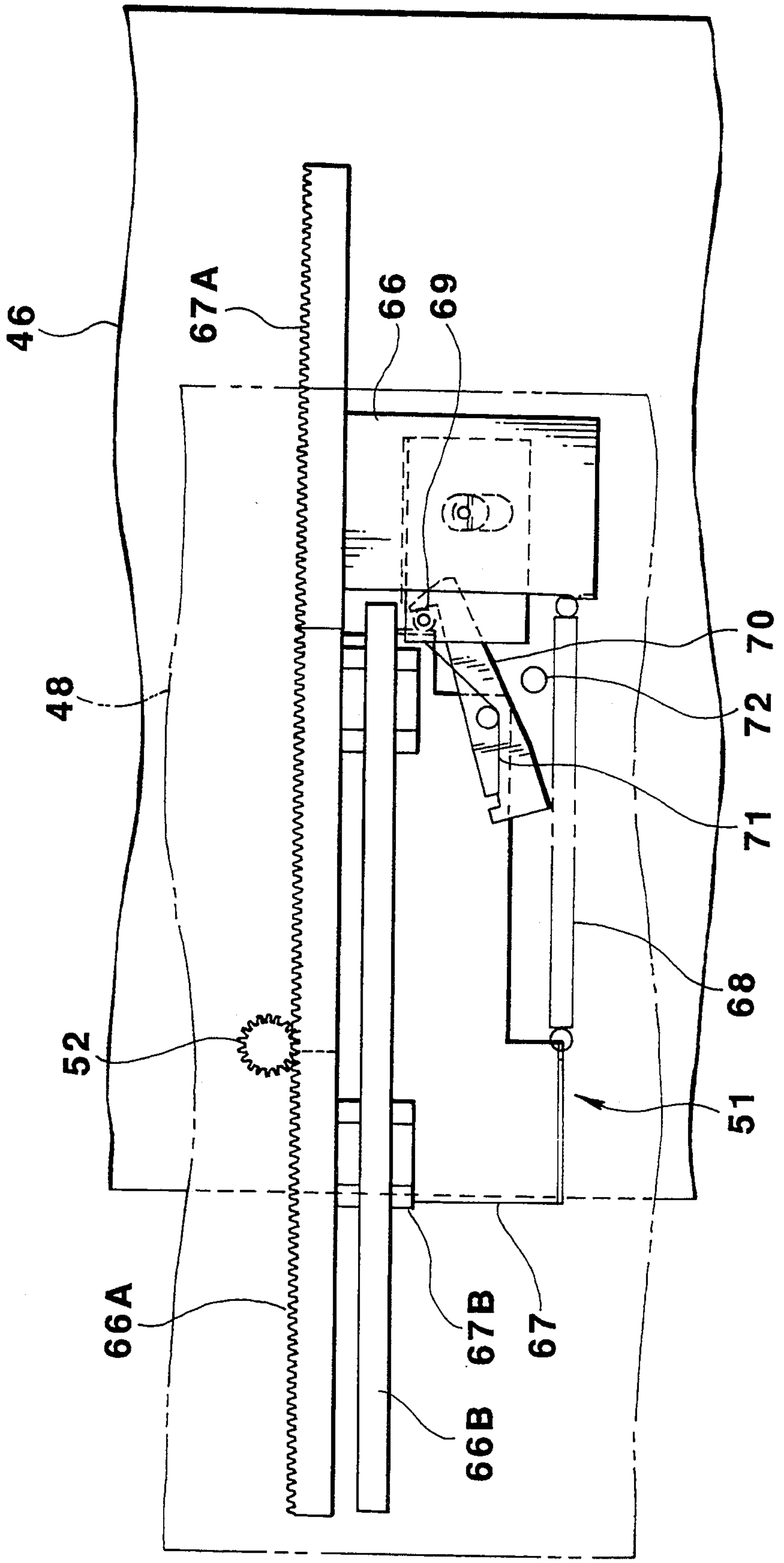
FIG. 14 is a yet further plan view of the rack apparatus with the movable elements illustrating operation of the rack apparatus.
Figure 15:
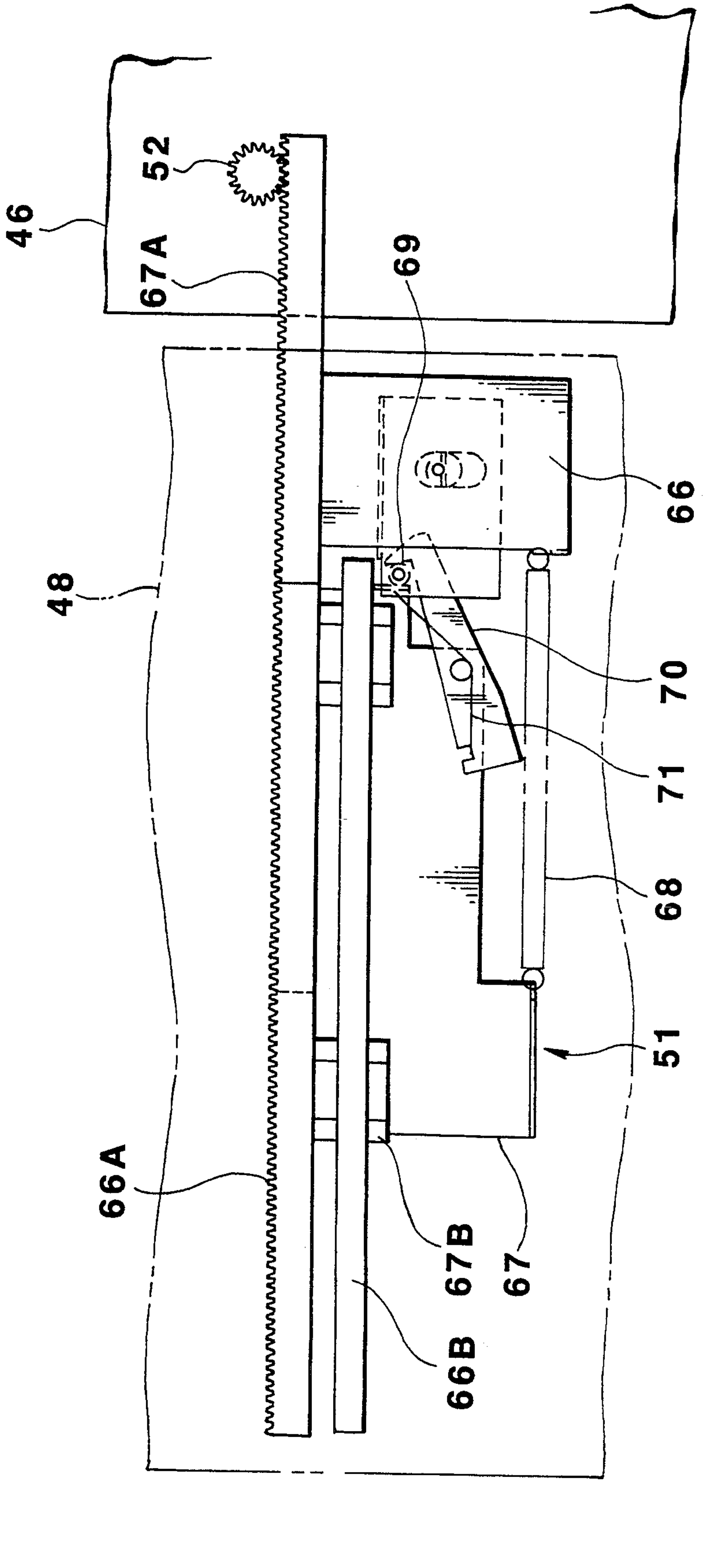
FIG. 15 is a yet further plan view of the rack apparatus with the movable elements illustrating operation of the rack apparatus.
Figure 16:
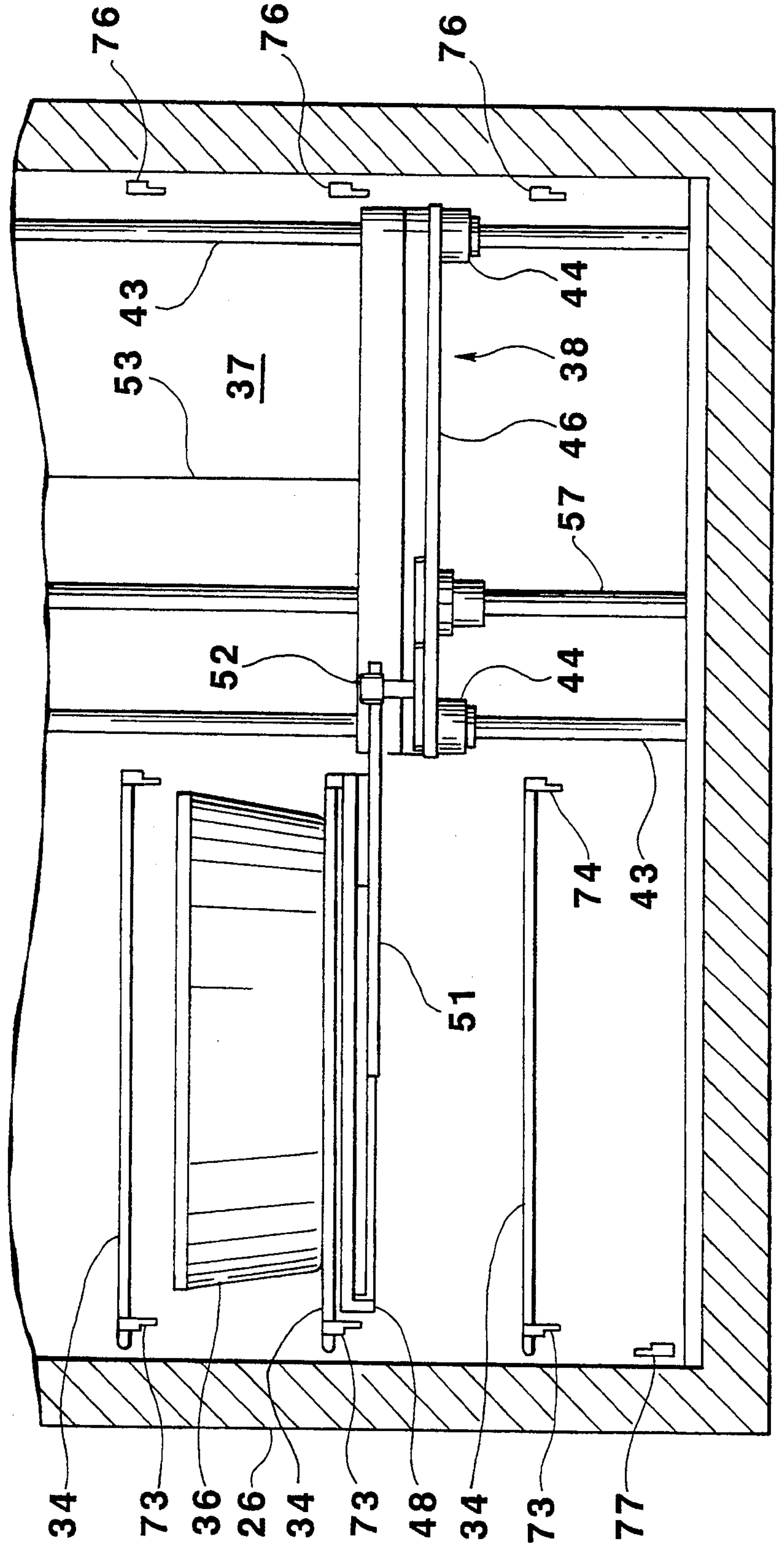
FIG. 16 is another partial sectional side elevational view of the heating cabinet illustrating operation of the elevator.
Figure 17:
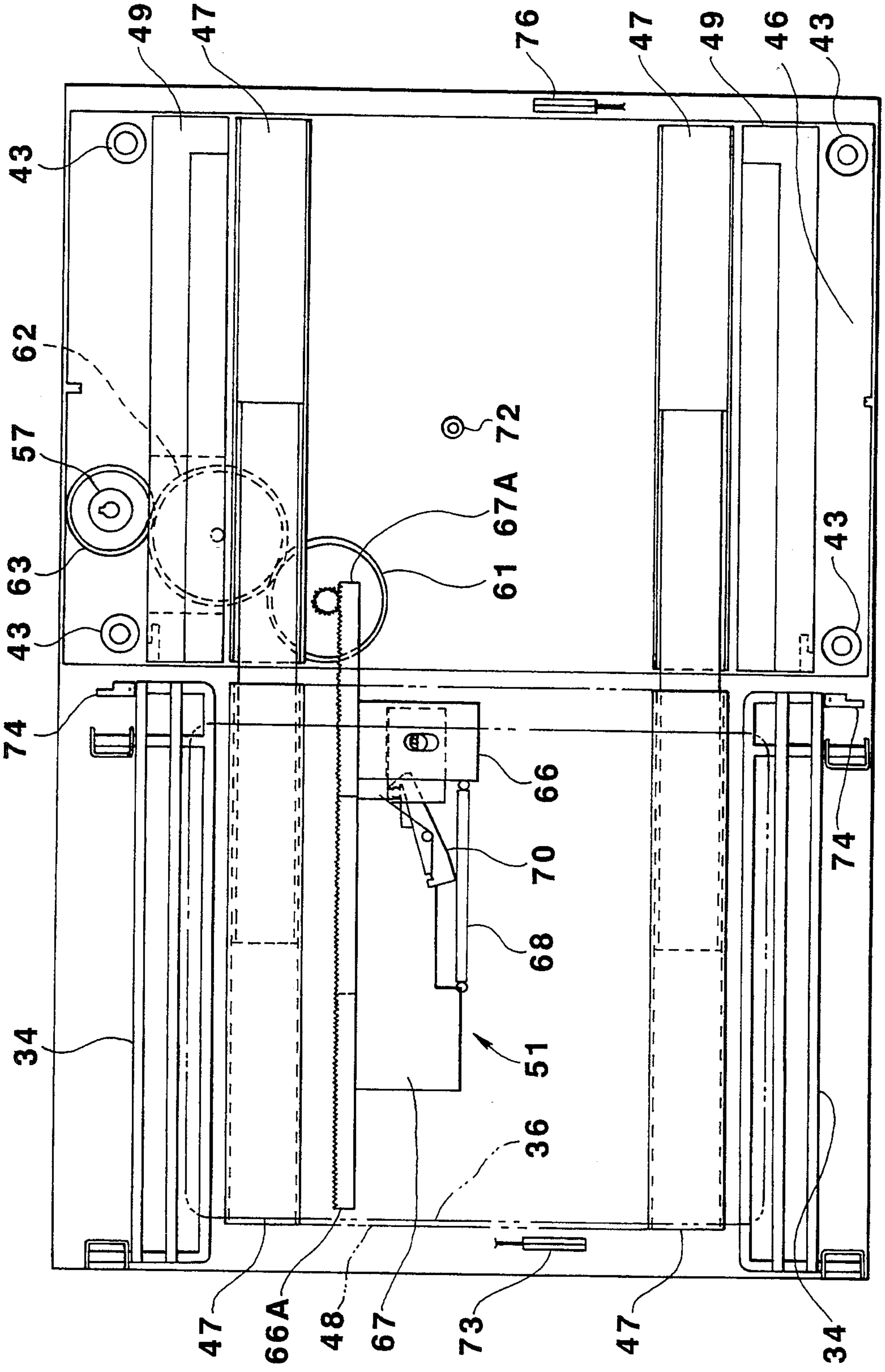
FIG. 17 is another plan view of the inside of the heating cabinet.
Figure 18:
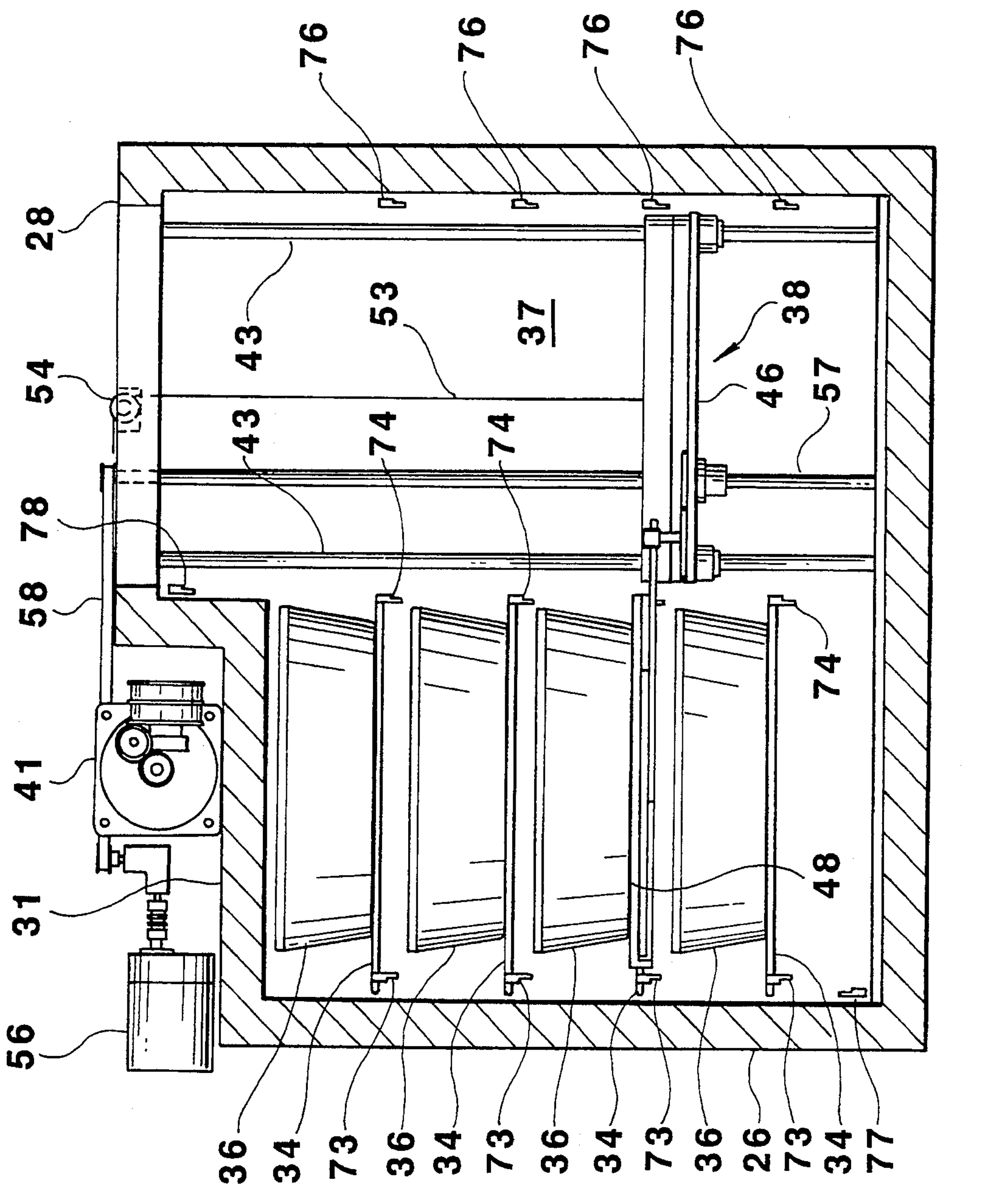
FIG. 18 is another sectional side elevational view of the heating cabinet.
Figure 19:
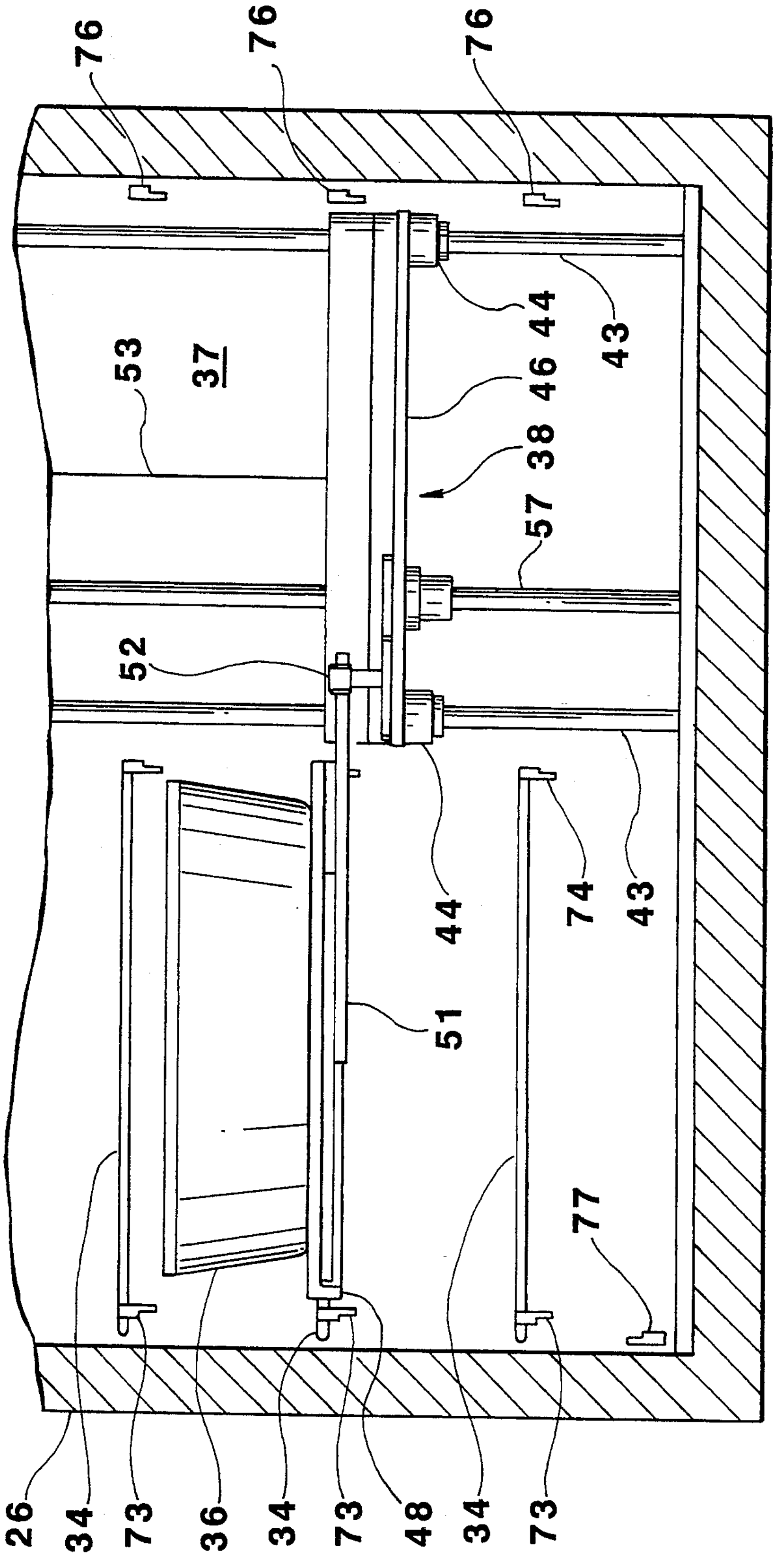
FIG. 19 is a further partial sectional side elevational view of the heating cabinet illustrating operation of the elevator.
Figure 20:
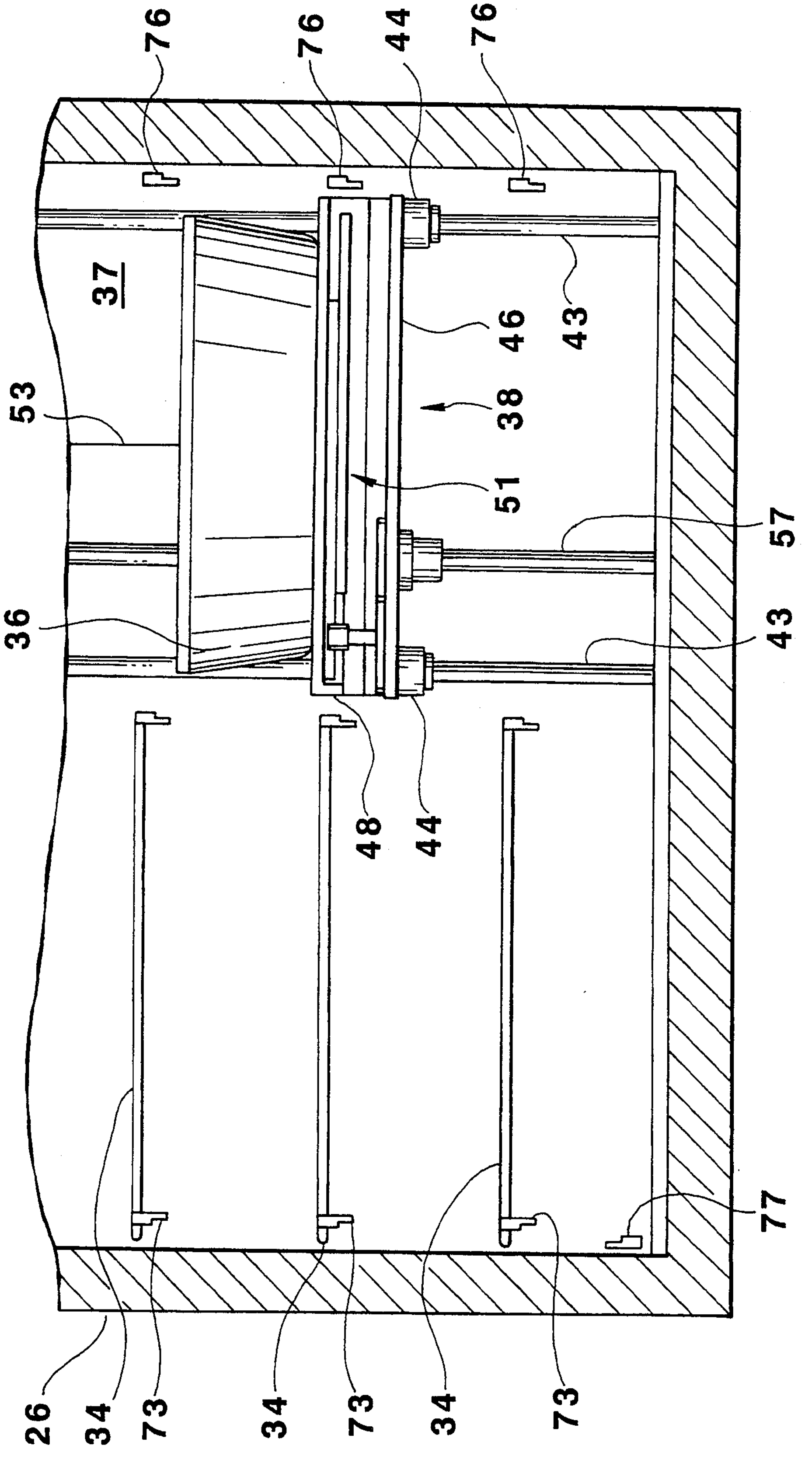
FIG. 20 is a still further partial sectional side elevational view of the heating cabinet illustrating operation of the elevator.

Soon, the latch pin 69 of the first rack 66 is contacted with the second rack 67 so that the second rack 67 also begins to move in the direction toward the shelf 34 (condition of FIG. 12). When the second rack 67 thus moves, it is disengaged from the latch cam 70, and consequently, the latch cam 70 is pivoted by the latch spring 71 into meshing engagement with the latch pin 69. Consequently, the first and second racks 66 and 67 are operatively coupled to each other (condition of FIG. 13). In this condition, the dimension of an overlapping region of the meshing teeth 66A and 67A of the racks 66 and 67 has its minimum value, and accordingly, the total dimension of the racks 66A and 67A is at its maximum value. Due to the stroke, the movable section 48 can be advanced to the interior of the shelf 34.

When the pinion 52 is rotated further from this condition, the meshing teeth 67A of the second rack 67 also are soon put into meshing engagement with the pinion 52 below the meshing teeth 66A (condition of FIG. 14), and the rack apparatus 51 is further moved in the direction toward the shelf 34 until finally only the second rack 67 is moved with the meshing teeth 67A thereof meshed with the pinion 52. Due to such meshing driving relationship between the rack apparatus 51 and the pinion 52, the movable section 48 is advanced to the interior of the shelf 34 just below the food container 36, whereupon the advancement of the movable section 48 is detected by the limit switch 74 and the microcomputer MC stops rotation of the horizontally feeding motor 56 (conditions from FIGS. 15 to 18).

Subsequently, the microcomputer MC energizes the vertically feeding motor 41 to lift the entire elevator 38 a little. Consequently, the movable section 48 is lifted by the elevator 38, whereupon the food container 36 is lifted away from the shelf 34 and thereafter is held on the movable section 48 (condition shown in FIG. 19).

Thereafter, the microcomputer MC energizes the horizontally feeding motor 56 to rotate but now in the reverse direction so that the movable section 48 is retracted in the direction toward the base 46 from the location of the shelf 34 by reverse driving operation of the rack apparatus 51 and the pinion 52 compared to that described above. When the movable section 48 quickly comes to the position overlapping with the base 46 by such retracting operation, this is detected by the limit switch 76, and consequently, the microcomputer MC stops the horizontally feeding motor 46 (condition of FIG. 20). During the retracting motion, the two racks 66 and 67 are put into an overlapping condition with each other again by the resilient force of the spring 68 to reduce the total length of them until they can be accommodated fully between the base 46 and the movable section 48. Accordingly, the racks 66 and 67 will not interfere with the elevator 38 when the elevator 38 moves upwardly or downwardly.

After the elevator 38 has taken out the desired food container 36 in this manner, the microcomputer MC energizes the vertically feeding motor 41 to rotate again to lift the elevator 38 thereby to lift the food container 36 until the food container 36 is exposed to the opening 24 in such a condition as shown in FIG. 6. Such sequence of operations are performed similarly with the refrigerating cabinet 27 or with any other shelf 34. Further, the food container 36 once lifted may be removed after it has been used or alternatively may be returned to its original shelf 34 by means of the elevator 38 or 39 when another dish is selected.

Figure 21:
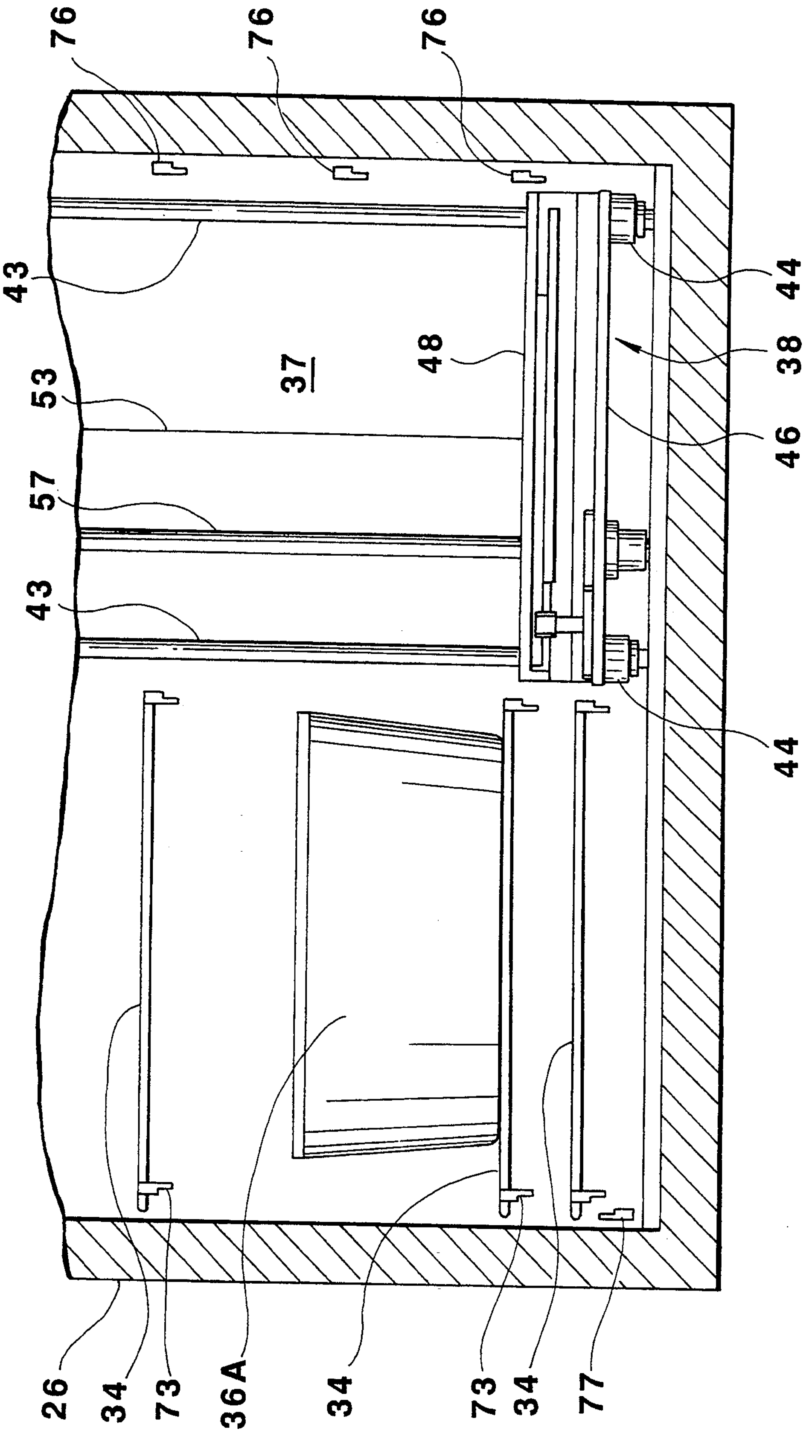
FIG. 21 is a partial sectional side elevational view of the heating cabinet illustrating another manner of use of the heating cabinet.

It is to be noted that, when a rather large food container 36A is to be used, the second shelf 34 from the bottom will be removed and disposed below the lowermost shelf 34 as shown in FIG. 21. Consequently, the container 36A which may have a size up to twice that of the normal food containers 36 can be accommodated to the lowermost shelf 34. On the other hand, when the shelf 34 removed is disposed below the lowermost shelf 34, the cancel switch 77 is operated, and consequently, the microcomputer MC detects that the shelves 34 have been reduced to three stages and controls so that the elevator 38 may not be moved below the lowermost shelf 34.

Figure 24:
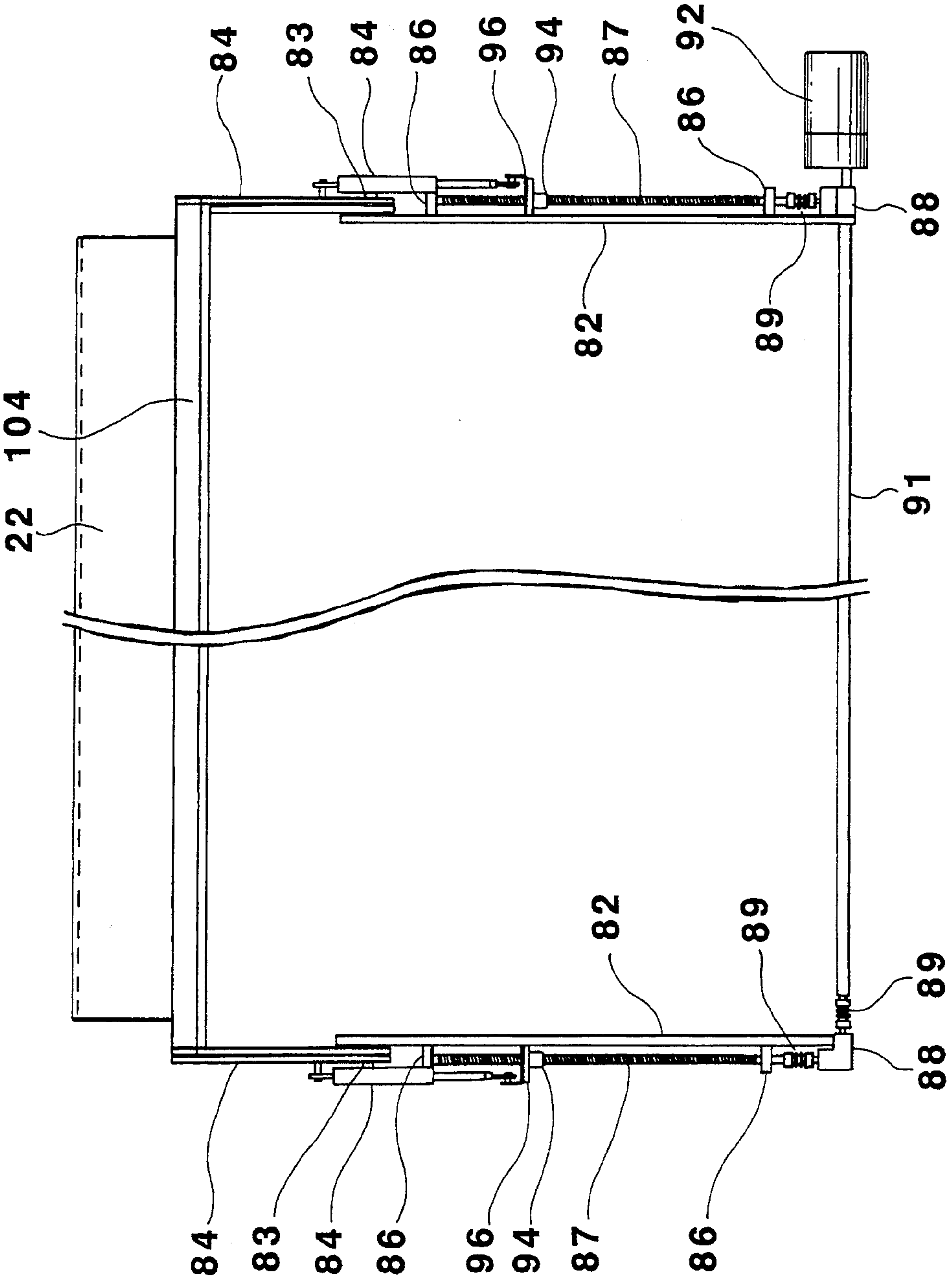
FIG. 24 is a side elevational view of the door apparatus of the table counter.

The dish lifted by the elevator 38 or 39 to the opening 24 or 25 is displayed to those present in the party when the door members 22 of the door apparatus D1 are opened. Subsequently, the door apparatus D1 will be described with reference to FIGS. 22 and 24.

A pair of frames 82 are provided uprightly in the liftable section 19B of the frame 19 at lower locations at a rear end portion of the opening 24 and a front end portion of the other opening 25 of the counter 21, and a pair of support arms 84 are supported for pivotal motion at a fulcrum 83 provided at an upper portion of an outer side face of each of the frames 82. A pair of door frames 104 at lower end portions of the door members 22 are secured at front and rear end portions thereof to ends of the support arms 84, and the fulcra 83 of the support arms 84 are positioned so that they may coincide with the center of arcs of the door members 22. Due to this arrangement, the door members 22 are supported for advancing and retreating motion between a first position in which they extend above the counter 21 farther than the opposite side edges of the opening 79 and can contact with each other above the food displaying section 21A to close up the food displaying section 21A, and a second position in which they are accommodated in the frame 19 below the counter 21 to open the entire food displaying section 21A.

A ball screw 87 is mounted for rotation at a location of each of the frames 82 below the fulcrum 83 by means of a pair of upper and lower bearings 86 and extends in the vertical direction. Each of the ball screws 87 is connected at a lower end thereof to a common motor 92 by way of a bevel gear box 88, a universal joint 89 and a transmission bar 91 so that the ball screws 87 may be rotated in a synchronized relationship with each other by rotation of the motor 92. A ball nut 94 is held in meshing engagement with each of the ball screws 87, and a horizontally extending pushing plate 96 is secured to each of the ball nuts 84. A pair of upper and lower limit switches 102 and 103 are provided adjacent to a side face of one of the pushing plates 96 such that they may be switched on or off upon upward or downward movement of the pushing plate 96. A pair of gas springs 97 serving as resilient connecting members are secured for pivotal motion at one ends thereof to the opposite side portions of each of the pushing plates 96 while the other ends of the gas springs 97 are secured for pivotal motion to the upper support arms 84. The pushing plates 96 are moved upwardly or downwardly by rotation of the ball screws 87, whereupon the support arms 84 are pivoted in a synchronized relationship with each other by way of the gas springs 97 so that the angles which the supporting arms 84 make with respect to the frames 82 may always be equal to each other. Accordingly, the two door members 22 operate in an interlocking relationship with each other to effect opening or closing motion of the double hinged type. Further, a damper 99 including a spring 98 is provided at the top end of each of the frames 84 above the fulcrum 83 and extends horizontally between the corresponding support arms 84, and each of the support arms 84 has an abutting element 101 for abutting with the damper 99.

Figure 22:
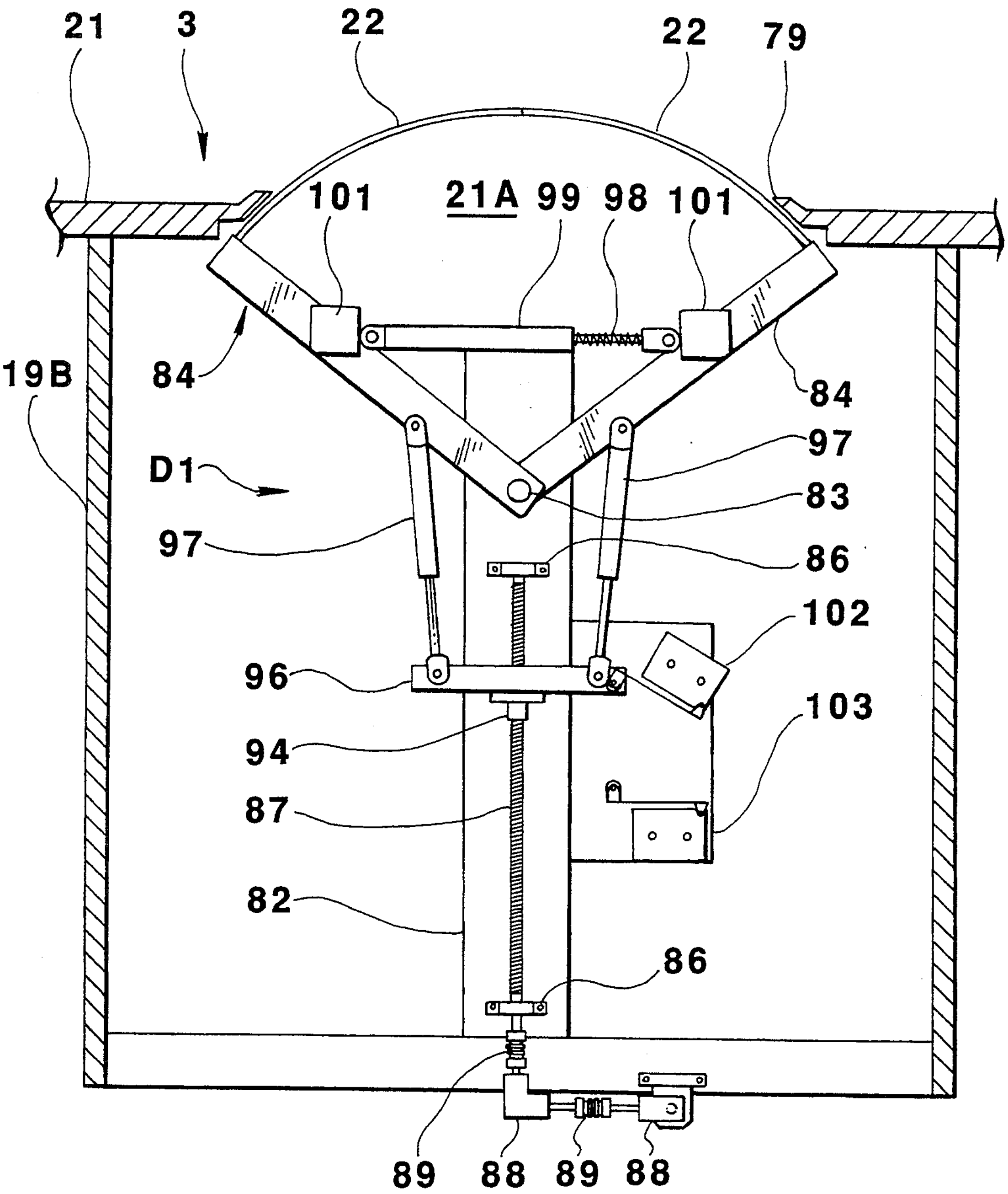
FIG. 22 is a sectional side elevational view of a table counter of the party production apparatus when door members of the table counter are closed.
Figure 25:
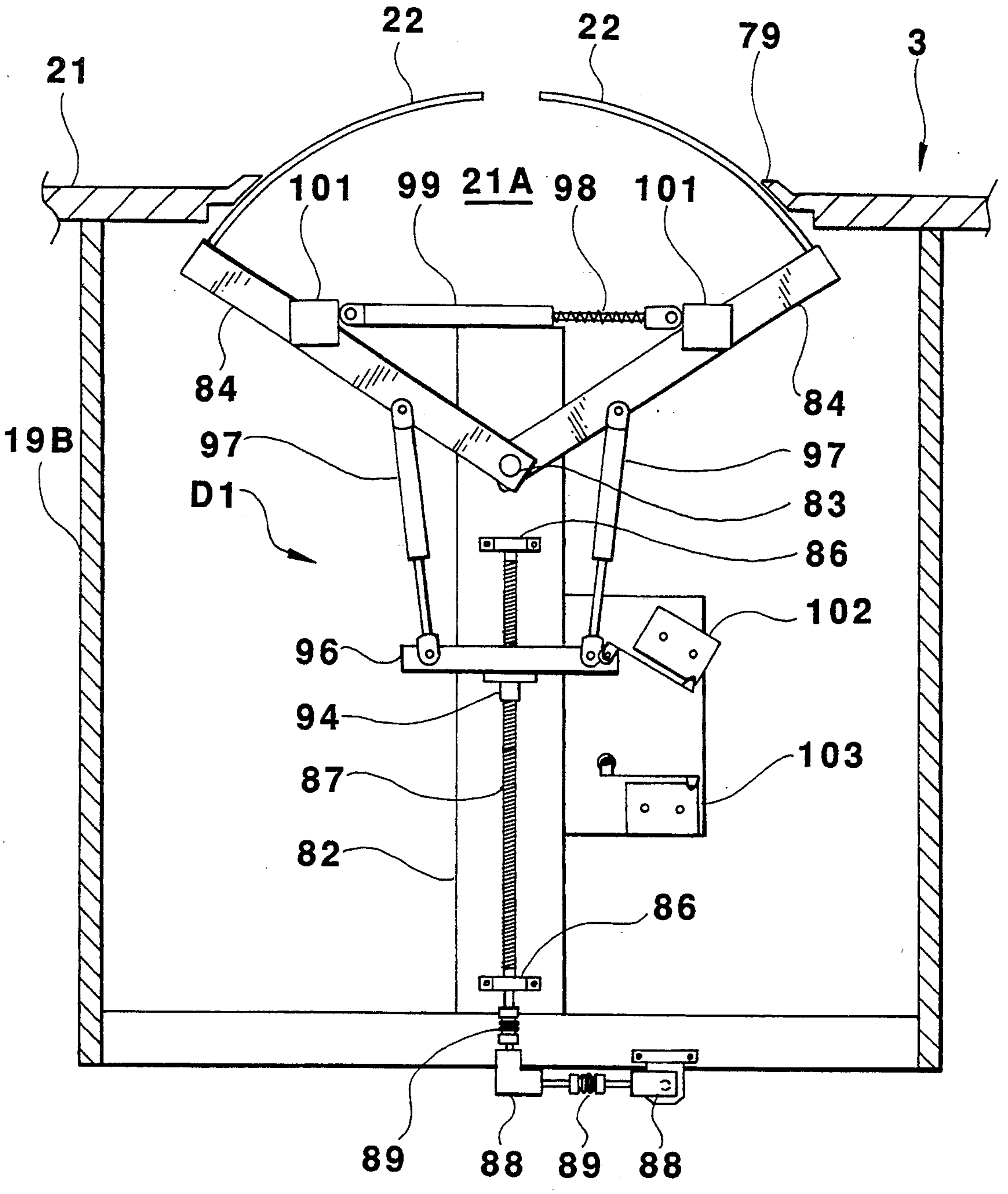
FIG. 25 is a sectional side elevational view of the table counter when the doors are partially open.
Figure 26:
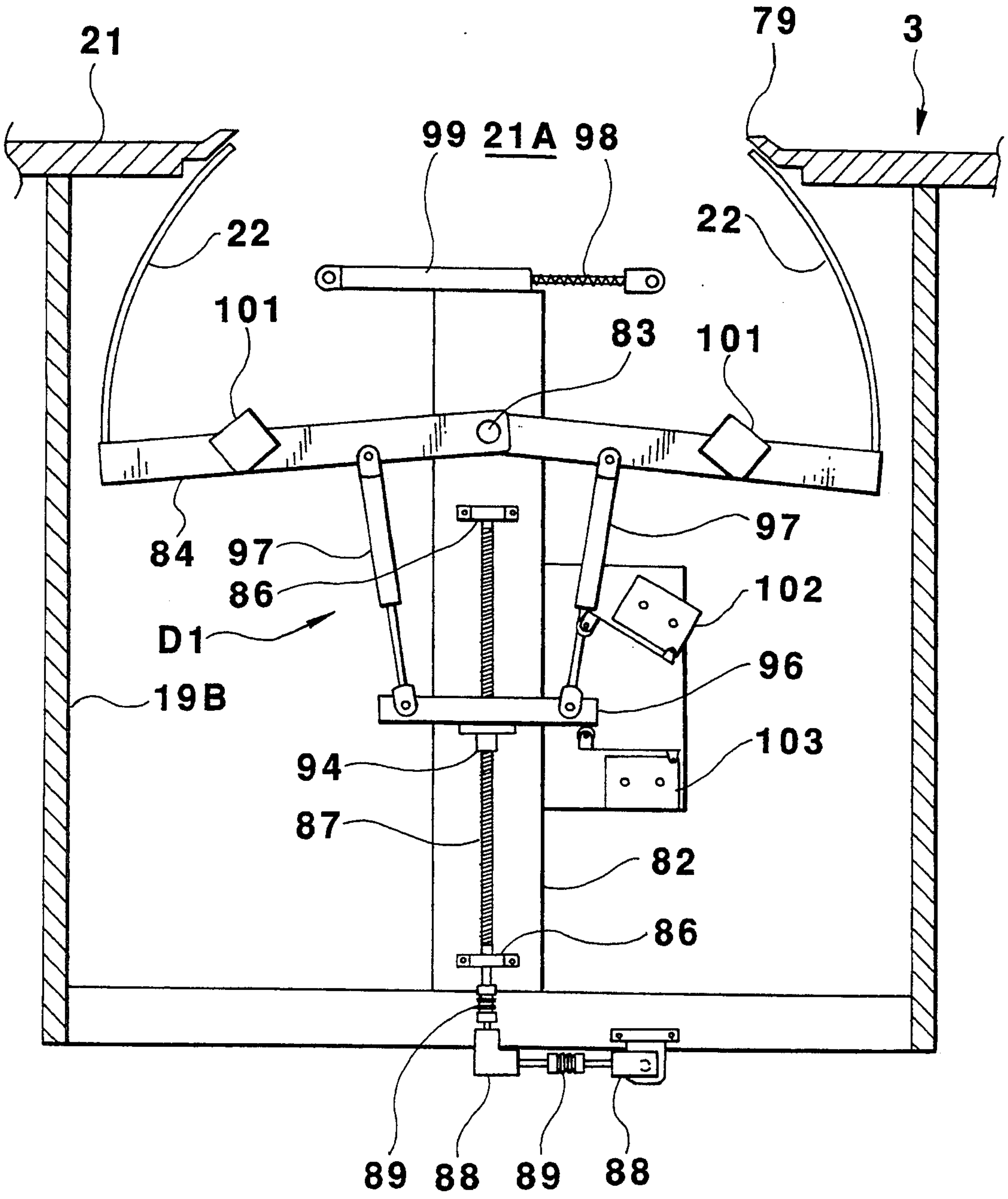
FIG. 26 is a sectional side elevational view of the table counter when the doors are open fully.

Subsequently, operation of the door apparatus D1 will be described with reference to FIGS. 22, 25 and 26. First, in a condition shown in FIG. 22, the door members 22 extend above the counter 21 from the opposite side edges of the opening 79 with the upper ends thereof contacting each other to close the region above the food displaying section 21A. In this condition, the pushing plates 96 are positioned at upper portions of the ball screws 87, and the upper limit switch 102 contacts with the corresponding pushing plate 96. Meanwhile, the opposite ends of the dampers 99 contact with the abutting elements 101 on the support arms 84.

When the elevator 38 or 39 lifts a food container 36, in which a dish is contained, to the food displaying section 21A from this condition, the microcomputer MC energizes, in accordance with the program or in response to depression of a switch 147 provided on the operating switch section 10, the motor 92 to rotate the ball screws 87 in the clockwise direction as viewed from below, that is, in a direction in which the ball screws 87 are screwed into the ball nuts 94. Since the ball nuts 94 and the pushing plates 96 are moved down by rotation of the ball screws 87, the support arms 84 are pivoted in a downward direction by way of the gas springs 97 as seen in FIG. 25, whereupon the abutting elements 101 are spaced away from the dampers 99. Then, when the lower limit switch 103 is soon contacted and switched on by the corresponding pushing plate 96, the microcomputer MC detects this and stops the motor 92. In this instance, the door members 22 are accommodated in the frame 19 below the counter 21 as shown in FIG.

Figure 23:
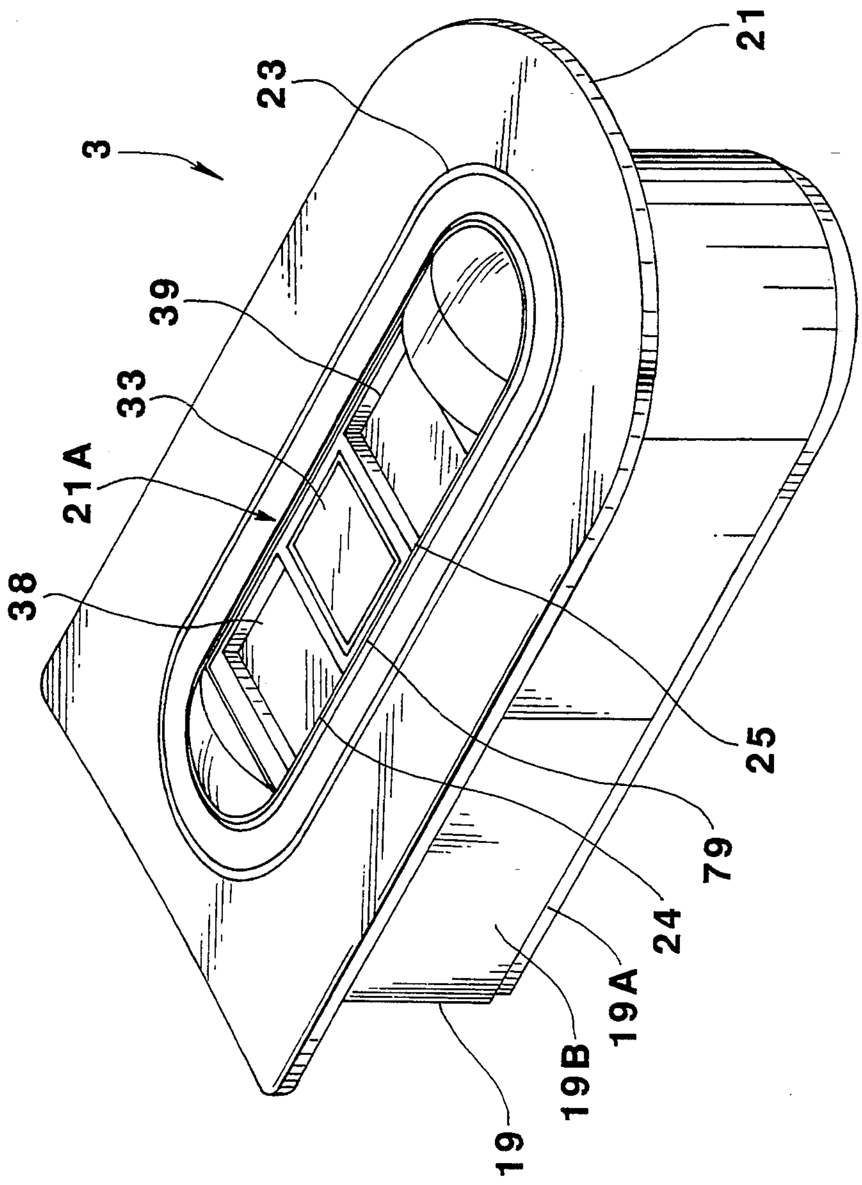
FIG. 23 is a perspective view of the table counter of FIG. 22 when the door members are open.

26, whereupon the end portions thereof are positioned adjacent the edges of the opening 79 to open the entire food displaying section 21A as shown in FIG. 23. It is to be noted that the gas springs 97 maintain their extended conditions while the dampers 99 are returned to the original conditions in which they are extended by the return springs 98.

Several dishes are thus displayed in the food displaying section 21A, and those present at the party will take out the dishes from the food displaying section 21A. In this instance, since the door members 22 fully open the food displaying section 21A, as shown in FIG. 23, the dishes can be taken out very smoothly. Further, since the door members 22 are accommodated below the counter 21, they will not interfere with anything on the counter 21. Additionally, since the door members 22 are automatically opened by the motor 92, such a cumbersome operation as to open the door members 22, for example, using one hand while some dish is held by the other hand, is eliminated.

Then, when the door members 22 are to be closed, the microcomputer MC now energizes the motor 92 to rotate the ball screws 87 in the opposite direction, that is, in a direction to pull off the ball screws 87 from the ball screws 94. Since the ball nuts 94 and the pushing plates 96 are moved up by such rotation of the ball screws 87, the support arms 84 are pivoted in a direction in which they are pushed up as shown in FIG. 25 by way of the gas springs 97, so that the upper ends of the door members 22 come out from the opening 79. Then, when the door members 22 come to a position immediately before the ends of the door members 22 are abutted with each other, the abutting elements 101 are abutted with the opposite ends of the dampers 99.

Since the dampers 99 are acted upon by a force in a compressing direction at the opposite ends thereof after they are abutted by the abutting elements 101, they exhibit a predetermined resisting force to the force in the compressing direction so that they act so as to reduce the pivoting speed of the support arms 84 to moderate the closing force of the door members 22. Consequently, the impact when the door members 22 abut with each other is moderated to prevent possible damage which might otherwise occur and thereby minimizing possible damage to a hand or an arm of a person should it be held unintentionally between the door members 22.

Meanwhile, since pivotal motion of the support arms 84 is prevented by the abutment of the dampers 99, operations of the support arms 84 and the pushing plates 96 are displaced from each other such that the operation of the support arms 84 is delayed, and consequently, this acts as a load to the motor 92. However, the displacement between the operations is absorbed by the gas springs 97. In particular, when the pivotal motion of the support arms 84 is delayed from the upward movement of the pushing plates 96, a force in a compressing direction is applied to the gas springs 96. The gas springs 97 are contracted due to their resiliency by the force, thereby eliminating an otherwise possible overload to the motor 92.

It is to be noted that the motor 92 is stopped by the microcomputer MC when the upper limit switch 102 is abutted and switched on by the corresponding pushing plate 96. The dampers 99 are thereafter compressed gradually while also the gas springs 97 are extended and the door members 22 are abutted with each other to close the location above the food displaying section 21A as shown in FIG. 22. Further, in the embodiment shown, since the driving force of the motor 92 is transmitted to the supporting arms 84 by way of the ball screws 87 and the ball nuts 94, when compared with an alternative arrangement wherein the door members 22 are driven by the motor by way of, for example, a wire or the like, there is no need of taking into consideration an error of the wire caused by elongation and so forth, and there is an advantage that operation is made sure.

Subsequently, the structure of the show-cases 12 and 13 will be described with reference to FIGS. 27 to 30. It is to be noted that, since the show-cases 12 and 13 have a similar structure, description will be given only of the show-case 12. Further, FIGS. 27 to 30 show only the show-case 12 extracted from the party production apparatus 1, and actually, the show-case 12 (also the show-case 13) is incorporated in the kitchen counter 2 of the party production apparatus 1.

Figure 27:
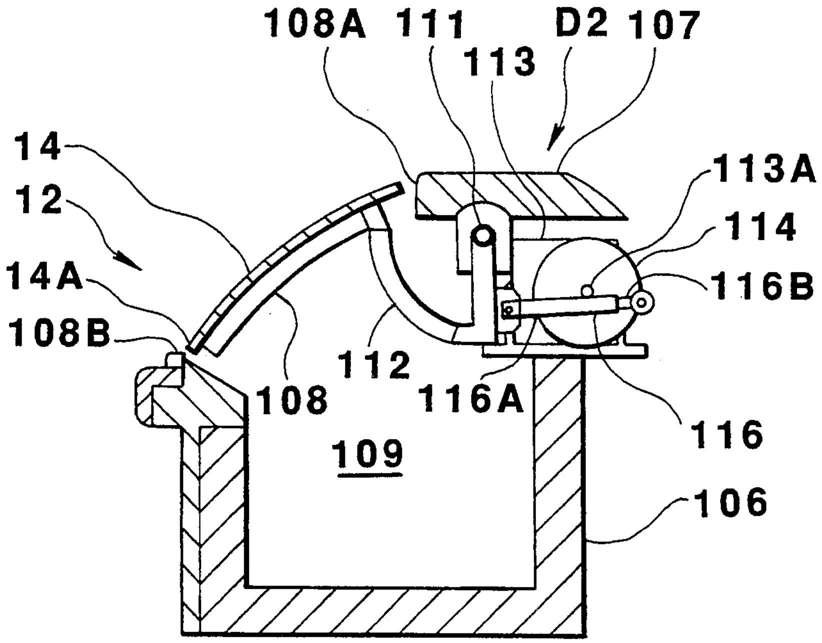
FIG. 27 is a sectional side elevational view of a show-case of the party production apparatus when a door of the show-case is closed.
Figure 28:
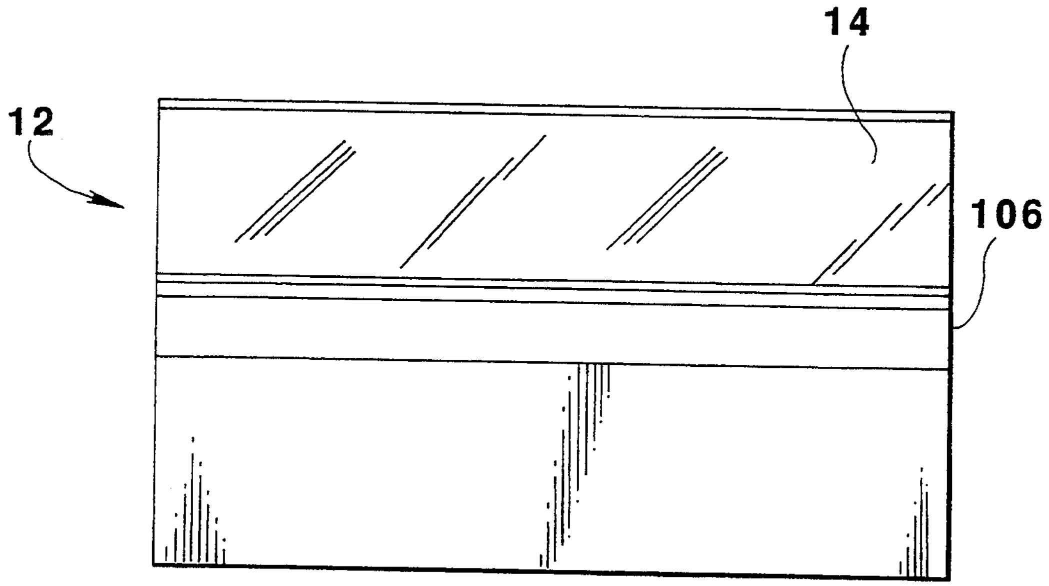
FIG. 28 is a front elevational view of the show-case.
Figure 29:
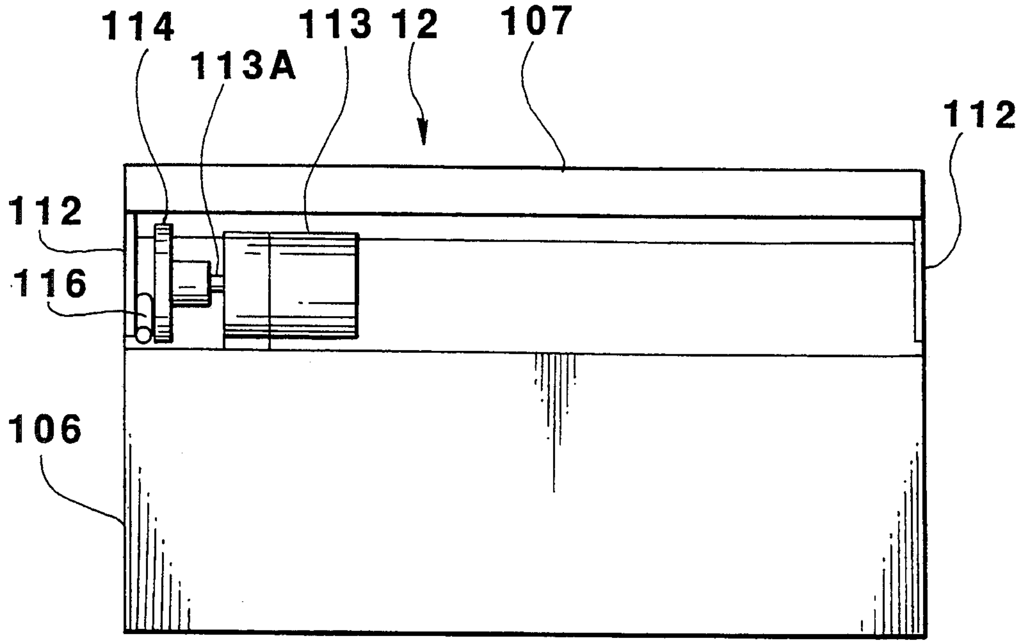
FIG. 29 is a rear elevational view of the show-case.
Figure 30:
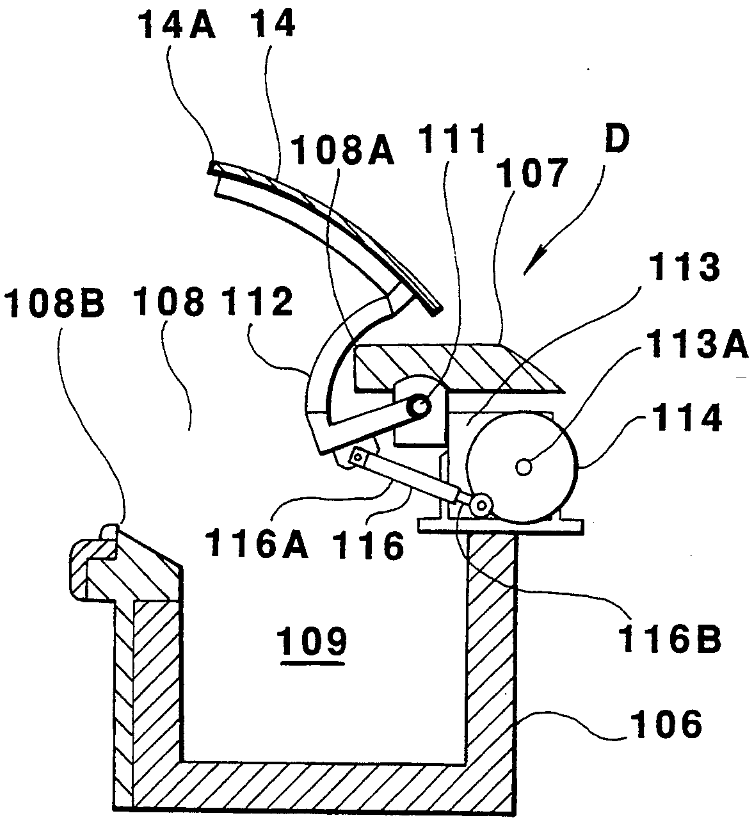
FIG. 30 is a sectional side elevational view of the show-case when the door is open.

The show-case 12 includes a heat insulating upper structure 107 mounted at a front portion and an upper portion of a horizontally elongated heat insulating box member 106 which is open at the top thereof. The upper structure 107 has an opening 108 of a substantially sectoral shape which is open forwardly and upwardly. A storage chamber 109 is formed in the heat insulating box member 106 and is cooled by an electronic cooling apparatus such as a thermo-module (not shown) which makes use of a peltier effect, and food such as fruit, small dishes and so forth are accommodated and displayed in the storage chamber 109. The opening of the show-case 12 is opened or closed by a door member 14 of the upwardly open type having a curved sectional shape. A pair of arms 112 are attached to the opposite sides of the door member 14 and are supported for pivotal motion on a pivot shaft 111 located rearwardly of an upper edge 108A of the opening 108. Consequently, the door member 14 is supported for pivotal motion in upward and downward directions around the pivot shaft 111, and it opens the opening 108 when it is pivoted upwardly as shown in FIG. 30, but when it is pivoted downwardly, a lower edge 14A thereof is positioned in the proximity of or contacts with a lower edge 108B of the opening 108 to close the opening 108 as shown in FIG. 27.

It is to be noted that the door member 14 is formed from a liquid crystal glass plate and exhibits a milk-white color in its normal condition, but exhibits a transparent condition when a voltage is applied thereto, thereby to allow food and so forth in the inside to be visually observed from the outside. Consequently, the inside of the show-case 12 can be displayed to those present in the party in accordance with the procedure of the party, thereby achieving enhancement of the party producing effect.

A motor 113 is disposed between a side portion of a rear upper end of the heat insulating box member 106 and the upper structure 107. The motor 113 is disposed such that a rotary shaft 113A thereof lies in a horizontal direction, and a rotary disk 114 is mounted coaxially on the rotary shaft 113A. Further, a damper 116 serving as a connecting member is mounted on and extends between the rotary disk 114 and one of the arms 112, and a door apparatus D2 includes the door member 14, the motor 113, the rotary disk 114 and the damper 116.

The damper 116 comprises a cylinder portion 116A and a rod portion 116B inserted for sliding movement in the cylinder portion 116A. The cylinder portion 116A is secured at an end portion thereof for pivotal motion on the corresponding arm 112 while an end portion of the rod portion 116B is secured for pivotal motion to a circumferential face of the rotary disk 114. The damper 116 has an air inlet port (not shown) formed, for example, at the cylinder portion 116A thereof and includes an air valve having a small hole for opening and closing the air inlet port. When a force acts to pull out the rod portion 116B from the cylinder portion 116A to extend the damper 116, the air valve opens the air inlet port to allow the damper to be extended freely, but when the opposite force acts to insert the rod portion 116B into the cylinder portion 116A to contract the damper 116, the air valve closes the air inlet port so that air in the cylinder portion 116A is allowed to escape only through the small hole so as to exert a predetermined resisting force.

Subsequently, opening and closing motion of the door member 14 will be described. It is to be noted that opening or closing of the door member 14 is operated by a switch 148 provided on the operating switch section 18. In a condition wherein the door member 14 closes the opening 108 as shown in FIG. 27, the damper 116 is in a contracted condition in which the rod portion 116B is inserted in the cylinder portion 116A, and the position at which the rod portion 116B is mounted on the rotary disk 114 is positioned substantially opposite to the rotary shaft 113A of the motor 113 as viewed from the door member 14. When the switch 148 of the operating switch section 18 is depressed in this condition, then the motor 113 is energized to rotate in the clockwise direction in FIG. 27. Since the damper 116 is moved forwardly by such rotation of the motor 113, the arms 112 are pushed up to pivot around the rotary shaft 111. The door member 14 is lifted by the pivotal motion of the arms 112 to open the opening 108 as shown in FIG. 30. It is to be noted that the motor 113 is stopped at a predetermined rotational angle and thereafter maintains its position.

When the door 14 is to be closed, the motor 113 is energized to rotate now in the counterclockwise direction in FIG. 27. The damper 116 is moved rearwardly by the rotation of the motor 113, and the arms 112 are pulled down by the damper 116, whereupon the door member 14 is also moved down to close the opening 108. It is to be noted that the motor 113 is stopped in a condition in which the door member 14 closes the opening 108.

During the opening or closing motion described above, since the weight of the door member 14 acts upon the damper 116 in a direction to contract the damper 116, the damper 116 transmits the driving force of the motor 113 to the door member 14 while it normally remains in the contracted condition.

Here, if, in the course of the closing motion of the door member 14, a hand or an arm of a person present in the party interferes with the lower edge 14A of the door member 14 to stop the turning motion of the door member 14, then the driving force of the motor 13 acts upon the damper 116 in a direction to pull out the rod member 116B from the cylinder portion 116A. However, since the rod portion 116B can be pulled out from the cylinder portion 116A when the damper 116 is to be extended as described above, the driving force 113 is absorbed by extension of the damper 116. Accordingly, the impacting force applied to the hand or the arm in contact with the lower edge 14A of the door member 14 is moderated, and since also the load to the motor 113 is moderated, the life of the motor 113 will not be deteriorated. Also when a hand or an arm is held between the lower edge 14A of the door member 14 and the lower edge 108 of the opening 108, there is no possibility that it may be held tighter by the driving force of the motor 113.

In the meantime, since the damper 116 can be extended freely, the door member 14 can be opened freely by lifting the lower edge 14A thereof. Accordingly, even when a hand or an arm is held between the lower edge 14A of the door member 14 and the lower edge 108B of the opening 108 as described above, it can be pulled off readily by manually lifting the door member 14.

Further, when the door member 14 is opened manually in this manner, if the hand is released from the door member 14, the door member 14 will thereafter be moved down in its closing direction by its own weight, but in this instance, some resistance is exhibited since a force in the contracting direction is applied to the damper 116. Accordingly, the door member 14 will not be closed powerfully but will be closed gradually, and consequently, the possibility that a hand or an arm may be caught by the door member 14 is low. Also the impact applied to the door member 14 when it is closed is moderated, and also occurrence of damage to the liquid crystal glass of the door member 14 is prevented. It is to be noted that the structure of the damper 116 is not limited to such an air damper as in the embodiment described above but may be constituted from, for example, an oil damper in which oil is enclosed, or a like damper.

Figure 31:
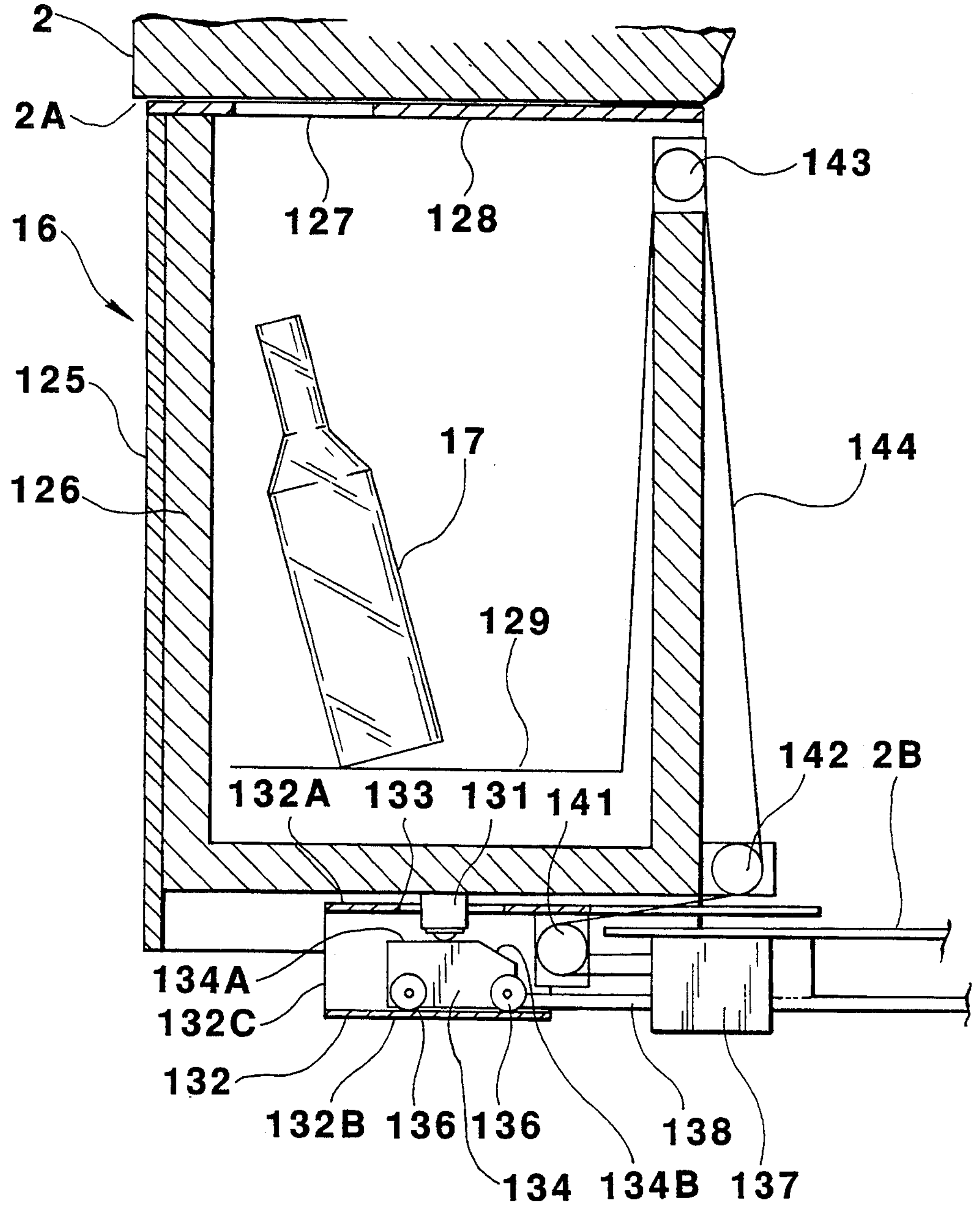
FIG. 31 is a sectional side elevational view of a drink case portion of a kitchen counter of the party production apparatus.

Referring now to FIG. 31, each of the drink cases 16 in the form of a container is provided to store therein and offer drinks 17 such as bottled wine. Each of the drink cases 16 is constructed from a heat insulating box member 126 which has an outer plate 125 provided thereon and is open at the top thereof, a cover 128 having a plurality of take-out holes 127 formed therein and adapted to close the top opening of the heat insulating box member 126, and an article receiving liftable shelf 129 disposed for upward and downward movement in the heat insulating box member 126. The inside of the heat insulating box member 126 of each of the drink cases 16 is cooled by an electronic cooling apparatus similar to that described hereinabove and serving as a temperature controlling apparatus. Thus, the inside of the heat insulating box member 126 is cooled to and maintained at a predetermined cooling temperature, for example, to +10° C. suitable for wine under the control of the microcomputer MC which will be hereinafter described. A downwardly extending projection 131 is mounted on the bottom face of the heat insulating box member 126.

A receiving member 132 is disposed below the heat insulating box member 126 and includes an upper wall 132A having an opening 133 formed therein, a lower wall 132B and a front wall 132C. The receiving member 132 is mounted for outwardly advancing and inwardly retracting movement with respect to the kitchen counter 2, and a push out member 134 is inserted in the receiving member 32 from the kitchen counter 2 side. The push out member 134 is movable on the lower wall 132B by means of wheels 136 and has a flat upper face 134A and an inclined face 134B which is provided rearwardly of the flat upper face 134A and inclined rearwardly downwardly. The push out member 134 is attached to an end of a push out bar 138 which is secured to a base 2B of the kitchen counter 2 and is driven to be advanced and retracted by a motor 137 constituting a driving apparatus.

A pulley 141 is mounted on the upper wall 132A of the receiving member 132, and a pair of pulleys 142 and 143 are mounted at a lower end portion and an upper end portion of a rear wall of the heat insulating box member 126. A wire 144, constituting an interlocking apparatus, extends between and along the pulleys 141, 142 and 143 and is connected at one end thereof to the motor 137 and at the other end thereof to the liftable shelf 129.

Subsequently, operation will be described. In a condition wherein the drink case 16 is accommodated in the recess 2A of the kitchen counter 2 as shown in FIG. 31, the projection 131 of the heat insulating box member 126 passes through the opening 133 of the upper wall 132A of the receiving member 132 and contacts for sliding motion with the upper face 134A of the push out member 134, and the heat insulating box member 126 is received on and lifted by the push out member 134 such that the cover 128 on the upper face thereof contacts closely with the upper face of the recess 2A and the take out holes 127 are closed by the upper face of the recess 2A. Meanwhile, the liftable shelf 129 is lowered to a lower position in the inside of the heat insulating box member 126, and the drinks 17 are received on the liftable shelf 129 and accommodated in the heat insulating box member 126. In this condition, the inside of the heat insulating box member 126 is substantially closed up and the drinks 17 are cooled to and stored at the cooling temperature by the electronic cooling apparatus described hereinabove.

Figure 32:
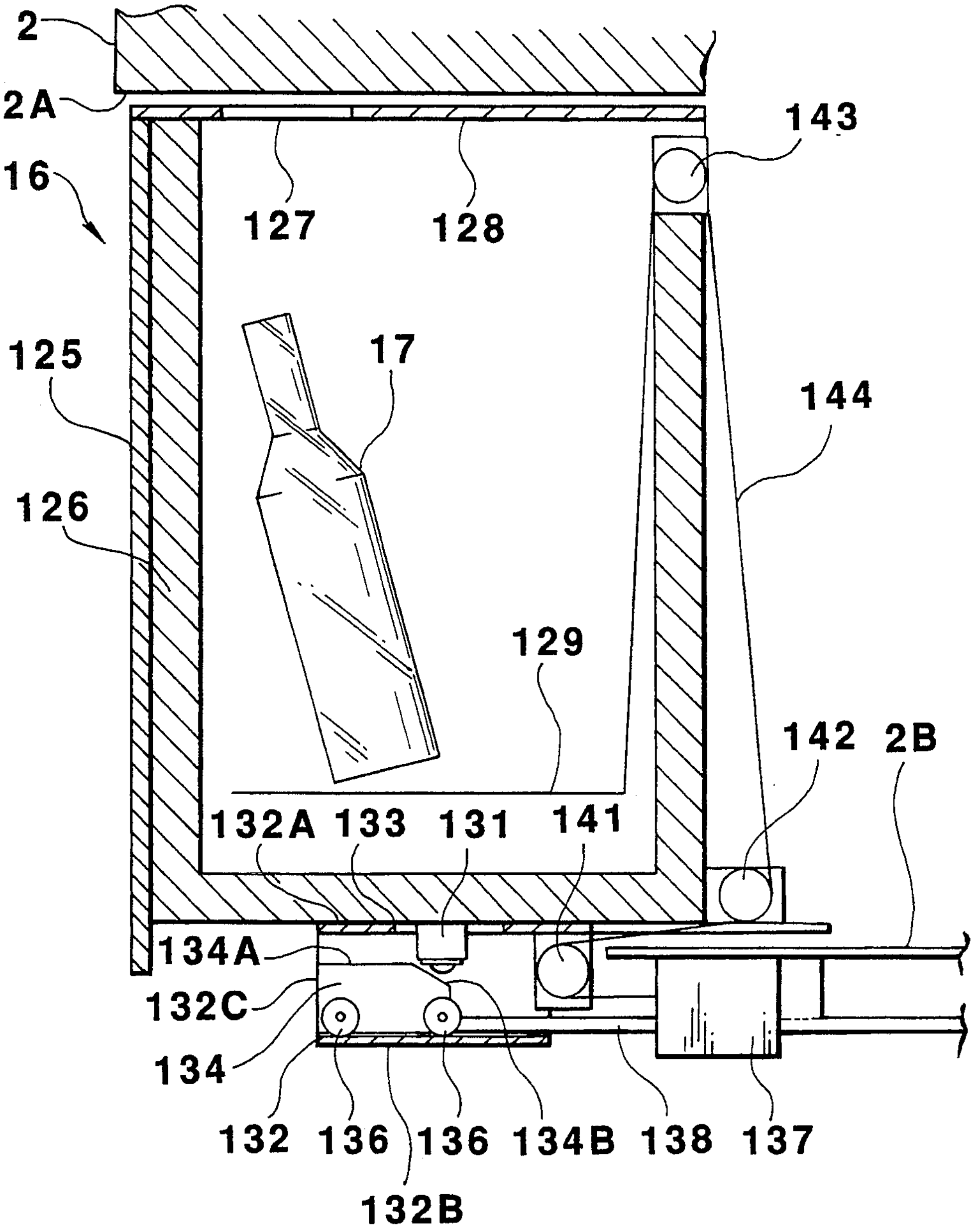
FIG. 32 is a sectional side elevational view of the drink case portion of the kitchen counter illustrating operation of the drink case.

Then, if a switch 149 provided on the operating switch section 18 is operated, then the motor 137 is energized to push out the pushing bar 138 in a direction toward the outside of the kitchen counter 2. Consequently, the projection 131 begins to move in the leftward direction in FIG. 31. At an initial stage of the leftward movement of the projection 131, the projection 131 is engaged with the inclined face 134B of the push out member 134 and thereafter moves down along the inclined face 134B as seen in FIG. 32. Since also the entire drink case 16 moves down by the downward movement of the projection 131, the cover 128 is spaced away from the top face of the recess 2A while the lower face of the heat insulating box member 126 rides onto the upper wall 132A of the receiving member 132 and is thereafter kept as it is. Further, the push out member 134 is abutted with the front wall 32C of the receiving member 132.

Figure 33:
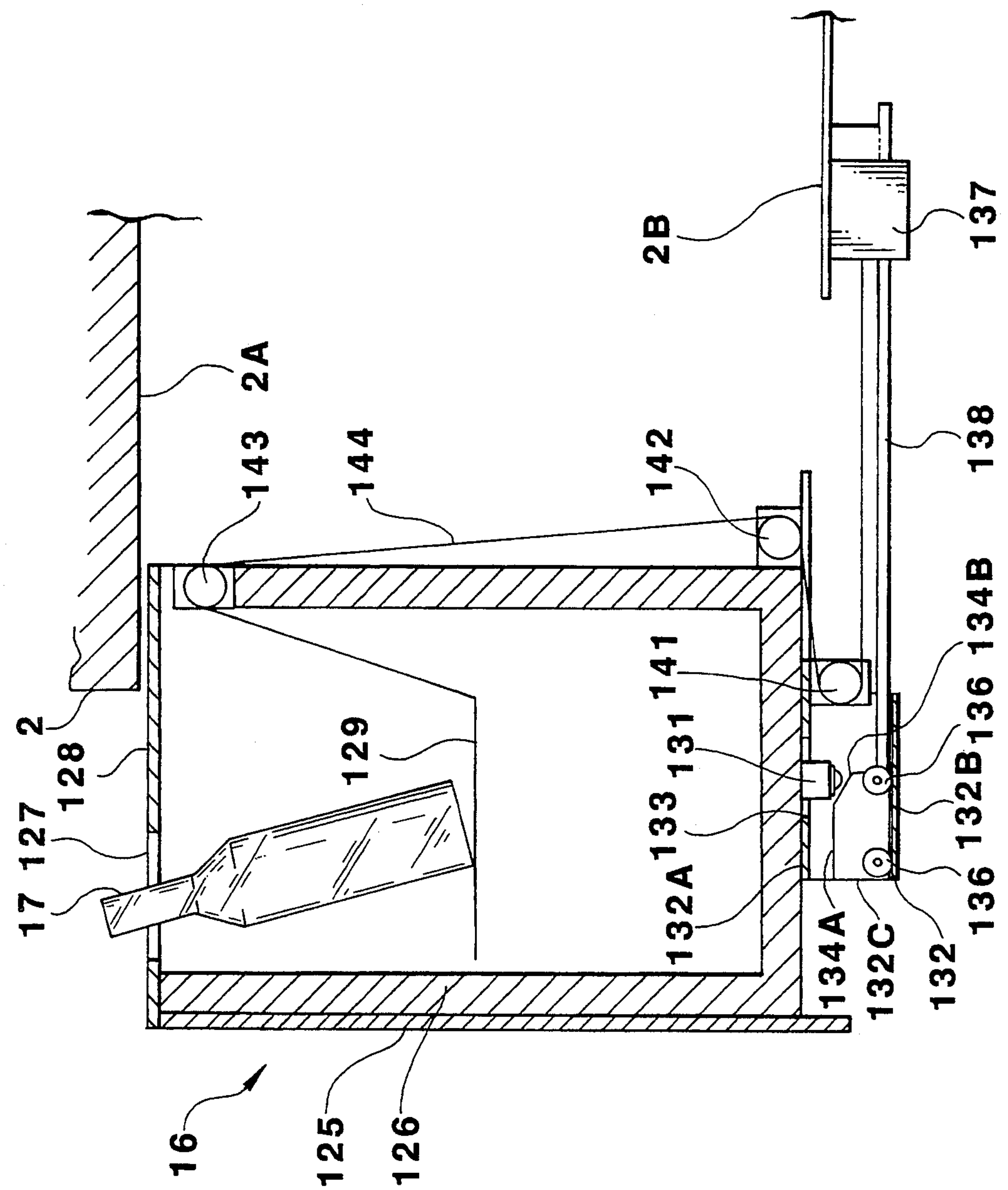
FIG. 33 is a sectional side elevational view of the drink case portion of the kitchen counter when the drink case is advanced.

The motor 137 is further energized in this condition, and thereupon, the push out member 134 is pushed out to the outside of the kitchen counter 2 by way of the push out bar 138. Consequently, the receiving member 132 is pushed out to the outside of the kitchen counter 2 and also the drink case 16 is advanced outwardly of and exposed outside the kitchen counter 2 as shown in FIGS. 1 and 33, and as a result, also the take out holes 127 of the cover 128 are opened upwardly. Since the pulley 141 is spaced away from the motor 137 by the movement of the receiving member 132 described above, the wire 144 is pulled to the kitchen counter 2 side relatively as viewed from the heat insulating box member 126, and consequently, the liftable shelf 129 is lifted. Also the drinks 17 are lifted by the lifting movement of the liftable shelf 129 until upper portions thereof project upwardly through and above the take out holes 127 (refer to FIGS. 1 and 33), and in this condition, the motor 17 is stopped. The sponsor of or a person present in the party will thus take out any of the thus lifted drinks 17 from the take out holes 127 and serve it to drink.

On the other hand, when the drink case 16 is to be retracted to and accommodated into the kitchen counter 2 side, the switch 149 provided on the operating switch section 18 will be operated. In response to the operation of the switch 149, the motor 137 is rotated in the opposite direction to that described above to retract the push out member 134 to the kitchen counter 2 side by way of the push out bar 138. Upon such movement of the push out member 134, the inclined face 134B thereof is contacted with the projection 131 of the heat insulating box member 126, and consequently, upon further movement of the pushing out member 134, the heat insulating box member 126 is also retracted to the kitchen counter 2 side together with the receiving member 132.

During the retracting movement of the heat insulating box member 126, the pulley 141 of the receiving member 132 approaches the motor 137, and accordingly, the wire 144 allows the liftable shelf 129 to be moved down. Accordingly, the drinks 17 are also moved down and accommodated into the heat insulating box member 126 through the take out holes 127. Consequently, the drinks 17 will not interfere with the kitchen counter 2.

When the heat insulating box member 126 quickly comes back to its predetermined position in the recess 2A, it will not thereafter be moved backwardly any more, but the microcomputer MC continues to energize the motor 137 to further retract the push out member 134. Accordingly, at a final stage, the projection 131 is moved upwardly along the inclined face 134B, and consequently, the heat insulating member 126 is also moved up until the upper cover 128 therefor is contacted closely with and closed by the upper face of the recess 2A as shown in FIG. 31. The motor 137 is stopped then. The drink cases 16 are accommodated into side of the kitchen counter 2 by the sequence of operations described above.

While the operations of the various functions of the party production apparatus 1 have been described individually so far, controlling operation of the controlling apparatus C shown in FIG. 2 in accordance with the sequence of a party program will be described subsequently.

Figure 2:
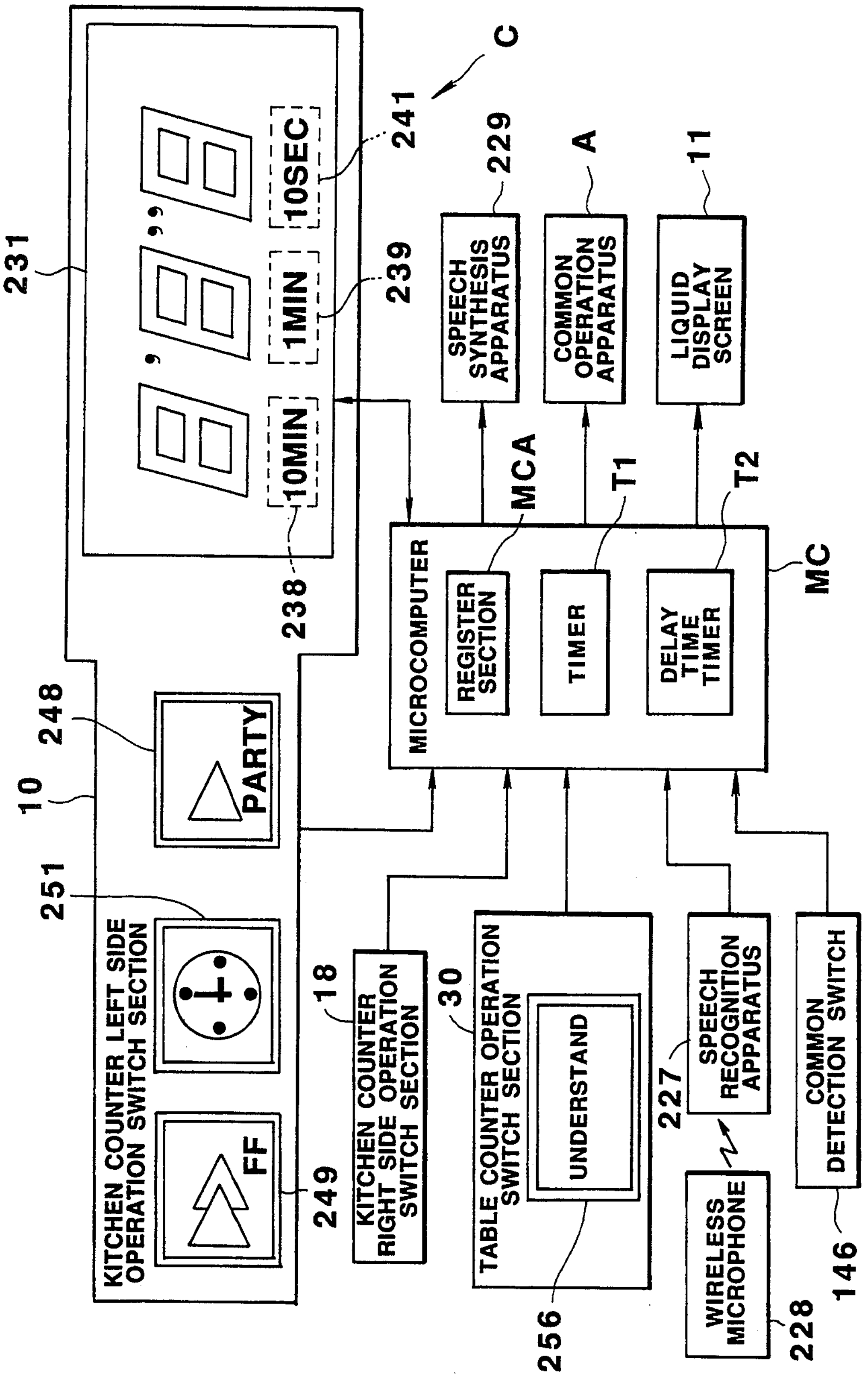
FIG. 2 is a block diagram of a control apparatus of the party production apparatus.

Referring to FIG. 2, the microcomputer MC for general purpose includes a register section MCA serving as register means, and a timer T1 and a delay time timer T2. Outputs of the left and right side switch sections 10 and 18 of the kitchen counter 2 are inputted to the microcomputer MC, and also an output from the operating switch section 30 on the table counter 3 and an output of a speech recognizing apparatus 227 are inputted to the microcomputer MC. The speech recognizing apparatus 227 comprises a speech recognizing LSI (large scale integrated circuit) including a speech inputting section, a standard pattern memory section and a pattern matching section, and a wireless microphone 228 having, for example, a pin microphone and serving as an instructing section, is carried by an instructor or one of several instructors (a single or a plurality of persons present in the party) whose standard speech patterns are stored in advance in the standard pattern memory section such that a signal of the wireless microphone 228 may be inputted to the speech inputting section. Further, an output of a general detecting switch 146, which representatively indicates the switches 73 to 78 and the upper and lower limit switches 102 and 103, is inputted to the microcomputer MC. Further, connected to outputs of the microcomputer MC are a general operating apparatus A which representatively indicates the liquid crystal display screen 11, the vertically feeding motors 41 and 42, the horizontally feeding motor 56, the motors 92, 113 and 137, the transport rail 23 and so forth, a speech synthesizing apparatus 229, and a time displaying section 231 provided on the operating switch section 10 and serving as display means.

Here, the operating switch sections 10, 18 and 30 will be described with reference to FIGS. 34 to 36. Referring to FIG. 34, reference numeral 232 denotes a memory card insertion opening, and registration of a party program into the register section MCA (RAM) of the microcomputer MC can be executed only by inserting the memory card, in which the party program is programmed in advance, into the memory card insertion opening 232. Reference numeral 233 denotes a registration button, which is depressed when registration of a party program into the registration section MCA is to be executed, and the microcomputer MC enters a registration mode upon depression of the registration button 233. Reference numeral 234 denotes a BGM (background music) ON button, and when the BGM ON button 234 is depressed, music set in a CD (compact disk) player (not shown) is played. Reference numeral 236 denotes a celebration button, and when the celebration button 236 is depressed, a message registered in advance in the registration section MCA is displayed on the liquid crystal display screen 11. Reference numeral 237 denotes a "space" or interval button, which is provided to set a mealtime (eating time) in a party in combination with a ten minute button 238, a one minute button 239 and a ten second button 241 provided correspondingly below the time displaying section 231. Reference characters 242A to 242D each denote a cool dish lifting button for lifting a cool dish in the refrigerating cabinet 27 into the food displaying section 21A by means of the elevator 29, and the cool dish lifting buttons 242A to 242D are provided corresponding to the first to fourth cool dishes from the top. Reference numeral 243 denotes a cool dish recovery button for lowering a cool dish or dishes in the food displaying section 21A. Reference characters 244A to 244D each denote a warm dish lifting button for lifting a warm dish in the heating cabinet 26 into the food displaying section 21A by means of the elevator 38, and the warm dish lifting buttons 244A to 244D are provided corresponding to the first to fourth warm dishes from the top. Reference numeral 246 denotes a warm dish recovery button for lowering a warm dish or dishes in the food displaying section 21A. Further, reference numeral 247 denotes an end button, which is depressed when an operation for registration comes to an end.

Reference numeral 248 denotes a party starting button, and when the party starting button 248 is depressed, the microcomputer MC instructs the speech synthesizing apparatus 29 to pronounce "now, lets start the party" and starts execution of the party program registered in advance in the register section MCA. Meanwhile, reference numeral 249 denotes a fast feeding button serving as a fast feeding operating section, and the fast feeding button 249 is provided to skip a time interval subsequent to the point of time when it is depressed. Further, reference numeral 251 denotes a check button serving as confirming operating means, which is provided to confirm a delay of the progress of the party.

Referring now to FIG. 35, reference numeral 252 denotes a transport rail controlling button for controlling operation of the transport rail 23, and reference numerals 253 and 254 denote liquid crystal shutter opening buttons for changing the liquid crystal of the doors 14 of the show-cases 12 and 13 into a transparent condition to allow the insides of the show-cases 12 and 13 to be visually observed therethrough, respectively.

Referring to FIG. 36, the operating switch section 30 of the table counter 3 side includes buttons which exhibits similar functions to those of the operating switch sections 10 and 18 so that a particular operation may also be instructed on the table counter 3 side. The operating switch section 30 particularly includes a pair of understanding buttons 256 disposed on the opposite side portions thereof.

Subsequently, a procedure of registration of a program regarding a party plan into the microcomputer MC by the sponsor will be described with reference to FIG. 37. First, the power source is made available and the registration button 33 of the operating switch section 10 is depressed. Consequently, the microcomputer MC enters a registration mode for a party program. Subsequently, the BGM ON button 234 is depressed and then the celebration button 236 is depressed. Then, the interval button 237 is depressed and the one minute button 239 is depressed once. Subsequently, the first cool dish lifting button 242A is depressed, and further, the space or interval button 237 is depressed, whereafter the ten minute button 238 is depressed twice. Subsequently, the liquid crystal shutter opening buttons 253 and 254 are depressed and the space or interval button 237 is depressed, and then the one minute button 239 is depressed twice. Then, the cool dish recovery button 243 is depressed, and the first warm dish lifting button 244A is depressed, whereafter the space or interval button 237 is depressed and the ten minute button 238 is depressed once. Subsequently, the warm dish recovery button 246 is depressed. Finally, the end button 247 is depressed, thereby completing the operation for entry of the party program.

As a result of the sequence of steps of registration operation described above, such party program is entered into the registration section MCA of the microcomputer MC that, after a party is started, background music is played first and a celebration message is displayed; then, a first cool dish is lifted to the location within the doors 22 by the elevator 39; after lapse of 20 minutes, the liquid crystal of the doors 14 of the show-cases 12 and 13 is changed into a transparent condition and the doors 14 are opened, then after lapse of 2 minutes, the cool dish is lowered and a first warm dish is lifted instead; and after lapse of 10 minutes, the warm dish is lowered, thereby completing the party.

Figure 39:
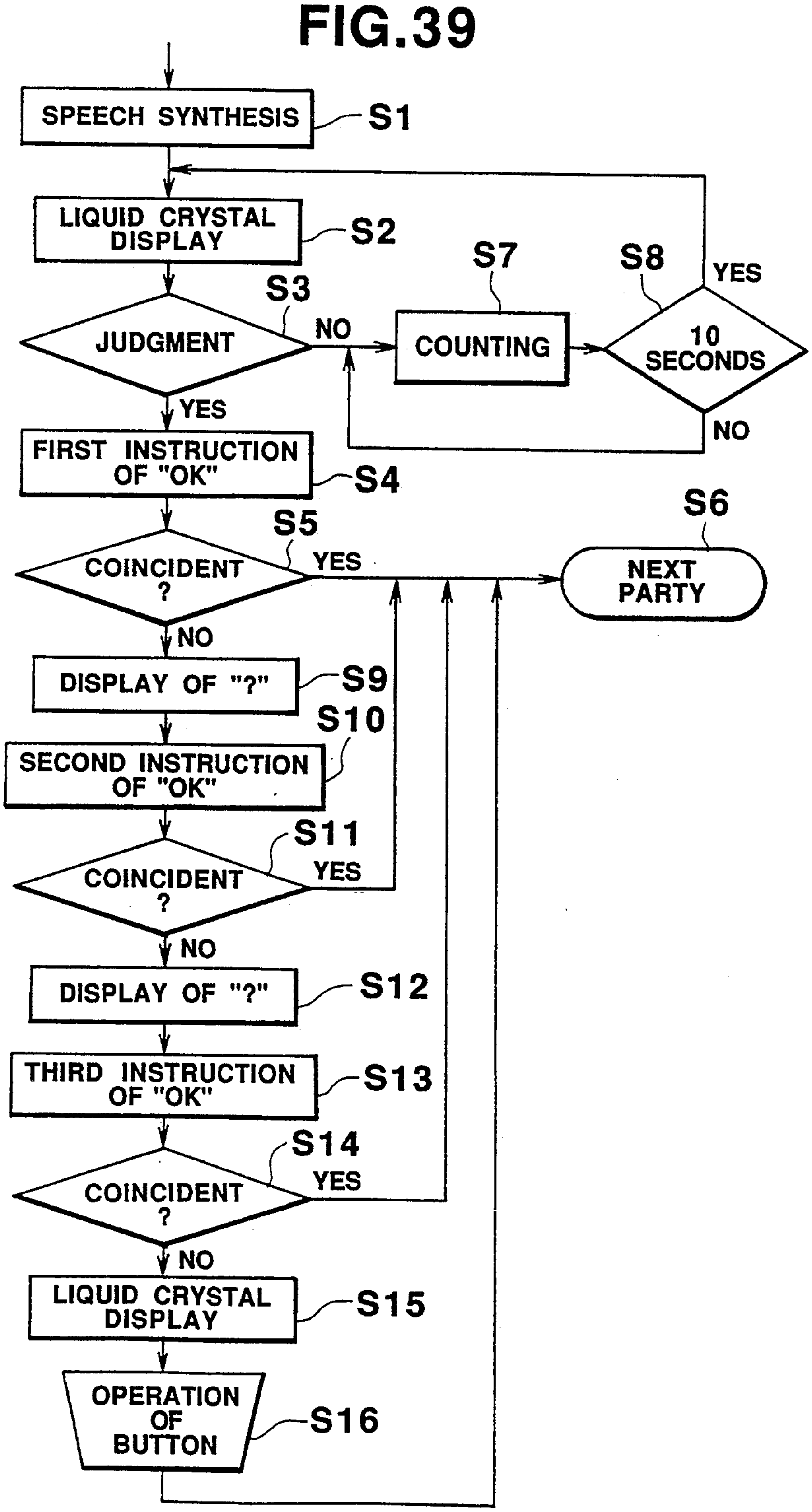
FIG. 39 is a flow chart illustrating a confirming operation of the microcomputer.

Subsequently, programmed controlling operation of the party production apparatus 1 by the control apparatus C will be described in detail with reference to FIGS. 38 to 40. First, if the sponsor depresses the party starting button 248 of the operating switch section 10 as a first step, then the microcomputer MC causes, as a second step, the speech synthesizing apparatus 229 to pronounce "now, let's start the party", whereafter background music is played at a third step and a celebration message is displayed on the liquid crystal display screen 11 at a fourth step. Then, the microcomputer MC waits for one minute while executing a confirming operation indicated by a flow chart in FIG. 39. Here, the management of time in the party progress control of the microcomputer MC is performed by means of the timer T1.

Subsequently, the confirming operation will be described with reference to the flow chart of FIG. 39. At a point of time prior by 3 minutes to the point of time at which a next step is to be performed after the celebration message has been displayed on the liquid crystal display screen 11 (here, since the interval of time of only one minute is involved, a confirming operation is started immediately after displaying of the message), the microcomputer MC causes, at step S1, the speech synthesizing apparatus 229 to pronounce "may the party proceed to a next step ?". Then at step S2, the microcomputer MC causes the liquid crystal display screen 11 to display "if the party should proceed to a next step, please reply 'OK 1'". An instructor who carries the wireless microphone 228 listens to the question by the speech synthesization, and if the instructor determines at step S3 that the party may proceed to a next step, then, looking at the display on the liquid crystal display screen 11, the instructor utters "OK" as a first instruction in accordance with the displayed instruction. Since contents of a word or words to be inputted to the speech synthesizing apparatus 227 are displayed on the liquid crystal display screen 11 in this manner, contents of any instruction need not be memorized by the instructor, and even if the instructor forgets such contents of an instruction, the instructor can give an instruction rapidly looking at the display on the liquid crystal display screen 11. Further, since contents of a word or words are displayed on the liquid crystal display screen 11 in this manner, the progress of the party is controlled, and the management of time is allowed thereby.

Speech of the instructor uttered to the wireless microphone 228 is inputted to the speech synchronizing apparatus 227. The speech synchronizing apparatus 227 compares the input speech pattern with the standard speed pattern described hereinabove to execute recognition processing, and if they coincide with each other, then the microcomputer MC develops a coincidence signal. Then, the microcomputer MC judges whether or not the coincidence signal has been received, and if the coincidence signal has been received, then the microcomputer MC advances to a next party operation at step S6.

Here, when the instructor does not become aware of the display of the liquid crystal display screen 11 and does not utter anything (silent) at step S3 in the confirming operation described above, a notice that no speech has been inputted is delivered from the speech synthesizing apparatus 227 to the microcomputer MC. When no speech has been inputted, the microcomputer MC advances the control sequence from step S3 to step S7, at which it counts the silence time by means of the timer T1. Then, when 10 seconds elapse at step S8, the microcomputer MC returns the control sequence to step S2, at which the microcomputer MC causes the liquid crystal display screen 11 to display "if the party should proceed to a next step, please reply 'OK!'". If the instructor looks at the display and utters "OK" at step S4, then the speech is similarly inputted to the speech recognizing apparatus 227. Then, in case the standard speech pattern and the input speech pattern do not coincide with each other and the speech recognizing apparatus 227 has failed to confirm, the speech recognizing apparatus 227 delivers an non-coincidence signal to the microcomputer MC. In this instance, the microcomputer MC advances the control sequence from step S5 to step S9, at which it causes the liquid crystal display screen 11 to display the mark "?".

The instructor can rapidly comprehend from the display of the mark "?" that the speech recognizing apparatus 227 has failed to confirm. Then, the microcomputer MC advances the control sequence again to step S10, at which a second instruction of "0K!" will be inputted to the speech recognizing apparatus 227 by way of the wireless microphone 228. Then, the speech recognizing apparatus 227 compares the input speech pattern with the standard speech pattern to execute the confirming processing, and if coincidence is confirmed here, then the speech recognizing apparatus 227 delivers a coincidence signal to the microcomputer MC. When the microcomputer MC receives the coincidence signal at step S11, it advances the control sequence to step S6 to execute a next operation.

On the other hand, even if the instructor gives a first instruction of "OK!" by way of the wireless microphone 228 at step S4, if the input speech pattern does not coincide with the standard speech pattern and the speech recognizing apparatus 227 fails to recognize the input speech pattern and delivers a non-coincidence signal to the microcomputer MC, the microcomputer MC causes the liquid crystal display screen 11 to display the mark "?" at step S9. And, if the instructor confirms from the display of the mark "?" that the speech recognizing apparatus 227 has failed to recognize similarly as described above and, even if the instructor inputs a second instruction to the speech recognizing apparatus 227 by way of the wireless microphone 228, the speech recognizing apparatus 227 still fails to recognize and delivers another non-coincidence signal to the microcomputer MC, then the microcomputer MC advances the control sequence from step S11 to step S12, at which it causes the liquid crystal display screen 11 to display the mark "?" again. Thus, the instructor will confirm from the second display of the mark "?" that the speech recognizing apparatus 227 has failed to recognize similarly as described above. Then, even if the instructor inputs, at step S13, a third instruction of "OK!" to the speech recognizing apparatus 227 by way of the wireless microphone 228 again, if the speech recognizing apparatus 227 still fails to recognize and delivers another non-coincidence signal to the microcomputer MC, the microcomputer MC advances the control sequence from step S14 to step S15, at which it causes the liquid crystal display screen 11 to display "Please depress the understanding button".

The instructor can recognize rapidly from the display that instruction by speech is impossible or difficult. Then, if the instructor depresses, at step S16, the understanding button 256 provided at the operating switch section 30 of the table counter 3 in accordance with the display of the liquid crystal display screen 11, then in response to the depression of the understanding button 256, the microcomputer MC advances the control sequence to step S6 to execute the next operation. It is to be noted that the microcomputer MC advances the control sequence so as to effect the next operation either in response to a reply by speech or in response to depression of the understanding button 256 without such reply by speech.

In this manner, the microcomputer MC causes the liquid crystal display screen 11 to display a result of recognition processing by the speech recognizing apparatus 227. In particular, when the speech recognizing apparatus 227 fails to find coincidence between an input speech pattern and the standard speech pattern and fails to recognize, the microcomputer MC causes the liquid crystal display screen 11 to display an operation to be performed by the instructor subsequently, and accordingly, such a disadvantage that a component (such as the elevator 39) of the party production apparatus 1 is not rendered operative indefinitely is eliminated. Consequently, the progress of the party is not disturbed at all.

Referring back to FIG. 38, if the microcomputer MC receives either a coincidence signal from the speech recognizing apparatus 227 or a signal from the understanding button 256, it judges that it may advance to the next operation and executes, as a sixth step, such operation that it controls the elevator 49 included in the general operation apparatus A to lift the first cold dish to a location within the food displaying section 21A, causes the doors 22 to be opened and causes the liquid crystal display screen 11 to display, for example, "Sorry to have kept you waiting". Subsequently, as a seventh step, the microcomputer MC remains in a waiting condition for 20 minutes without executing anything in order to assure a time interval for eating the meal by those present in the party. When the point time comes which is prior by 3 minutes to completion of the 20 minutes, the microcomputer MC executes such a confirming operation as described above as an eighth step.

If the microcomputer MC judges as a result of the confirming operation that it may advance to a next operation, it changes, as a ninth step, the liquid crystal of the doors 14 of the showcases 12 and 13 into a transparent condition, and then it waits, as a tenth step, for two minutes while executing a similar confirming operation to that described above (also in this instance, since no three minutes are left before a next operation is to be started, a confirming operation is started immediately). If the microcomputer MC judges as a result of the confirming operation at the tenth step that it may advance to a next operation, it causes the doors 22 to be closed and controls the elevator 39 to lower the first cool dish as an eleventh step, and then as a twelfth step, it executes such a sequence of operations that it controls the elevator 38 to lift the first warm dish to a location within the food displaying section 21A, causes the doors 22 to be opened and causes the liquid crystal display screen 11 to effect a display similar to that described hereinabove.

Thereafter, as a thirteenth step, the microcomputer MC remains in a waiting condition for 10 minutes again without executing anything to assure a time interval for consuming the meal by those present in the party. When the point in time comes which is prior by 3 minutes to completion of the 10 minutes, the microcomputer MC executes a confirming operation similar to that described above as a fourteenth step, and when it judges as a result of the confirming operation that it may advance to a next operation, it causes the doors 22 to be closed and controls the elevator 38 to lower the first warm dish as a fifteenth step, whereafter it ends the party as a sixteenth step.

Here, in the confirming operation at the fifth step of FIG. 38 described above, even if the speech synchronizing operation 229 utters "may the party proceed to a next step ?", if the instructor does not become aware of this and the microcomputer MC receives, after a lapse of 2 minutes after the utterance, a coincidence signal from the speech recognizing apparatus 227 or a signal from the understanding button 256, while the interval from the fourth step to the sixth step is programmed to be one minute, actually the interval becomes 2 minutes. Consequently, the progress of the party is delayed by one minute.

Similarly, in the confirming operation at the eighth step of FIG. 38 described above, if the microcomputer MC receives a coincidence signal from the speech recognizing apparatus 227 or a signal from the understanding button 256 a after lapse of 10 minutes after utterance of "may the party proceed to a next step ?" by the speech synthesizing apparatus 229, then since the interval from the sixth step to the ninth step is programmed to be 20 minutes, actually the interval becomes 27 minutes, and accordingly, the progress of the party is delayed by 7 minutes.

Figure 40:
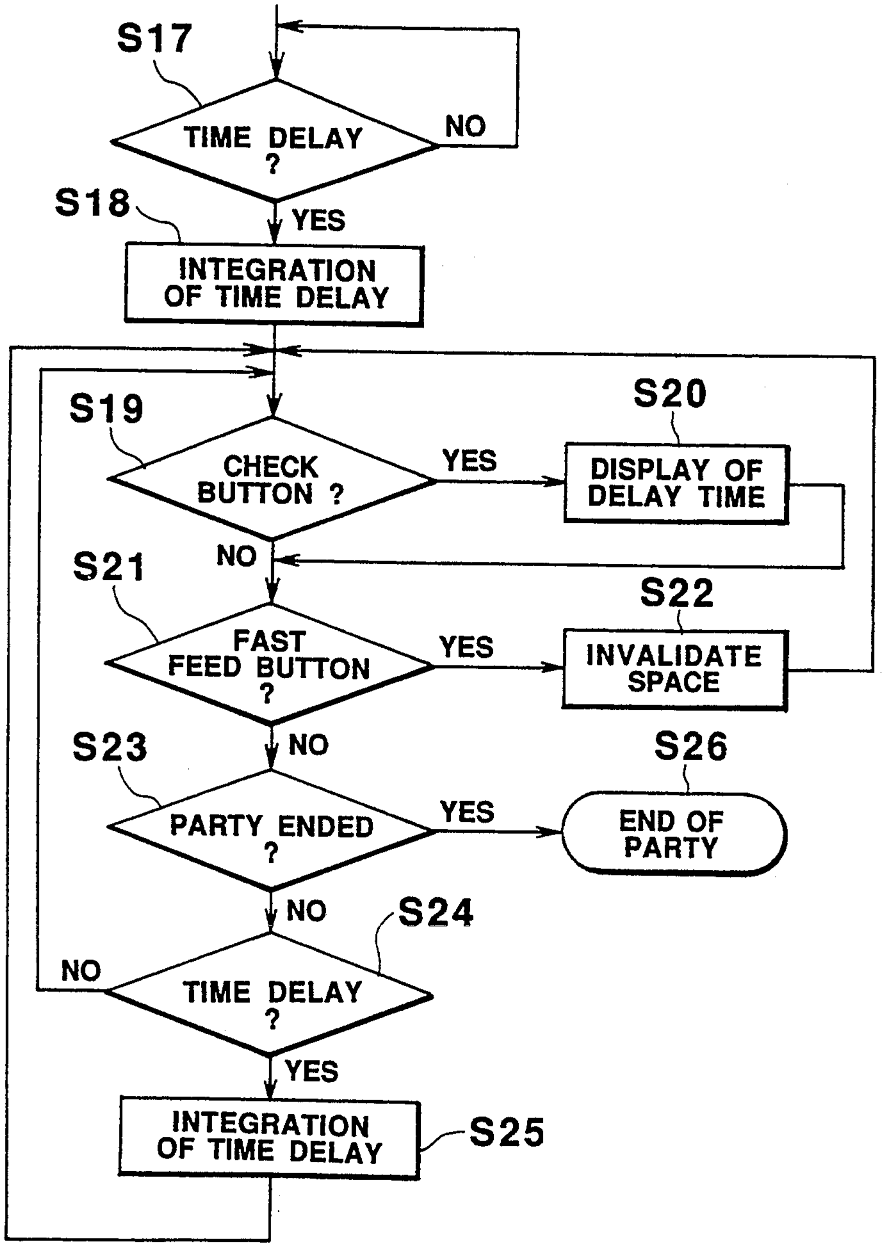
FIG. 40 is a flow chart illustrating delay time control of the microcomputer.

The microcomputer MC judges at step S17 of the flow chart shown in FIG. 40 whether or not there is such a delay in time, and if there is a time delay, the microcomputer MC accumulates, at step S18, the delay time by means of the delay time timer T2. In the example described above, a delay time of a total of 8 minutes derived from the delay time of 1 minute at the fifth step of FIG. 38 and the delay time of 7 minutes at the eighth step is accumulated in the delay time timer T2.

Thus, if the sponsor depresses, for example, the check button 251 of the operating switch section 10 intermediately at the eighth step of FIG. 38, then since the microcomputer MC judges at step S19 of FIG. 40 whether or not the check button 251 is depressed, it advances the control sequence to step S20, at which it causes the time displaying section 231 to display the delay time of "8 minutes" accumulated in the delay time timer T2. Looking at the display, the sponsor can quickly confirm the delay of the party and can determine the proceeding condition of the party.

When the sponsor looking at the display of the delay time on the time displaying section 231 wants to accelerate the progress of the party, that person will depress the fast feeding button 249 of the operating switch section 10. The microcomputer MC judges at step S21 whether or not the fast feeding button 249 is depressed. Thus, when the fast feeding button 249 is depressed as described above, the microcomputer MC invalidates, at step S22, a time interval appearing subsequently to the point of time at which the fast feeding button 249 is depressed (it is to be noted that a time interval is one of the operations of the party program. In particular, if the fast feeding button 249 is depressed at the ninth step of FIG. 38 described hereinabove, then the microcomputer MC advances the control sequence directly to the eleventh step skipping the tenth step as indicated by a broken line in FIG. 38. Consequently, the progress of the party is accelerated by 2 minutes, and the delay time is generally reduced to 6 minutes.

The microcomputer MC judges at step S23 of FIG. 40 whether or not the scheduled party has come to the last stage, and if the scheduled party has not come to the last stage as yet, the microcomputer MC advances the control sequence to step S24, at which it judges whether or not there is some delay in time. If there is some time delay, the microcomputer MC accumulates, at step S25, the delay time by means of the delay time timer T2 similarly as described hereinabove. On the other hand, if it is judged at step S23 that the party has come to the last stage, the microcomputer MC advances the control sequence to step S26, at which it ends the party (sixteenth step of FIG. 38). It is to be noted that the accumulated time of the delay time timer T2 is corrected to 6 minutes by reduction of the delay time at step S25.

Figure 41:
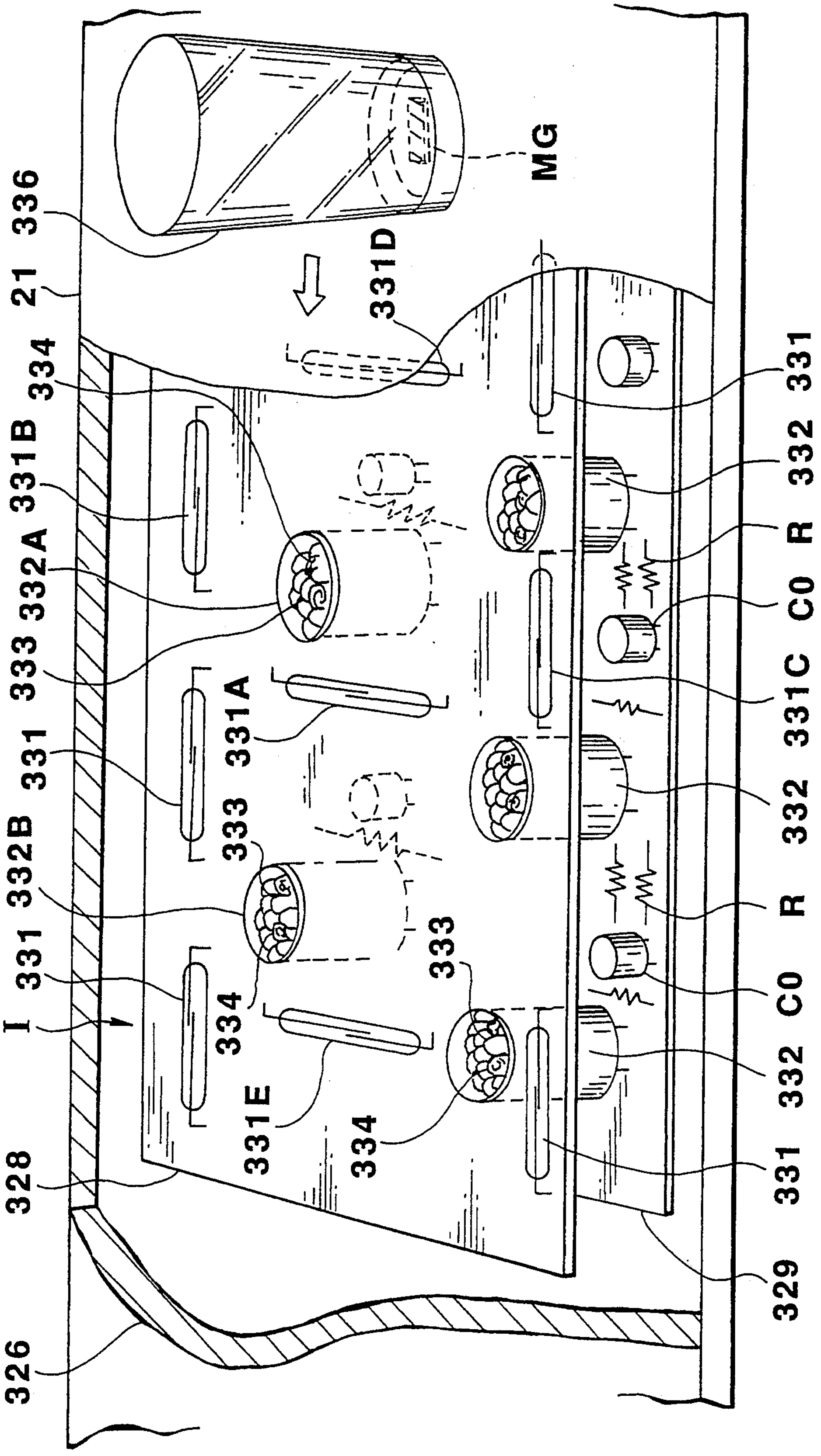
FIG. 41 is a perspective view, partly in section, of a counter of the table counter.
Figure 42:
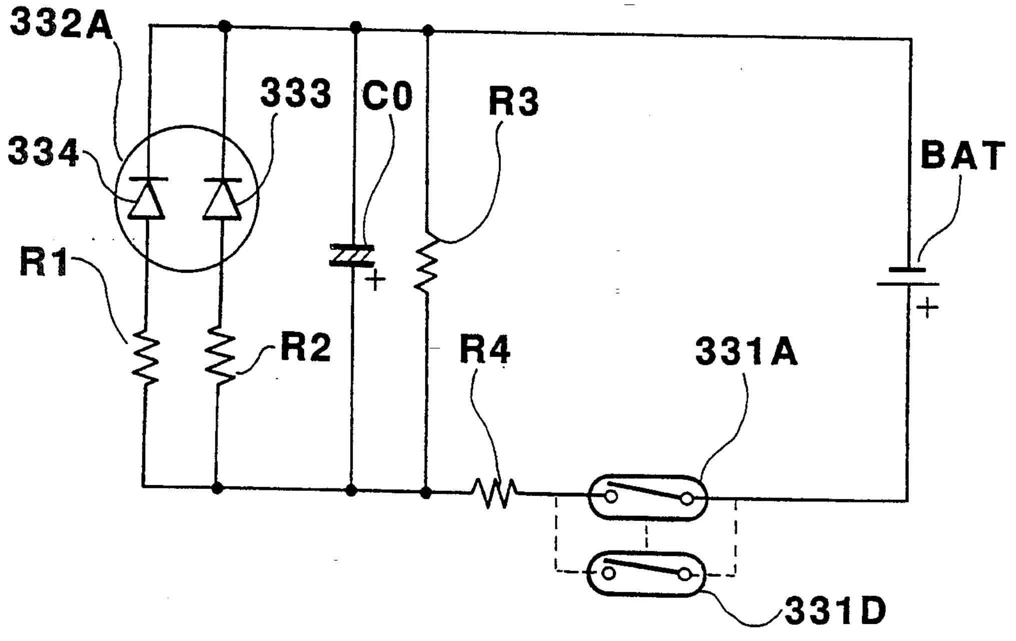
FIG. 42 is a circuit diagram of an electric circuit of an illuminating apparatus of the table counter.

Here, a top plate 326 of the counter 21 of the table counter 3 includes a thin artificial marble plate disposed on a light transmitting illuminating plate of polycarbonate, an acrylate resin or a like material. Such an illuminating apparatus I as shown in FIG. 41 is accommodated in the counter 21. The illuminating apparatus I is disposed below the top plate 326 over the entire area of the top plate 326 and includes a pair of upper and lower base plates 328 and 329. A plurality of reed switches 331 (331A. 331B, 331C, 331D and 331E) constituting position detecting means are mounted on the upper base plate 328 in an opposing relationship to the rear face of the top plate 326. A plurality of LED (light emitting diode) aggregates 332 (332A and 332B) serving as illuminating means are mounted in addition to such circuit elements as resistors R and capacitors CO, which will be hereinafter described, on the lower base plate 329. The reed switches 331 are disposed in such a manner as to surround the LED aggregates 332. Each of the LED aggregates 332 is constructed from a plurality of green LEDs 332 and red LEDs 334. Meanwhile, reference numeral 336 denotes a glass as an article to be moved arbitrarily on the counter 21 by a person present in the party. The article may otherwise be a wine glass, a coaster or a dish. A magnet MG which constitutes position detecting means is mounted on a lower face of the glass 336. FIG. 42 shows a circuit diagram of part of an electric circuit which relates, for example, to the LED aggregate 332A. A parallel circuit of the reed switches 331A, 331B, 331C and 331D positioned around the LED aggregate 332A is connected to a dc power source BAT. By way of the parallel circuit and a reed switch protecting resistor R4, a series circuit of the green LEDs 333 of the LED aggregate 332A and a current limiting resistor R2, a series circuit of the red LEDs 334 and a current limiting resistor R1, a capacitor CO and a discharging resistor R3 are connected in parallel to the dc power source BAT. The resistance value of the resistor R1 is set higher than the resistance value of the resistor R2. Such an electric circuit is constructed for each of the LED aggregates 332 together with the reed switches 331 existing around it. Particularly here, the emission of light of the LED aggregate 332B is controlled by the reed switch 331E adjacent thereto.

Subsequently, operation will be described. It is assumed now that a person present in the party holds a glass 336 and moves it in the direction indicated by an arrow mark in FIG. 41 from its position shown in FIG. 41 on the counter 21. In this instance, when the glass 336 first approaches the reed switch 331D, the contacts of the reed switch 331D are closed by a magnetic force of the magnet MG. Consequently, all of the LEDs 333 and 334 of the LED aggregate are energized to emit light therefrom. The color of light then is yellow which is a mixture of green and red, and the yellow light makes a ring 340 of light that passes through the top plate 326 to illuminate the glass 336 from below (FIG. 1). When the glass 336 is moved farther until it is spaced far away from the reed switch 331D, the magnetic force of the magnet MG no longer acts upon the reed switch 331D so that the contacts of the reed switch 331D are opened. However, since the glass 336 thereafter approaches the reed switch 331A, 331B or 33C, the associated contacts are now closed. Accordingly, while the glass 336 is present in the proximity of the LED aggregate 331A, the LEDs 333 and 334 of the LED aggregate 332A continue to be energized so that the LED aggregate 332A continue to emit light therefrom.

When the glass 336 is further moved until it passes and is spaced away from the reed switch 331A, it now approaches the reed switch 331E, and consequently, the contacts of the reed switch 331E are closed. Consequently, the LED aggregate 332B adjacent the LED aggregate 332A now emits light therefrom to illuminate the thus moved glass 336 from below. In other words, following the movement of the glass 336, one of the LED aggregates 332 which is positioned below the glass 336 begins to emit light therefrom, and rings 340 of light are formed successively.

Meanwhile, when the glass 336 is moved away from the reed switch 331A, the contacts thereof are opened, and consequently, the portion of the circuit of FIG. 42 on the left side with respect to the resistor R4 is disconnected from the dc power source BAT. Consequently, the currents flowing through the LEDs 333 and 334 are gradually reduced in accordance with a time constant which depends upon the resistors R1, R2 and R3 and the capacitor CO, and the emission of light of the LED aggregate 332A ends in a predetermined time. In this instance, since the resistance value of the resistor R1 is set higher than the resistance value of the resistor R2, the discharging time is long, and accordingly, the green LEDs 333 are extinguished first and then the red LEDs 334 are extinguished.

In particular, following the movement of an arbitrary glass 336 of a person present at the party, those of the LED aggregates 332 which successively become positioned below the glass 336, successively begin to emit light therefrom, and the light then is yellow. The LED aggregate 332 from which the glass 336 has moved away as a result of further movement of the glass, is extinguished in a predetermined time, and in this instance, the light changes from yellow to red and then disappears. In other words, the ring 340 of light on the counter 21 moves, following the movement of the glass 336, and lights up the glass 336 from below. At a location where the glass 336 has moved away, the ring 340 of light remains present for a predetermined period of time while changing its color so that a person observing it may have an impression as if the person sees an afterimage phenomenon, thereby further enhancing the novelty effect of the party.

It is to be noted that, while the position detecting means in the embodiment is constructed using the reed switches 331 and the magnet MG, it is not limited to this, and the position of a glass 336 on the counter 21 may otherwise be detected by means of infrared ray switches for projecting infrared rays upwardly from the counter 21 in order to cause the LED aggregates 332 to selectively emit light therefrom, or the position of an article may alternatively be detected by detecting a variation of the electrostatic capacitance or the like on the counter 21. Further, while LEDs are employed for the illuminating means, it is not limited to such LEDs and may be constructed from small bulbs, fluorescent tubes, or the like.

As described in detail so far, according to the present invention, since the controller controls the transport apparatus so that various dishes accommodated in the storage chamber are transported to the food displaying section of the table by means of the transport means in accordance with an order of a party program stored in the register means, the dishes can be automatically served in accordance with the progress of the party, and accordingly, a superior party effect is exhibited.

Further, while the controlling means executes various operations in accordance with the order of the party program stored in advance in the register means, in a special instance, since the various operations applied are executed in response to instructing operations to the instructing means by an instructor, if an instructing operation is not performed, then the controlling means will not advance the control sequence thereof to the next operation. Accordingly, the party will not proceed and ignore a special situation, e.g. a speech by a guest of honor, of those present in the party, and consequently, the attendees will not feel inconvenienced. On the other hand, when it is desired that the next operation is to begin, since the instructor is urged by the instruction confirming means to effect an instructing operation to the instructing means, a delay of the party can be suppressed to the minimum and management of the progress of the party can be performed smoothly.

Further, while the controlling means executes various operations in accordance with the order of the party program stored in advance in the register means, in this instance, since each of the operations is executed in response to an instructing operation to the instructing means by the instructor, if an instructing operation is not performed, then a next operation will not begin. Consequently, even if the progress of the party is delayed, the controlling means having a watch function causes the displaying section to display a progressing condition of the party program in response to an operation of the confirming operating means, and accordingly, the sponsor can confirm a delay time and so forth of the party readily and can judge the future progress of the party rapidly.

Furthermore, while the controlling means executes various operations in accordance with the order of the party program stored in advance in the register means, in this instance, since each of the operations is executed in response to an instructing operation to the instructing means by the instructor, if an instructing operation is not performed, then a next operation will not begin. Consequently, when the progress of the party is delayed, the controlling means advances, in response to an operation of the fast feeding operating means, the control sequence thereof to the next operation skipping a particular operation in the party program, and accordingly, the delay of the progress of the party can be corrected.

Meanwhile, since contents of speech to be inputted to the speech recognizing means are displayed on the display means, contents of an instruction are not mistaken and the recognition rate is enhanced. Further, the instructor need not memorize such contents of a spoken instruction, and there is no trouble with the controlling procedure of the apparatus even if such contents of an instruction are forgotten. Particularly depending upon the timing of the displays, it is possible to effect management of time in the progress of the party.

Further, since a result of recognition by the speech recognizing means is displayed on the display means, even when recognition is impossible, an operation to be performed subsequently can be begun quickly, and consequently, there is no trouble with the controlling procedure.

Meanwhile, since the light emitting condition of the illuminating means can be changed in relation to arbitrary movement of an article on the table, the person seeing this is impressed strongly, by which the novelty effect of the party can be enhanced.

Further, since opening or closing movement of the door members for closing the food displaying section formed on the table does not interfere with an article on the table and the doors are accommodated, when they are opened, into the table, the doors are not an obstacle to taking out a dish from the food displaying section. Consequently, a dish can be taken out smoothly.

Furthermore, the door members are automatically opened and closed by the driving means, and an impact when the door members are abutted with each other is moderated by the damper so that otherwise possible damage to the door members is prevented. Also the safety when a hand or an arm is held between the door members can be enhanced. Further, since a displacement in operation between the supporting arms and the driving means, which takes place in such a case as described just above is absorbed by the resilient connecting member, an otherwise possible overload to the driving means is eliminated, and the life of the driving means can be extended.

Further, even if a hand or an arm is abutted with the door members while the door members are closed by the driving means, since the driving force of the driving apparatus is absorbed by the connecting member, occurrence of injury to the hand or the arm of a person present at the party and damage to the driving apparatus can be prevented. Besides, it is possible to open the door members by hand, and since, when the door members are first opened by hand and then released, the connecting member exerts a resistance to moderate the closing speed of the door member, occurrence of damage to the door members caused by an impact applied to the door members can be prevented.

Furthermore, a sufficient distance of movement, when the movable section is to hold a food container can be assured by the expansible rack apparatus. Since the rack apparatus does not interfere with upward or downward movement of the transport apparatus in the movement duct when the movable section is in a retracted condition toward the base, holding and transportation of a food container can be achieved very smoothly.

Meanwhile, when a vessel for storing an article therein at a controlled temperature is in a retracted condition relative to the kitchen counter side, the upper opening of the vessel is closed, but when the vessel is in an advanced condition to the outside of the kitchen counter, the opening of the vessel is opened. and upon such advancing movement of the vessel, a liftable shelf in an vessel is lifted by the interlocking apparatus and an article stored on the liftable shelf is lifted to the opening side. Consequently, taking out and serving of the article (for example, chilled wine) can be performed very smoothly. Further, upon retreating movement of the vessel relative to the kitchen counter side, the liftable shelf is moved down and the article is accommodated into the vessel. Consequently, storage of the article can be performed smoothly.

In addition, while the temperature of the inside of the vessel for accommodating an article therein is controlled by the temperature controller, since, in the retreating condition of the vessel relative to the kitchen counter side, the upper opening of the vessel is closed by the kitchen counter, the temperature of the inside of the vessel is controlled well. Particularly when the vessel is to be advanced to the outside of the kitchen counter, the driving apparatus lowers, at an initial stage of the advancing movement, the vessel to move away from the kitchen counter, and then at a final stage of a retreating movement (removal) of the vessel relative to the kitchen counter side, the driving apparatus lifts the vessel to close the opening of the vessel with the kitchen counter. Consequently, the advancing and retreating movements of the vessel can be performed smoothly.

What is claimed is:

1. A party production apparatus, comprising:

a table counter including a frame, a table provided on said frame, a food displaying section formed on said table, a storage chamber provided in said frame for accommodating a plurality of dishes therein, and a transport apparatus for transporting a selected dish or dishes accommodated in said storage chamber to said food displaying section, and a controller connected to said table counter for control of the operation of portion of said table counter, said controller including register means for storing therein a party program including a plurality of operations for execution successively in a time series relationship in accordance with said program, and means for controlling said transport apparatus of said table counter in accordance with an order stored in said register means to transport at least one of the selected dishes to said food displaying section.

2. A party production apparatus according to claim 1, wherein said controller further includes controlling means for executing party program operations, instructing means for instructing said controller to advance the control sequence thereof to a next operation, and instruction confirming means, and said controller executes the party program operations in accordance with the order stored in said register means and in response to an instructing operation to said instructing means, and when said controller advances the control sequence to a next operation, said controller prompts the instructor by means of said instruction confirming means to effect an instructing operation to said instructing means.

3. A party production apparatus according to claim 1, wherein said controller further includes controlling means for executing party program operations, instructing means for instructing said controlling means to advance the control sequence thereof to a next operation, display means, and confirming operating means for confirming a progressing condition of the party program, and said controlling means has a watch function, executes the operations in accordance with the order stored in said register means and in response to an instructing operation to said instructing means, and causes said display means to display a progressing condition of the party program in response to an operation by said confirming operating means.

4. A party production apparatus according to claim 1, wherein said controller further includes controlling means for executing party program operations, instructing means for instructing said controlling means to advance the control sequence thereof to a next operation, and fast feeding operating means for skipping one of the operations in the party program, and said controlling means executes the party program operations in accordance with the order stored in said register means and in response to an instructing operation to said instructing means, and advances the control sequence thereof to a next operation skipping a particular operation in the party program in response to an operation of said fast feeding operating means.

5. A party production apparatus according to claim 1, wherein said controller further includes speech recognizing means for inputting a speech and recognizing the speech, display means for displaying information, and controlling means for executing the operation in accordance with the order stored in said register means and in response to contents of the speech recognized by said speech recognizing means, and said controlling means causes said display means to display contents of speech inputted to said speech recognizing means, and said controlling means causes said display means to display the contents of a spoken instruction inputted to said speech recognizing means in order to execute the operation.

6. A party production apparatus according to claim 1, wherein said controller further includes speech recognizing means for inputting a speech and recognizing the speech, display means for displaying information, and controlling means for executing the operations in accordance with the order stored in said register means and in response to contents of spoken instructions recognized by said speech recognizing means, and said controlling means causes said display means to display a result of recognition by said speech recognizing means.

7. A party production apparatus according to claim 1, wherein said table includes, at least at an upper face thereof, a light transmitting member and includes, in the inside thereof, a plurality of illuminating means for illuminating said upper face of said table, and position detecting means for detecting the position of an article on said table, and said controller includes illumination controlling means for causing said illuminating means to selectively emit light in relation to the position of the article detected by said position detecting means.

8. A party production apparatus according to claim 1, wherein said table counter further includes a door apparatus for opening and closing said food displaying section, said door apparatus including a pair of door members each having an arcuate cross section, and a support apparatus for supporting said door members for pivoting motion around the center of the arcs such that said door members are advanced and retracted from opposite sides of said food displaying section, said support apparatus causing, when said food displaying section is closed, said door members to project from said table and contact each other above said food displaying section, when said food displaying section is opened, said support apparatus accommodating said door members in said table.

9. A party production apparatus according to claim 1, wherein said table counter further includes a door apparatus for opening and closing said food displaying section, said door apparatus including a pair of door members each having an arcuate cross section, a pair of support arms for supporting said door members for pivoting motion around the center of the arcs such that said door members are advanced and retracted from opposite sides of said food displaying section to cause, when said food displaying section is closed, said door members to contact each other above said food displaying section, when said food displaying section is opened, said door members are accommodated in said table, driving means for driving said support arms to pivot to open or close said door members, a resilient connecting member for interconnecting said driving means and said support arms, and a damper for exerting a resisting force in a direction in which said door members are closed.

10. A party production apparatus according to claim 1 further including a kitchen counter connected to said controller, said kitchen counter includes a show-case, said show-case including an opening, a door member supported for pivoted motion in a vertical direction at an upper portion of said opening for opening and closing said opening, a driving apparatus for driving said door member to open and close, and an interconnecting member for interconnecting said driving apparatus and said door member to transmit the driving force of said driving apparatus to said door member, said interconnecting member including an expansible damper having a predetermined resisting force to a force acting in a direction in which said door member is closed, said damper having a force, which acts in the opposite direction in which said door member is opened, to effect free opening of said door member.

11. A party production apparatus according to claim 1, wherein said table counter further includes a movement duct which is formed in said storage chamber said duct extending downwardly from said food displaying section, a plurality of shelves provided adjacent said duct in said storage chamber, and food container held on each of said shelves for accommodating a food therein, and said transport apparatus includes a base, a movable section provided for forward and backward movement from said base toward a corresponding one of said shelves or vice versa for holding any of the food containers thereon, an expansible rack apparatus being provided on said movable section, and a pinion provided on said base for meshing engagement with said rack apparatus, said transport apparatus moving upwardly or downwardly in said movement duct to selectively feed the food containers to said food displaying section, said pinion driving, when rotated, said movable section by way of said rack apparatus, said rack apparatus being expanded when said movable section is advanced toward any of said shelves, but contracted when said movable section is retracted toward said base.

12. A party production apparatus according to claim 1, further including a kitchen counter connected to said controller, said kitchen counter includes a vessel mounted for advancing and retreating movement to the outside of said kitchen counter and having at the top thereof an opening which is closed when said vessel is retracted into a side of said kitchen counter, an article receiving liftable shelf disposed for upward and downward movement in said vessel, and an interlocking apparatus connected to said liftable shelf for lifting said liftable shelf in response to an operation of said vessel advancing to the outside of said kitchen counter and for lowering said liftable shelf in response to another operation wherein said vessel retreats into said kitchen counter.

13. A party production apparatus according to claim 1, further including a kitchen counter connected to said controller, said kitchen counter includes a vessel having an opening at the top thereof and mounted for advancing and retreating movement to and from the outside of said kitchen counter, a temperature controller for controlling the temperature of the inside of said vessel, and a driving apparatus for driving said vessel to advance and retreat, for lowering said vessel to move said opening away from said kitchen counter at an initial stage of movement of said vessel to the outside of said kitchen counter, and for lifting said vessel to close said opening with said kitchen counter at a final stage of movement of said vessel to said kitchen counter side.

14. A party production apparatus, comprising:

a table including a food displaying section, a storage chamber for storing a plurality of dishes therein, and a transport apparatus for transporting an arbitrary one of the dishes accommodated in said storage chamber to said food displaying section; and a controller connected to said table including register means for storing therein a party program including a plurality of operations for execution in a time series relationship, means for controlling said transport apparatus of said table in accordance with an order stored in said register means to transport the dishes to said food displaying section, speech recognizing means for inputting speech thereto and for recognizing the speech, and said controller executing the operation in response to the speech recognized by said speech recognizing means.

15. A party production apparatus, comprising:

a table counter including a frame, a table provided on said frame, a food displaying section formed in said table, a storage chamber formed in said frame for accommodating a plurality of dishes therein, and a transport apparatus for transporting an arbitrary one of the dishes accommodated in said storage chamber to said food transporting section;

a controller connected to said table counter for control of the operation of portions of said table counter, said controller including register means for storing therein a party program including a plurality of operations for successive execution in a time series relationship in accordance with said program, controlling means for controlling said transport means of said table counter to execute a plurality of operations to transport the dishes to said food displaying section, display means for displaying thereon information, confirming means for confirming a progressing condition of the party program, fast feeding operating means for skipping an operation in the party program, and speech recognizing means for inputting speech thereto and for recognizing the speech; and a controller executing the operations in accordance with the order stored in said register means and in response to contents of the speech recognized by said speech recognizing means, to cause, when said controller advances the control sequence thereof to a next operation, said display means to display contents of speech input to said speech recognizing means, to cause said display means to display a result of recognition by said speech recognizing means, to cause said display means to display a progressing condition of the party program in response to an operation to said confirming means, and to advance the control sequence to a next operation skipping a particular operation in the party program in response to an operation to said fast feeding means.

* * * * *